(12) United States Patent
Michel et al.

(10) Patent No.: US 7,817,872 B2
(45) Date of Patent: Oct. 19, 2010

(54) IMAGE PROCESSING APPARATUS AND METHOD, RECORDING MEDIUM, AND PROGRAM

(75) Inventors: Xavier Michel, Chiba (JP); Koji Aoyama, Saitama (JP)

(73) Assignee: Sony Corporation, Tokyo (JP)

( * ) Notice: Subject to any disclaimer, the term of this patent is extended or adjusted under 35 U.S.C. 154(b) by 927 days.

(21) Appl. No.: 11/671,255

(22) Filed: Feb. 5, 2007

(65) Prior Publication Data

US 2008/0199099 A1  Aug. 21, 2008

(30) Foreign Application Priority Data

Feb. 7, 2006 (JP) ............... 2006-029507

(51) Int. Cl.
*G06K 9/38* (2006.01)
*G06K 9/40* (2006.01)

(52) U.S. Cl. .............. 382/266; 382/274; 382/275; 382/261

(58) Field of Classification Search .......... 382/260–275
See application file for complete search history.

(56) References Cited

U.S. PATENT DOCUMENTS 5,461,655 A  10/1995  Vuylsteke 6,956,582 B2 *  10/2005  Tidwell ............ 345/611
7,437,013 B2 *  10/2008  Anderson ......... 382/261

FOREIGN PATENT DOCUMENTS

EP  1 111 906  6/2001
WO  97/22202  6/1997

OTHER PUBLICATIONS

International Search Report dated Jun. 6, 2007.

* cited by examiner

*Primary Examiner*—Wes Tucker
(74) *Attorney, Agent, or Firm*—Sonnenschein Nath & Rosenthal LLP

(57) ABSTRACT

An image processing apparatus includes an edge-direction detector that detects an edge direction in an original image; a confidence detector that detects a confidence of the edge direction; a contrast detector that detects a contrast intensity; a texture-contrast-weight setter that sets a texture-contrast weight; an edge-contrast-weight setter that sets an edge-contrast weight; a texture-weight setter that sets a texture weight; an edge-weight setter that sets an edge weight; a texture filter that performs texture filtering to generate a texture-filter image; an edge filter that performs edge filtering to generate an edge-filter image; a texture combiner that combines the original image and the texture-filter image to generate a texture-combination image; and an edge combiner that combines the texture-combination image and the edge-filter image to generate an edge-combination image.

19 Claims, 23 Drawing Sheets

IMAGE PROCESSING APPARATUS AND METHOD, RECORDING MEDIUM, AND PROGRAM

CROSS REFERENCES TO RELATED APPLICATIONS

The present invention contains subject matter related to Japanese Patent Application JP 2006-029507 filed in the Japanese Patent Office on Feb. 7, 2006, the entire contents of which are incorporated herein by reference.

BACKGROUND OF THE INVENTION

1. Field of the Invention

The present invention relates to image processing apparatuses and methods, recording media, and programs.

More specifically, the present invention relates to an image processing apparatus and method, a recording medium, and a program for adjusting image quality in accordance with image characteristics.

2. Description of the Related Art

Methods of edge enhancement for enhancing sharpness of edges in an image have hitherto been proposed (e.g., Japanese Unexamined Patent Application Publication No. 2003-16442 and PCT Japanese Translation Patent Publication No. 2005-527051.

SUMMARY OF THE INVENTION

However, in some cases, it is not possible to achieve an image quality desired by a user by simply enhancing sharpness of edges. Furthermore, even when edge enhancement is executed in the same manner, the effect of the edge enhancement varies depending on image characteristics, and image quality might be even degraded. Furthermore, the effect of edge enhancement could vary even within a single image when regions with considerably different image characteristics exist in the image.

It is desired to allow adjusting image quality more suitably in accordance with image characteristics.

According to an embodiment of the present invention, there is provided an image processing apparatus including edge-direction detecting means for detecting an edge direction at a target pixel being considered in an original image; confidence detecting means for detecting a confidence of the edge direction; contrast detecting means for detecting a contrast intensity of the target pixel, the contrast intensity indicating an intensity of contrast in a first region including and neighboring the target pixel; texture-contrast-weight setting means for setting a texture-contrast weight for the target pixel, the texture-contrast weight being a weight that is based on a degree of closeness of the contrast intensity of the target pixel to a predetermined contrast intensity that occurs with a high frequency of occurrence in a texture region, the texture region being a region where pixel values vary by larger amounts than in a flat region and by smaller amounts than in an edge region, the flat region being a region where pixel values are substantially constant, and the edge region being a region where pixel values vary sharply; first edge-contrast-weight setting means for setting a first edge-contrast weight for the target pixel, the first edge-contrast weight being a weight that is based on a degree of closeness of the contrast intensity of the target pixel to a predetermined contrast intensity that occurs with a high frequency of occurrence in the edge region; texture-weight setting means for setting a texture weight, the texture weight being a weight that is based on edge directions of individual pixels in a second region including and neighboring the target pixel, confidences of the edge directions of the individual pixels, and texture-contrast weights for the individual pixels; edge-weight setting means for setting an edge weight, the edge weight being a weight that is based on edge directions of individual pixels in a third region including and neighboring the target pixel, confidences of the edge directions of the individual pixels, and first edge-contrast weights for the individual pixels; texture filtering means for performing texture filtering on the original image to generate a first texture-filter image, the texture filtering being directed to processing involving the texture region; edge filtering means for performing edge filtering on the original image to generate a first edge-filter image, the edge filtering being directed to processing involving the edge region; texture combining means for adding together pixel values at corresponding positions of the original image and the first texture-filter image, using weights that are based on the texture weight, to generate a first texture-combination image; and edge combining means for adding together pixel values of pixels at corresponding positions of the first texture-combination image and the first edge-filter image, using weights that are based on the edge weight, to generate a first edge-combination image.

The confidence detecting means may detect the confidence of the edge direction on the basis of whether a pixel value calculated using pixels located on either side of the target pixel in the edge direction matches pixel values of pixels neighboring the target pixel.

As the contrast intensity, the contrast detecting means may detect a sum of values obtained for individual pairs of adjacent pixels in the first region, the values being obtained by, for each of the pairs of adjacent pixels, multiplying an absolute value of difference between pixel values of the pixels with a weight associated with a distance between the pixels.

The texture-contrast-weight setting means may set the texture-contrast weight so that the texture-contrast weight takes on a maximum value in a range where the contrast intensity is greater than or equal to a first contrast intensity and less than or equal to a second contrast intensity, the first contrast intensity and the second contrast intensity being predetermined contrast intensities that occur with high frequencies of occurrence in the texture region, so that the texture-contrast weight takes on a minimum value in a range where the contrast intensity is less than a third contrast intensity and in a range where the contrast intensity is greater than a fourth contrast intensity, the third contrast intensity and the fourth contrast intensity being predetermined intensities that occur with low frequencies of occurrence in the texture region, so that the texture-contrast weight increases as the contrast intensity increases in a range where the contrast intensity is greater than or equal to the third contrast intensity and less than the first contrast intensity, and so that the texture-contrast weight decreases as the contrast intensity increases in a range where the contrast intensity is greater than the second contrast intensity and less than the fourth contrast intensity. Furthermore, the first edge-contrast-weight setting means may set the first edge-contrast weight so that the first edge-contrast weight takes on a maximum value in a range where the contrast intensity is greater than a fifth contrast intensity, the fifth contrast intensity being a predetermined contrast intensity that occurs with a high frequency of occurrence in the edge region, so that the first edge-contrast weight takes on a minimum value in a range where the contrast intensity is less than a sixth contrast intensity, the sixth contrast intensity being a predetermined contrast intensity that occurs with a low frequency of occurrence in the edge region, and so that the first edge-contrast weight increases as the contrast intensity increases in a range where the contrast intensity is greater than or equal to the sixth contrast intensity and less than the fifth contrast intensity.

As the texture weight, the texture-weight setting means may set a sum of values obtained for the individual pixels in the second region, the values being obtained by, for each of the pixels, multiplying the confidence of the edge direction, the texture contrast weight, and a weight associated with the edge direction. Furthermore, as the edge weight, the edge-weight setting means may set a sum of values obtained for the individual pixels in the third region, the values being obtained by, for each of the pixels, multiplying the confidence of the edge direction, the first edge-contrast weight, and a weight associated with the edge direction.

The texture filtering means may perform filtering that enhances components in a predetermined frequency band of the original image. Furthermore, the edge filtering means may perform filtering that enhances edges in the original image.

The texture combining means may add together pixel values of pixels at corresponding positions of the original image and the first texture-filter image with a ratio of the pixel value of the first texture filter-image increased as the texture weight increases and with a ratio of the pixel value of the original image increased as the texture weight decreases. Furthermore, the edge combining means may add together the pixel values of the pixels at the corresponding positions of the first texture-combination image and the first edge-filter image with a ratio of the pixel value of the first edge-filter image increased as the edge weight increases and with a ratio of the pixel value of the first texture-combination image increased as the edge weight decreases.

The image processing apparatus may further include flat-contrast-weight setting means for setting a flat-contrast weight for the target pixel, the flat-contrast weight being a weight that is based on a degree of closeness of the contrast intensity of the target pixel to a predetermined contrast intensity that occurs with a high frequency of occurrence in the flat region; flat-weight setting means for setting a flat weight, the flat weight being a weight that is based on edge directions of individual pixels in a fourth region including and neighboring the target pixel, confidences of the edge directions of the individual pixels, and flat-contrast weights for the individual pixels; flat filtering means for performing flat filtering to generate a flat-filter image, the flat filtering being directed to processing involving the flat region; and flat combining means for adding together pixel values of pixels at corresponding positions of the original image and the flat-filter image, using weights that are based on the flat weight, to generate a flat-combination image. In this case, the texture combining means adds together pixel values of pixels at corresponding positions of the flat-combination image and the first texture-filter image, using weights that are based on the texture weight, to generate a second texture-combination image. Furthermore, the edge combining means adds together pixel values of pixels at corresponding positions of the second texture-combination image and the first edge-filter image, using weights that are based on the edge weight, to generate a second edge-combination image.

The flat-contrast-weight setting means may set the flat-contrast weight so that the flat-contrast weight takes on a maximum value in a range where the contrast intensity is less than or equal to a first contrast intensity, the first contrast intensity being a predetermined contrast intensity that occurs with a high frequency of occurrence in the flat region, so that the flat-contrast weight takes on a minimum value in a range where the contrast intensity is greater than a second contrast intensity, the second contrast intensity being a predetermined contrast intensity that occurs with a low frequency of occurrence in the flat region, and so that the flat-contrast weight decreases as the contrast intensity increases in a range where the contrast intensity is greater than the first contrast intensity and less than or equal to the second contrast intensity.

As the flat weight, the flat-weight setting means may set a sum of values obtained for the individual pixels in the fourth region, the values being obtained by, for each of the pixels, multiplying the confidence of the edge direction, the flat-contrast weight, and a weight associated with the edge direction.

The flat filtering means may perform filtering that attenuates components in a high-frequency band of the original image.

The flat combining means may together the pixel values of the pixels at the corresponding positions of the original image and the flat-filter image with a ratio of the pixel value of the flat-filter image increased as the flat weight increases and with the pixel value of the original image increased as the flat weight decreases. Furthermore, the texture combining means may add together the pixel values of the pixels at the corresponding positions of the flat-combination image and the first texture-filter image with a ratio of the pixel value of the first texture-filter image increased as the texture weight increases and with a ratio of the pixel value of the flat-combination image increased as the texture weight decreases. Furthermore, the edge combining means may add together the pixel values of the pixels at the corresponding positions of the second texture-combination image and the first edge-filter image with a ratio of the first edge-filter image increased as the edge weight increases and with a ratio of the second texture-combination image increased as the edge weight decreases.

The image processing apparatus may further include second edge-contrast-weight setting means for setting a second edge-contrast weight for the target pixel, the second edge-contrast weight being a weight that is based on a degree of closeness of the contrast intensity of the target pixel to a predetermined contrast intensity that occurs with a high frequency of occurrence in the edge region; direction selecting means for selecting a selecting direction for selecting pixels to be used for interpolation of the target pixel, on the basis of edge directions of individual pixels in a fourth region including and neighboring the target pixel, confidences of the edge directions of the individual pixels, and second edge-contrast weights for the individual pixels; slant-weight setting means for setting a slant weight, the slant weight being a weight that is based on edge directions of individual pixels in a fifth region including and neighboring the target pixel, confidences of the edge directions of the individual pixels, and second edge-contrast weights for the individual pixels; first interpolating means for generating a first interpolation image through interpolation of the original image by calculating a pixel value of the target pixel using pixels neighboring the target pixel on either side of the target pixel in the selecting direction; second interpolating means for generating a second interpolation image through interpolation of the original image in a manner different from the interpolation by the first interpolating means; and interpolation-image combining means for adding together pixel values of pixels at corresponding positions of the first interpolation image and the second interpolation image, using weights that are based on the slant weight, to generate an interpolation-combination image. In this case, the texture filtering means performs the texture filtering on the interpolation-combination image to generate a second texture-filter image, the edge filtering means performs the edge filtering on the interpolation-combination image to generate a second edge-filter image, the texture combining means adds together pixel values of pixels at corresponding positions of the interpolation-combination image and the second texture-filter image, using weights that are based on the texture weight, to generate a second texture-combination image, and the edge combining means adds together pixel values of pixels at corresponding positions of the second texture-combination image and the second edge-filter image, using weights that are based on the edge weight, to generate a second edge-combination image.

The direction selecting means may select the selecting direction on the basis of a distribution of the edge directions of pixels having high confidences of the edge directions and large second edge-contrast weights among the pixels in the fourth region.

As the slant weight, the slant-weight setting means may set a sum of values obtained for the individual pixels in the fifth region, the values being obtained by, for each of the pixels, multiplying the confidence of the edge direction, the second edge-contrast weight, and a weight associated with the edge direction.

The texture combining means may add together the pixel values of the pixels at the corresponding positions of the interpolation-combination image and the second texture-filter image with a ratio of the pixel value of the second texture-filter image increased as the texture weight increases and with a ratio of the pixel value of the interpolation-combination image increased as the texture weight decreases. Furthermore, the edge combining means may add together the pixel values of the pixels at the corresponding positions of the second texture-combination image and the second edge-filter image with a ratio of the pixel value of the second edge-filter image increased as the edge weight increases and with a ratio of the pixel value of the second texture-combination image increased as the edge weight decreases.

According to another embodiment of the present invention, there is provided an image processing method, a program, or a recording medium having recorded the program thereon, the image processing method or the program including the steps of detecting an edge direction at a target pixel being considered in an original image; detecting a confidence of the edge direction; detecting a contrast intensity of the target pixel, the contrast intensity indicating an intensity of contrast in a first region including and neighboring the target pixel; setting a texture-contrast weight for the target pixel, the texture-contrast weight being a weight that is based on a degree of closeness of the contrast intensity of the target pixel to a predetermined contrast intensity that occurs with a high frequency of occurrence in a texture region, the texture region being a region where pixel values vary by larger amounts than in a flat region and by smaller amounts than in an edge region, the flat region being a region where pixel values are substantially constant, and the edge region being a region where pixel values vary sharply; setting an edge-contrast weight for the target pixel, the edge-contrast weight being a weight that is based on a degree of closeness of the contrast intensity of the target pixel to a predetermined contrast intensity that occurs with a high frequency of occurrence in the edge region; setting a texture weight, the texture weight being a weight that is based on edge directions of individual pixels in a second region including and neighboring the target pixel, confidences of the edge directions of the individual pixels, and texture-contrast weights for the individual pixels; setting an edge weight, the edge weight being a weight that is based on edge directions of individual pixels in a third region including and neighboring the target pixel, confidences of the edge directions of the individual pixels, and edge-contrast weights for the individual pixels; performing texture filtering on the original image to generate a texture-filter image, the texture filtering being directed to processing involving the texture region; performing edge filtering on the original image to generate an edge-filter image, the edge filtering being directed to processing involving the edge region; adding together pixel values at corresponding positions of the original image and the texture-filter image, using weights that are based on the texture weight, to generate a texture-combination image; and adding together pixel values of pixels at corresponding positions of the texture-combination image and the edge-filter image, using weights that are based on the edge weight, to generate an edge-combination image.

According to these embodiments of the present invention, an edge direction at a target pixel being considered in an original image is detected, a confidence of the edge direction is detected; a contrast intensity of the target pixel is detected; the contrast intensity indicating an intensity of contrast in a first region including and neighboring the target pixel; a texture-contrast weight for the target pixel is set, the texture-contrast weight being a weight that is based on a degree of closeness of the contrast intensity of the target pixel to a predetermined contrast intensity that occurs with a high frequency of occurrence in a texture region, the texture region being a region where pixel values vary by larger amounts than in a flat region and by smaller amounts than in an edge region, the flat region being a region where pixel values are substantially constant, and the edge region being a region where pixel values vary sharply; an edge-contrast weight for the target pixel is set, the edge-contrast weight being a weight that is based on a degree of closeness of the contrast intensity of the target pixel to a predetermined contrast intensity that occurs with a high frequency of occurrence in the edge region; a texture weight is set, the texture weight being a weight that is based on edge directions of individual pixels in a second region including and neighboring the target pixel, confidences of the edge directions of the individual pixels, and texture-contrast weights for the individual pixels; an edge weight is set, the edge weight being a weight that is based on edge directions of individual pixels in a third region including and neighboring the target pixel, confidences of the edge directions of the individual pixels, and edge-contrast weights for the individual pixels; texture filtering is performed on the original image to generate a texture-filter image, the texture filtering being directed to processing involving the texture region; edge filtering is performed on the original image to generate an edge-filter image, the edge filtering being directed to processing involving the edge region; pixel values at corresponding positions of the original image and the texture-filter image are added together, using weights that are based on the texture weight, to generate a texture-combination image; and pixel values of pixels at corresponding positions of the texture-combination image and the edge-filter image are added together, using weights that are based on the edge weight, to generate an edge-combination image.

Accordingly, it is possible to detect image characteristics more accurately. Furthermore, it is possible to adjust image quality more suitably in accordance with image characteristics.

DESCRIPTION OF THE PREFERRED EMBODIMENTS

Figure 1:
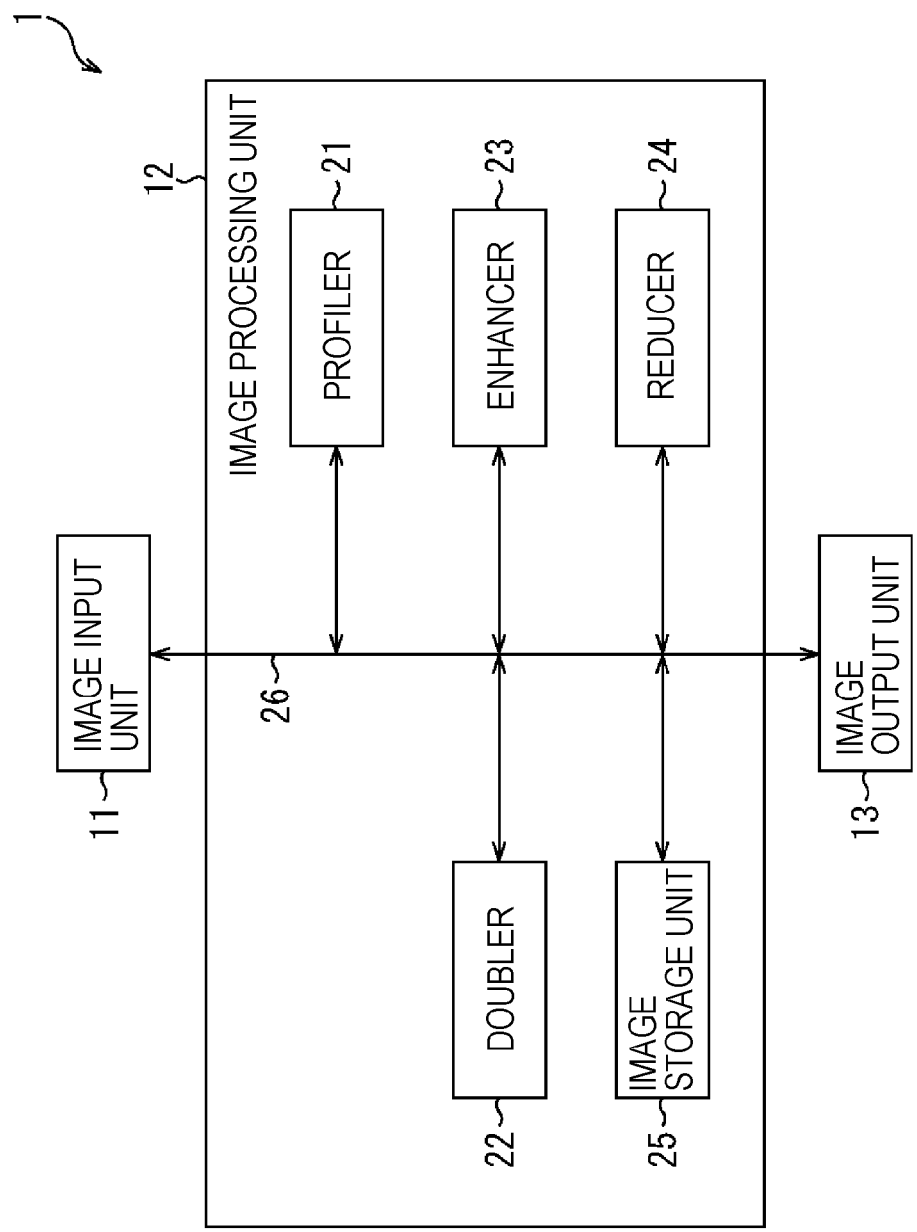
FIG. 1 is a block diagram of an image processing apparatus according to an embodiment of the present invention.

Before describing embodiments of the present invention, examples of corresponding relationship between the features of the present invention and the embodiments described in this specification and shown in the drawings will be described below. This description is intended to ensure that embodiments supporting the present invention are described in this specification. Thus, even if a certain embodiment is not described herein as corresponding to certain features of the present invention, that does not necessarily mean that the embodiment does not correspond to those features. Conversely, even if an embodiment is described herein as corresponding to certain features, that does not necessarily mean that the embodiment does not correspond to other features.

Figure 2:
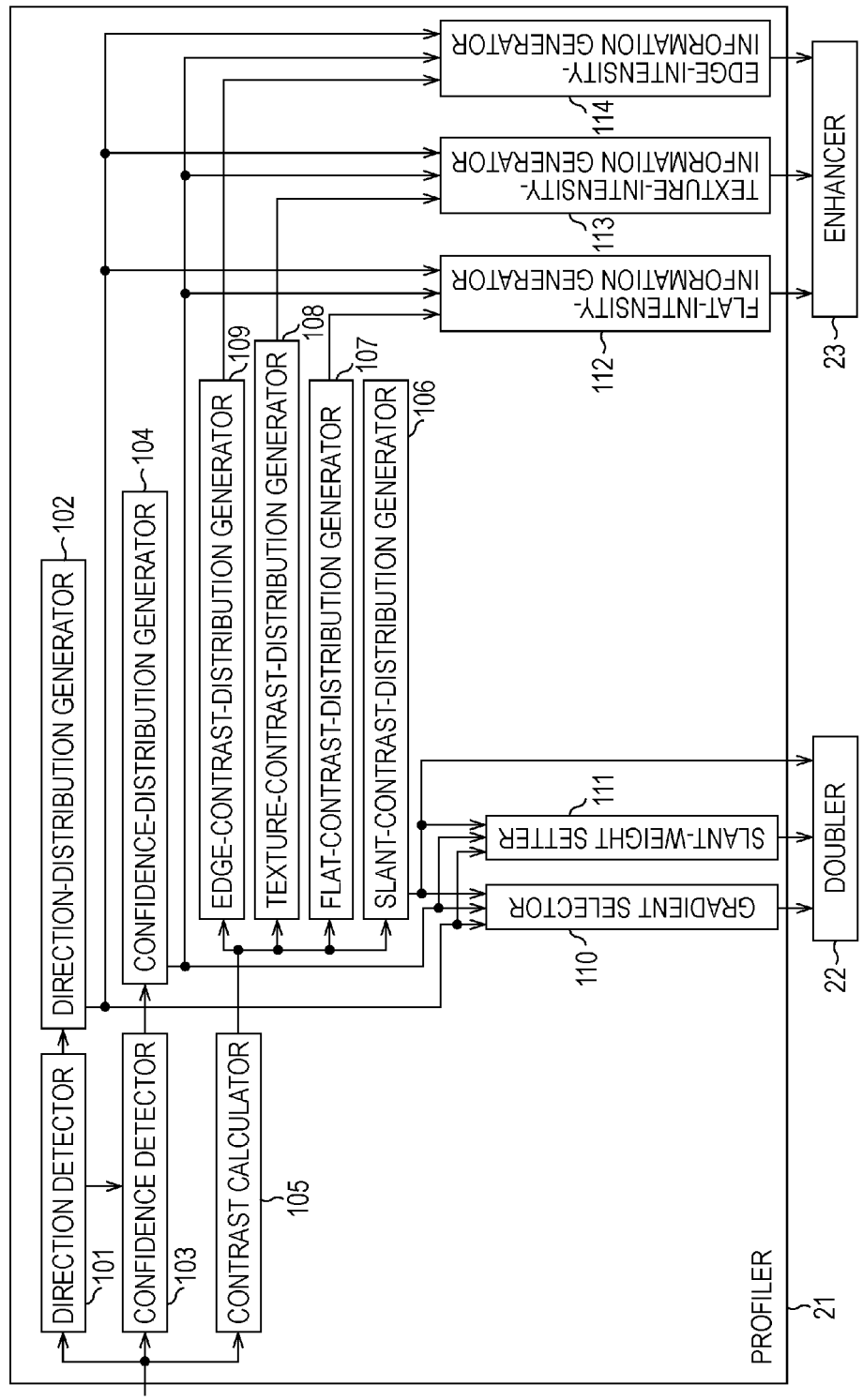
FIG. 2 is a block diagram showing an example functional configuration of a profiler shown in FIG. 1.
Figure 18:
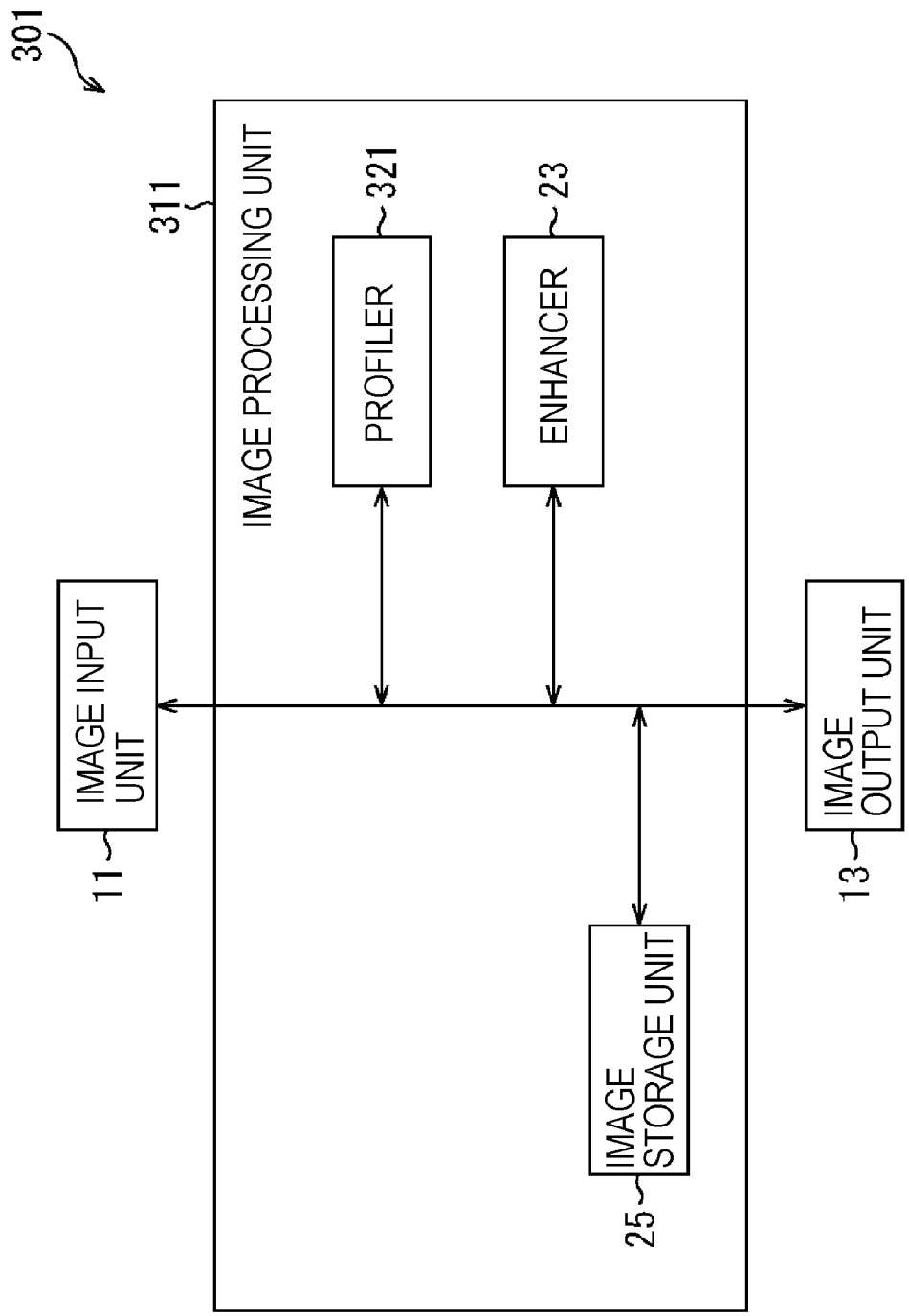
FIG. 18 is a block diagram showing an image processing apparatus according to another embodiment of the present invention.
Figure 19:
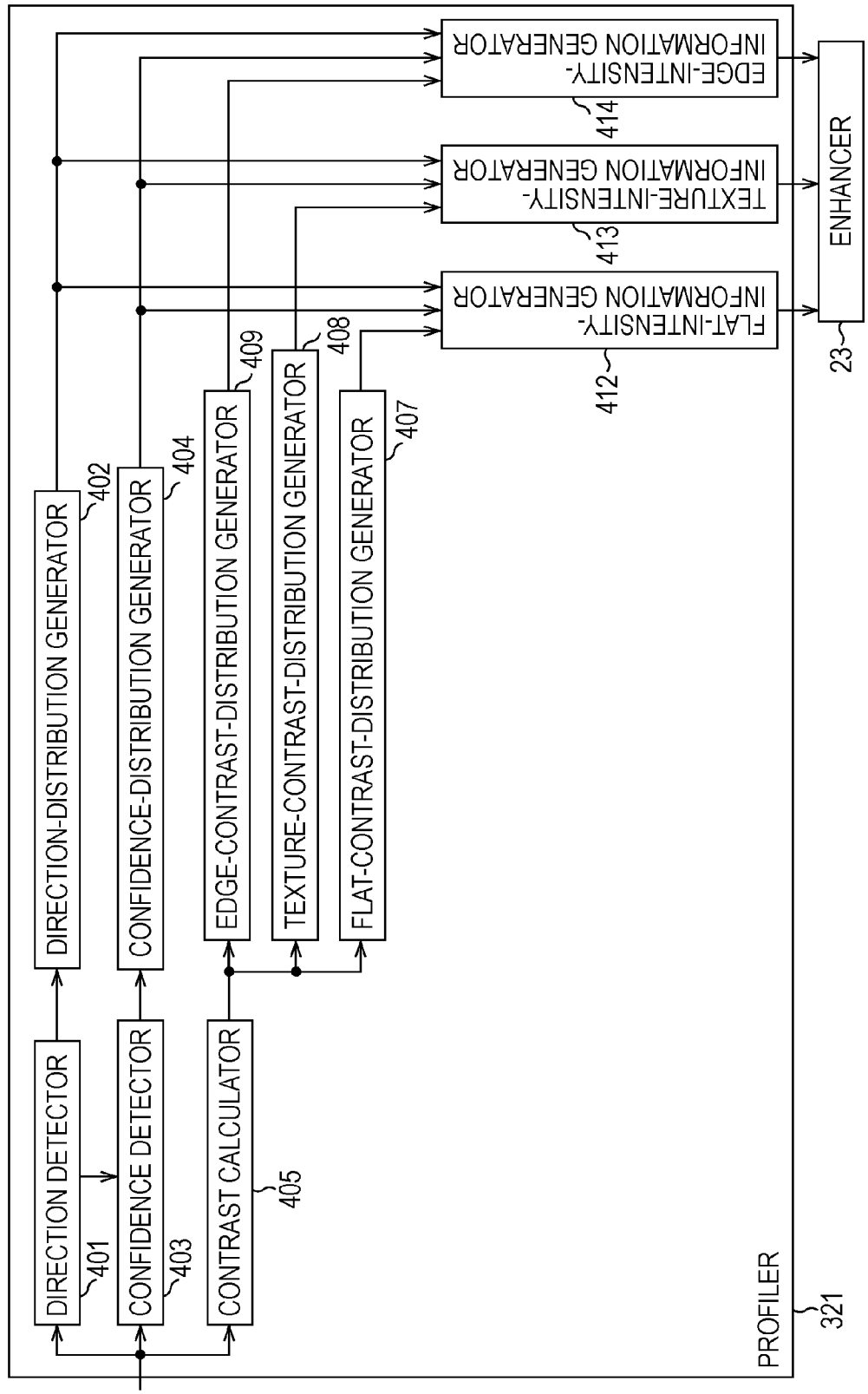
FIG. 19 is a block diagram showing an example configuration of a profiler shown in FIG. 18.

An image processing apparatus (e.g., an image processing apparatus 1 shown in FIG. 1 or an image processing apparatus 301 shown in FIG. 18) according to an embodiment of the present invention including edge-direction detecting means (e.g., a direction detector 101 shown in FIG. 2 or a direction detector 401 shown in FIG. 19) for detecting an edge direction at a target pixel being considered in an original image; confidence detecting means (a confidence detector 103 shown in FIG. 2 or a confidence detector 403 shown in FIG. 19) for detecting a confidence of the edge direction; contrast detecting means (e.g., a contrast calculator 105 shown in FIG. 2 or a contrast calculator 405 shown in FIG. 19) for detecting a contrast intensity of the target pixel, the contrast intensity indicating an intensity of contrast in a first region including and neighboring the target pixel; texture-contrast-weight setting means (e.g., a texture-contrast-distribution generator 108 shown in FIG. 2 or a texture-contrast-distribution generator 408 shown in FIG. 19) for setting a texture-contrast weight (e.g., weight_contrast_T) for the target pixel, the texture-contrast weight being a weight that is based on a degree of closeness of the contrast intensity of the target pixel to a predetermined contrast intensity that occurs with a high frequency of occurrence in a texture region, the texture region being a region where pixel values vary by larger amounts than in a flat region and by smaller amounts than in an edge region, the flat region being a region where pixel values are substantially constant, and the edge region being a region where pixel values vary sharply; first edge-contrast-weight setting means (e.g., an edge-contrast-distribution generator 109 shown in FIG. 2 or an edge-contrast-distribution generator 409 shown in FIG. 19) for setting a first edge-contrast weight (e.g., weight_contrast_E) for the target pixel, the first edge-contrast weight being a weight that is based on a degree of closeness of the contrast intensity of the target pixel to a predetermined contrast intensity that occurs with a high frequency of occurrence in the edge region; texture-weight setting means (e.g., a texture-intensity-information generator 113 shown in FIG. 2 or a texture-intensity-information generator 413 shown in FIG. 19) for setting a texture weight (e.g., weight_texture), the texture weight being a weight that is based on edge directions of individual pixels in a second region including and neighboring the target pixel, confidences of the edge directions of the individual pixels, and texture-contrast weights for the individual pixels; edge-weight setting means (e.g., an edge-intensity-information generator 114 shown in FIG. 2 or an edge-intensity-information generator 414 shown in FIG. 19) for setting an edge weight (e.g., weight_edge), the edge weight being a weight that is based on edge directions of individual pixels in a third region including and neighboring the target pixel, confidences of the edge directions of the individual pixels, and first edge-contrast weights for the individual pixels; texture filtering means (e.g., a texture filter 203 shown in FIG. 4) for performing texture filtering on the original image to generate a first texture-filter image, the texture filtering being directed to processing involving the texture region; edge filtering means (e.g., an edge filter 205 shown in FIG. 4) for performing edge filtering on the original image to generate a first edge-filter image, the edge filtering being directed to processing involving the edge region; texture combining means (e.g., an adaptive texture mixer 204 shown in FIG. 4) for adding together pixel values at corresponding positions of the original image and the first texture-filter image, using weights that are based on the texture weight, to generate a first texture-combination image; and edge combining means (e.g., an adaptive edge mixer 206 shown in FIG. 4) for adding together pixel values of pixels at corresponding positions of the first texture-combination image and the first edge-filter image, using weights that are based on the edge weight, to generate a first edge-combination image.

The image processing apparatus may further include flat-contrast-weight setting means (e.g., a flat-contrast-distribution generator 107 shown in FIG. 2 or a flat-contrast-distribution generator 407 shown in FIG. 19) for setting a flat-contrast weight (e.g., weight_contrast_F) for the target pixel, the flat-contrast weight being a weight that is based on a degree of closeness of the contrast intensity of the target pixel to a predetermined contrast intensity that occurs with a high frequency of occurrence in the flat region; flat-weight setting means (e.g., a flat-intensity-information generator 112 shown in FIG. 2 or a flat-intensity-information generator 412 shown in FIG. 19) for setting a flat weight (e.g., weight_flat), the flat weight being a weight that is based on edge directions of individual pixels in a fourth region including and neighboring the target pixel, confidences of the edge directions of the individual pixels, and flat-contrast weights for the individual pixels; flat filtering means (e.g., a flat filter 201 shown in FIG. 4) for performing flat filtering to generate a flat-filter image, the flat filtering being directed to processing involving the flat region; and flat combining means (e.g., an adaptive flat mixer 202 shown in FIG. 4) for adding together pixel values of pixels at corresponding positions of the original image and the flat-filter image, using weights that are based on the flat weight, to generate a flat-combination image. In this case, the texture combining means adds together pixel values of pixels at corresponding positions of the flat-combination image and the first texture-filter image, using weights that are based on the texture weight, to generate a second texture-combination image. Furthermore, the edge combining means adds together pixel values of pixels at corresponding positions of the second texture-combination image and the first edge-filter image, using weights that are based on the edge weight, to generate a second edge-combination image.

The image processing apparatus may further include second edge-contrast-weight setting means (e.g., a slant-contrast-distribution generator 106 shown in FIG. 2) for setting a second edge-contrast weight (e.g., weight_contrast_S) for the target pixel, the second edge-contrast weight being a weight that is based on a degree of closeness of the contrast intensity of the target pixel to a predetermined contrast intensity that occurs with a high frequency of occurrence in the edge region; direction selecting means (e.g., a gradient selector 110 shown in FIG. 2) for selecting a selecting direction for selecting pixels to be used for interpolation of the target pixel, on the basis of edge directions of individual pixels in a fourth region including and neighboring the target pixel, confidences of the edge directions of the individual pixels, and second edge-contrast weights for the individual pixels; slant-weight setting means (e.g., a slant-weight setter 111 shown in FIG. 2) for setting a slant weight (e.g., weight_slant), the slant weight being a weight that is based on edge directions of individual pixels in a fifth region including and neighboring the target pixel, confidences of the edge directions of the individual pixels, and second edge-contrast weights for the individual pixels; first interpolating means (e.g., a statistical gradient interpolator 152 shown in FIG. 3) for generating a first interpolation image through interpolation of the original image by calculating a pixel value of the target pixel using pixels neighboring the target pixel on either side of the target pixel in the selecting direction; second interpolating means (e.g., a linear interpolator 151 shown in FIG. 3) for generating a second interpolation image through interpolation of the original image in a manner different from the interpolation by the first interpolating means; and interpolation-image combining means (e.g., a slant combiner 153 shown in FIG. 3) for adding together pixel values of pixels at corresponding positions of the first interpolation image and the second interpolation image, using weights that are based on the slant weight, to generate an interpolation-combination image. In this case, the texture filtering means performs the texture filtering on the interpolation-combination image to generate a second texture-filter image, the edge filtering means performs the edge filtering on the interpolation-combination image to generate a second edge-filter image, the texture combining means adds together pixel values of pixels at corresponding positions of the interpolation-combination image and the second texture-filter image, using weights that are based on the texture weight, to generate a second texture-combination image, and the edge combining means adds together pixel values of pixels at corresponding positions of the second texture-combination image and the second edge-filter image, using weights that are based on the edge weight, to generate a second edge-combination image.

Figure 16:
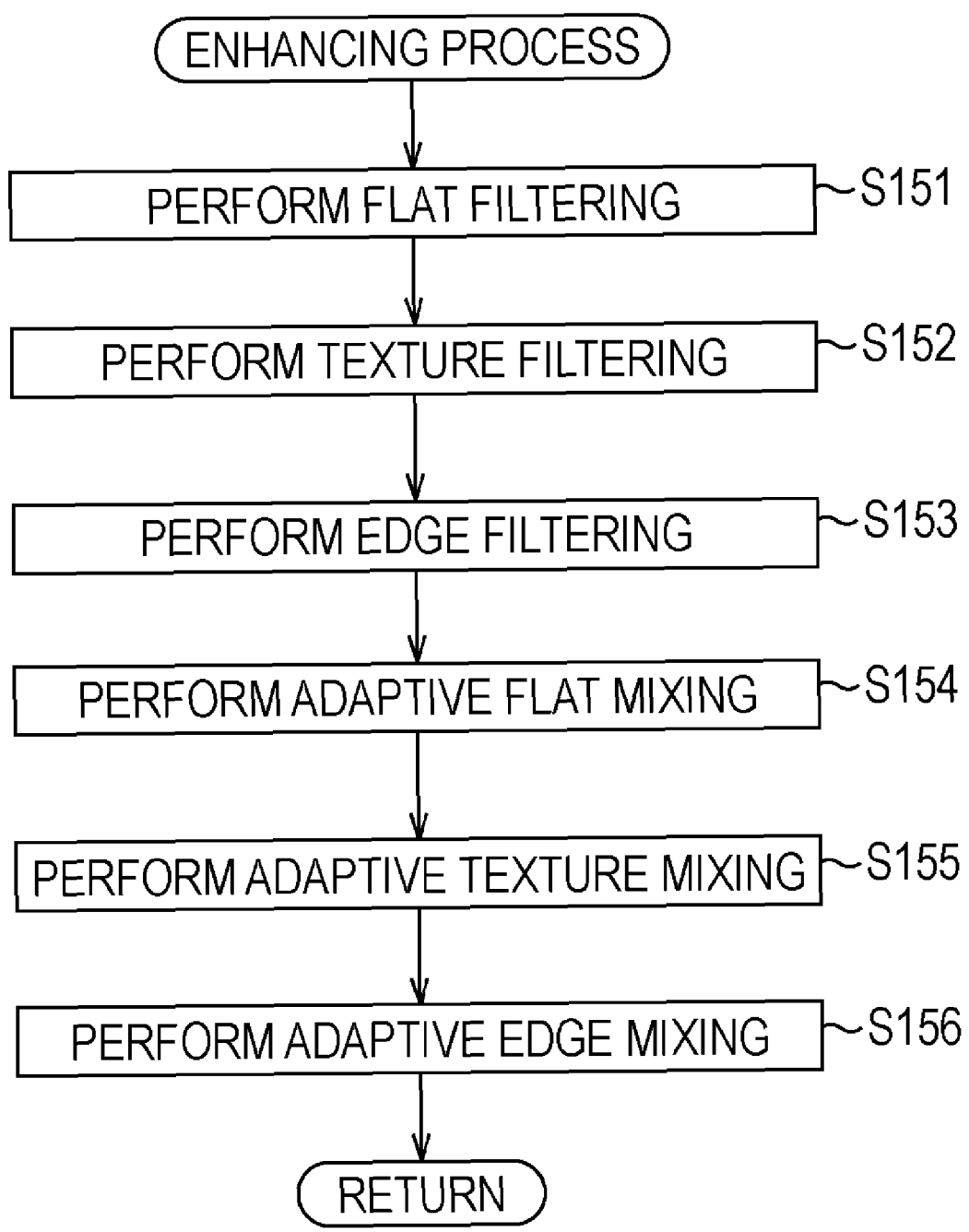
FIG. 16 is a flowchart showing details of an enhancing process executed in steps S23 and S26 shown in FIG. 6.

An image processing method, a program, or a recording medium having recorded the program thereon according to another embodiment of the present invention includes the steps of detecting an edge direction at a target pixel being considered in an original image (e.g., step S56 shown in FIG. 7 or step S256 shown in FIG. 21); detecting a confidence of the edge direction (e.g., step S57 shown in FIG. 7 or step S257 shown in FIG. 21); detecting a contrast intensity of the target pixel (e.g., step S60 shown in FIG. 7 or step S260 shown in FIG. 21), the contrast intensity indicating an intensity of contrast in a first region including and neighboring the target pixel; setting a texture-contrast weight (e.g., weight_contrast_T) for the target pixel (e.g., step S66 shown in FIG. 8 or step S265 shown in FIG. 22), the texture-contrast weight being a weight that is based on a degree of closeness of the contrast intensity of the target pixel to a predetermined contrast intensity that occurs with a high frequency of occurrence in a texture region, the texture region being a region where pixel values vary by larger amounts than in a flat region and by smaller amounts than in an edge region, the flat region being a region where pixel values are substantially constant, and the edge region being a region where pixel values vary sharply; setting an edge-contrast weight (e.g., weight_contrast_E) for the target pixel (e.g., step S67 shown in FIG. 8 or step S266 shown in FIG. 22), the edge-contrast weight being a weight that is based on a degree of closeness of the contrast intensity of the target pixel to a predetermined contrast intensity that occurs with a high frequency of occurrence in the edge region; setting a texture weight (e.g., weight_texture) (e.g., step S71 shown in FIG. 8 or step S268 shown in FIG. 22), the texture weight being a weight that is based on edge directions of individual pixels in a second region including and neighboring the target pixel, confidences of the edge directions of the individual pixels, and texture-contrast weights for the individual pixels; setting an edge weight (e.g., weight_edge) (e.g., step S70 shown in FIG. 8 or step S267 shown in FIG. 22), the edge weight being a weight that is based on edge directions of individual pixels in a third region including and neighboring the target pixel, confidences of the edge directions of the individual pixels, and edge-contrast weights for the individual pixels; performing texture filtering on the original image to generate a texture-filter image (e.g., step S152 shown in FIG. 16), the texture filtering being directed to processing involving the texture region; performing edge filtering on the original image to generate an edge-filter image (e.g., step S153 shown in FIG. 16), the edge filtering being directed to processing involving the edge region; adding together pixel values at corresponding positions of the original image and the texture-filter image, using weights that are based on the texture weight, to generate a texture-combination image (e.g., step S155 shown in FIG. 16); and adding together pixel values of pixels at corresponding positions of the texture-combination image and the edge-filter image, using weights that are based on the edge weight, to generate an edge-combination image (e.g., step S156 shown in FIG. 16).

Now, embodiments of the present invention will be described with reference to the drawings.

FIG. 1 is a block diagram showing an image processing apparatus according to an embodiment of the present invention. An image processing apparatus 1 according to this embodiment includes an image input unit 11, an image processing unit 12, and an image output unit 13.

The image input unit 11 inputs an image that is to be processed (hereinafter referred to as an input image), e.g., an image read from a recording medium or an image transmitted from an external device, to the image processing unit 12.

Figure 5:
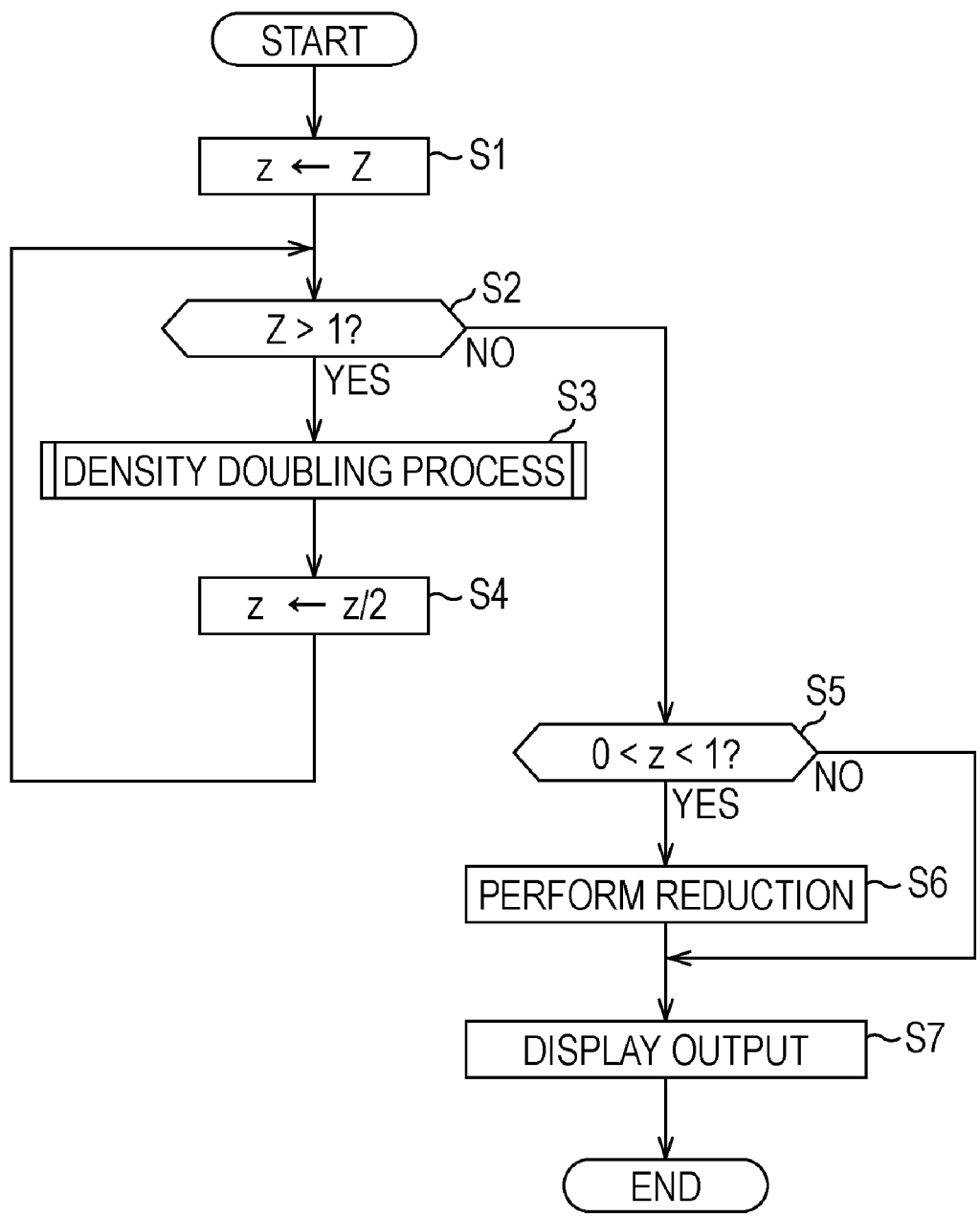
FIG. 5 is a flowchart of an image-magnification-factor changing process executed by the image processing apparatus shown in FIG. 1.

The image processing unit 12 converts the resolution of the input image (i.e., enlarges or reduces the input image), as will be described later mainly with reference to FIG. 5. The image processing unit 12 includes a profiler 21, a doubler 22, an enhancer 23, a reducer 24, and an image storage unit 25. The profiler 21, the doubler 22, the enhancer 23, the reducer 24, and the image storage unit 25 are connected to each other via a bus 26. The bus 26 is also connected to the image input unit 11 and the image output unit 13. Although the components of the image processing apparatus 1 exchange information with each other via the bus 26, the bus 26 will not be specifically described hereinafter.

Figure 7:
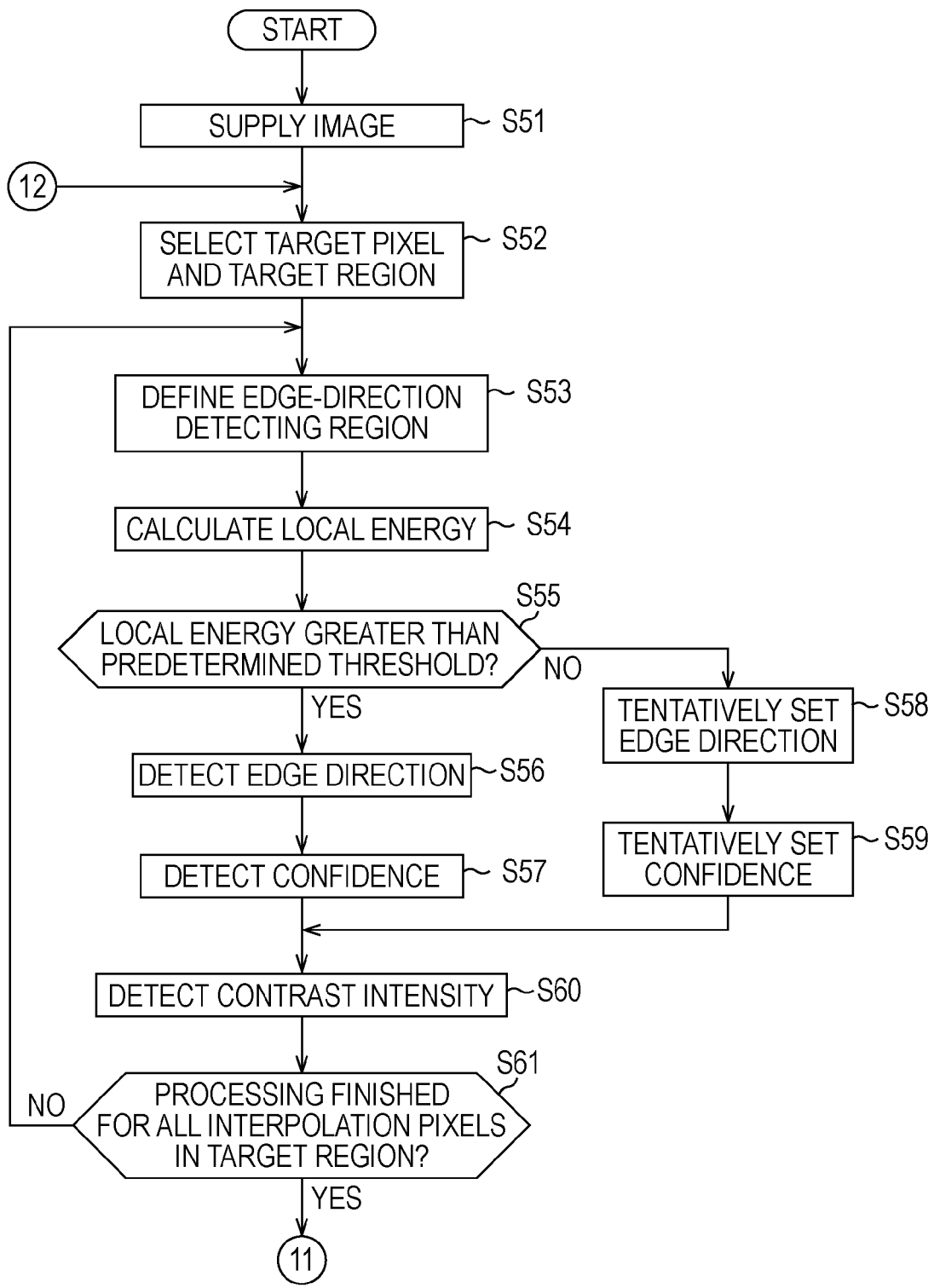
FIG. 7 is a flowchart showing details of a profiling process executed in steps S21 and S24 in FIG. 6.
Figure 8:
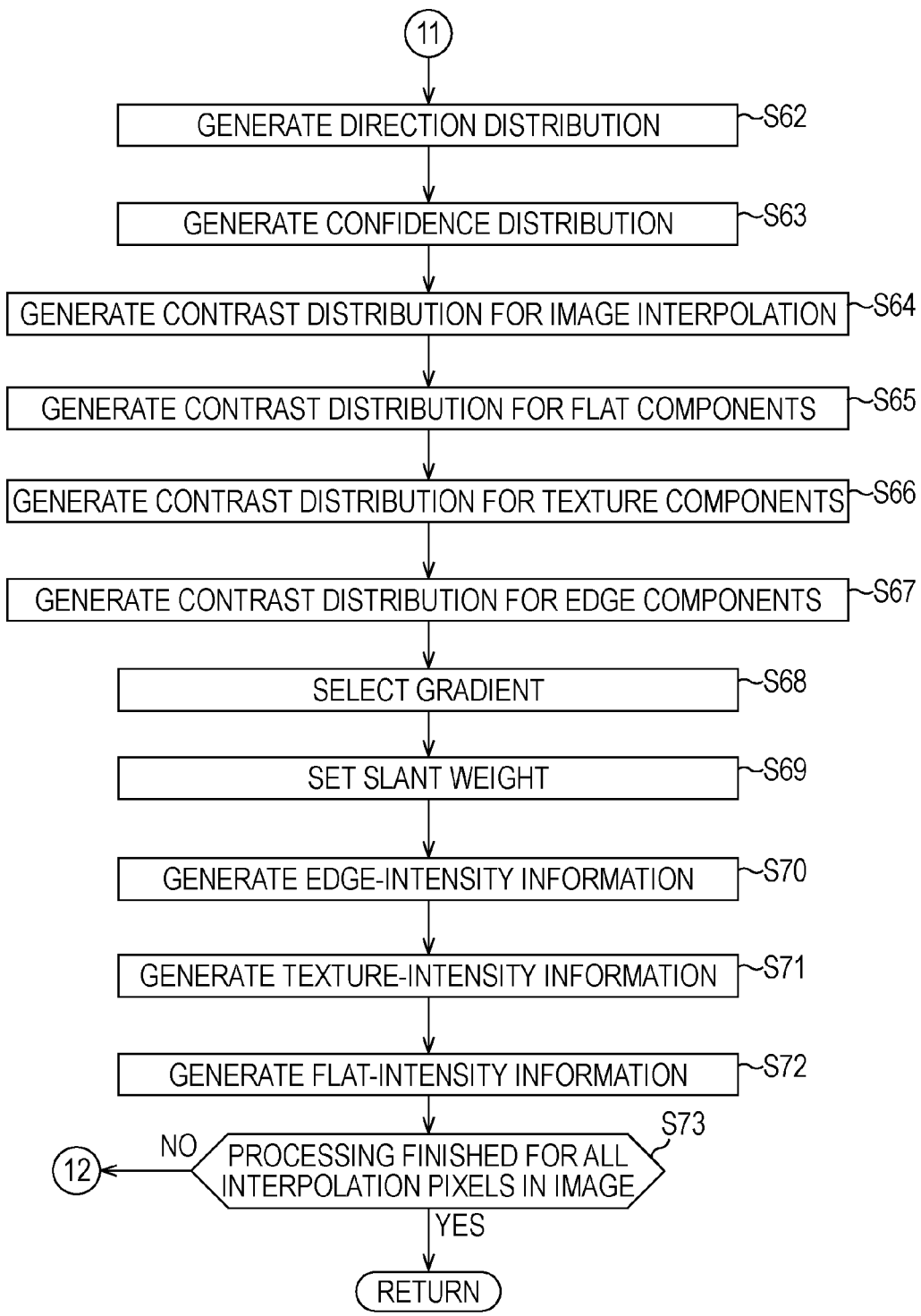
FIG. 8 is a flowchart showing details of the profiling process executed in steps S21 and S24 in FIG. 6.

The profiler 21 executes a profiling process, as will be described later mainly with reference to FIGS. 7 and 8. More specifically, the profiler 21 detects directions of edges of an image input from outside, and confidences of the edges. Furthermore, the profiler 21 detects the intensity of contrast of the image input from outside. Furthermore, the profiler 21 selects a direction for selecting pixels to be used for interpolation of a target pixel, and supplies information indicating the result of the selection to the doubler 22.

Furthermore, the profiler 21 sets a weight that is based on a prominence of edge direction, used by the doubler 22 to combine images. The prominence of edge direction indicates whether an edge direction is prominent or ambiguous in a region of a target pixel and neighboring pixels in an image. For example, the prominence of edge direction is considered to be high when edges in a target region have high intensities and substantially uniform directions, while the prominence of edge direction is considered to be low when the edges have low intensities or varied directions. The profiler 21 supplies information indicating the prominence of edge direction to the doubler 22.

Furthermore, the profiler 21 sets a weight that is based on an intensity of flat components of images (hereinafter referred to as a flat intensity), used by the enhancer 23 to combine the images. The flat components refer to pixels constituting a flat region in an image, where pixel values are substantially constant. The flat intensity is a value reflecting a ratio of flat components in a target region of an image. The flat intensity becomes higher as the amount of change in pixel value relative to the amount of change in position in the target region becomes smaller, while the flat intensity becomes lower as the amount of change in pixel value relative to the amount of change in position becomes larger. The profiler 21 supplies information indicating the weight to the enhancer 23.

Furthermore, the profiler 21 sets a weight that is based on an intensity of texture components of images (hereinafter referred to as a texture intensity), used by the enhancer 23 to combine the images. The texture components refer to pixels constituting a texture region, where pixel values vary sharply by a certain degree greater than in the flat region, as in the case of the texture of the surface of an object. The texture intensity refers to a value reflecting a ratio of texture components in a target region of an image. The texture intensity becomes higher as the amount of change in pixel value relative to the amount of change in position in the target region becomes closer to a certain degree, while the texture intensity becomes lower as the amount of change in pixel value relative to the amount of change in position varies from the certain degree. The profiler 21 supplies information indicating the weight to the enhancer 23.

Furthermore, the profiler 21 sets a weight that is based on an intensity of edge components of images (hereinafter referred to as an edge intensity), used by the enhancer 23 to combine the images. The edge components refer to pixels constituting edges of images and vicinities thereof. The edge intensity refers to a value reflecting a ratio of edge components in a target region of an image. The edge intensity becomes higher as the amount of change in pixel value relative to the amount of change in position in the target region becomes larger, while the edge intensity becomes lower as the amount of change in pixel value relative to the amount of change in position becomes smaller. The profiler 21 supplies information indicating the weight to the enhancer 23.

Figure 15:
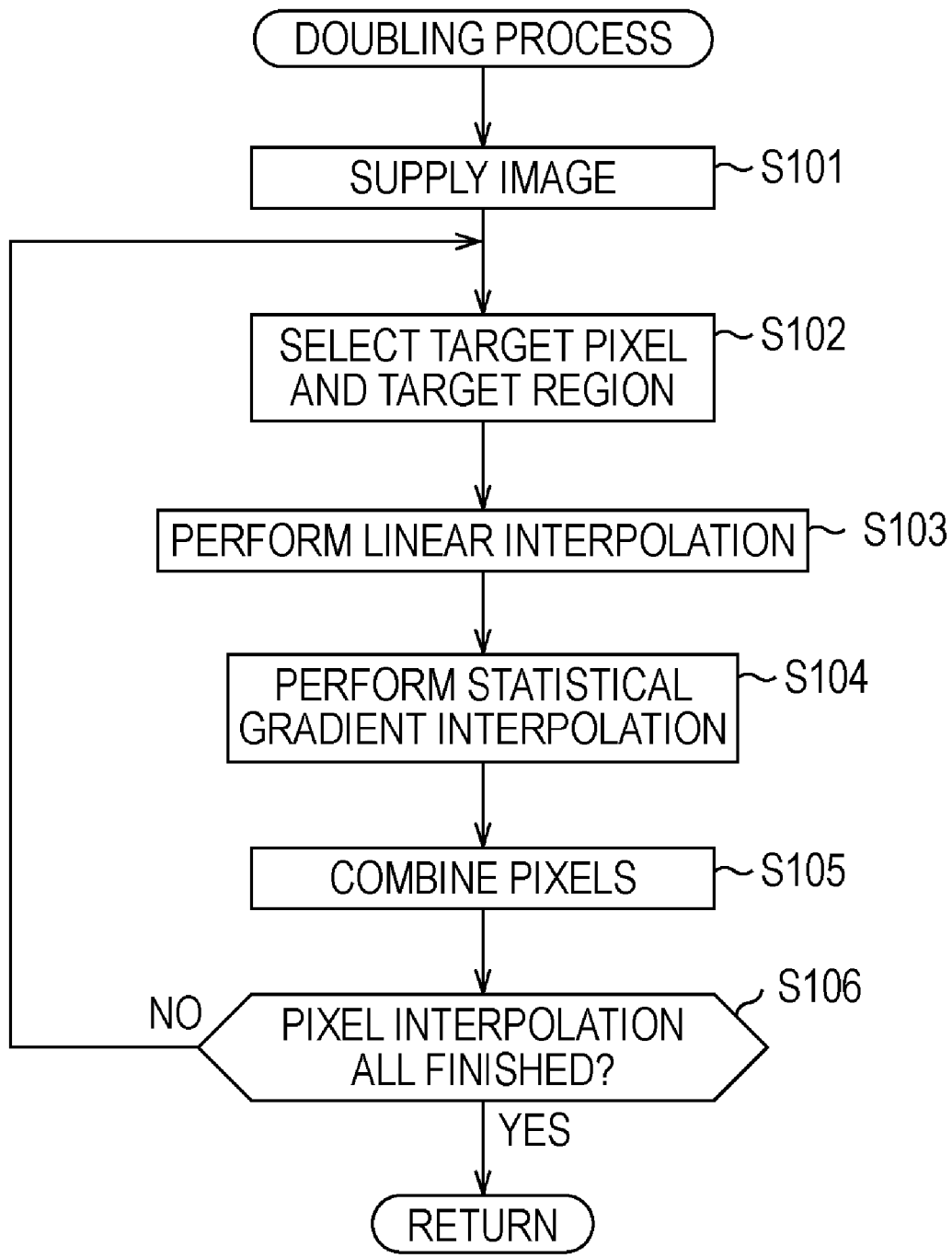
FIG. 15 is a flowchart showing details of a doubling process executed in steps S22 and S25 shown in FIG. 6.

The doubler 22 executes a doubling process to double the horizontal or vertical resolution of an image input from outside, as will be described later mainly with reference to FIG. 15. The doubler 22 supplies an image obtained through the doubling process to the image storage unit 25.

The enhancer 23 executes an enhancing process to adjust the image quality of an image input from outside, as will be described later mainly with reference to FIG. 16. The enhancer 23 supplies an image obtained through the enhancing process to the image storage unit 25.

The reducer 24 reduces the image by reducing the resolution of an image input from outside, according to a predetermined method. The method of reducing the image is not limited to a particular method. For example, the reducer 24 may reduce the image using a bicubic filter. The reducer 24 supplies an image obtained through the reduction to the image storage unit 25.

The image storage unit 25 includes a storage device so that images supplied from the image input unit 11, the profiler 21, the doubler 22, the enhancer 23, or the reducer 24 can be temporarily stored therein. Furthermore, as needed, the image storage unit 25 supplies images stored therein to the image output unit 13, the profiler 21, the doubler 22, the enhancer 23, or the reducer 24.

The image output unit 13 displays an image on a display (not shown), such as an image output from the image processing unit 12, records the image on a recording medium, or sends the image to another apparatus via a transmission medium.

FIG. 2 is a block diagram showing an example configuration of the profiler 21. The profiler 21 includes a direction detector 101, a direction-distribution generator 102, a confidence detector 103, a confidence-distribution generator 104, a contrast calculator 105, a slant-contrast-distribution generator 106, a flat-contrast-distribution generator 107, a texture-contrast-distribution generator 108, an edge-contrast-distribution generator 109, a gradient selector 110, a slant-weight setter 111, a flat-intensity-information generator 112, a texture-intensity-information generator 113, and an edge-intensity-information generator 114.

The direction detector 101 detects directions of edges in an image input from outside, as will be described later mainly with reference to FIG. 7. The direction detector 101 supplies edge-direction information indicating the edge directions to the direction-distribution generator 102 and the confidence detector 103.

Figure 11:
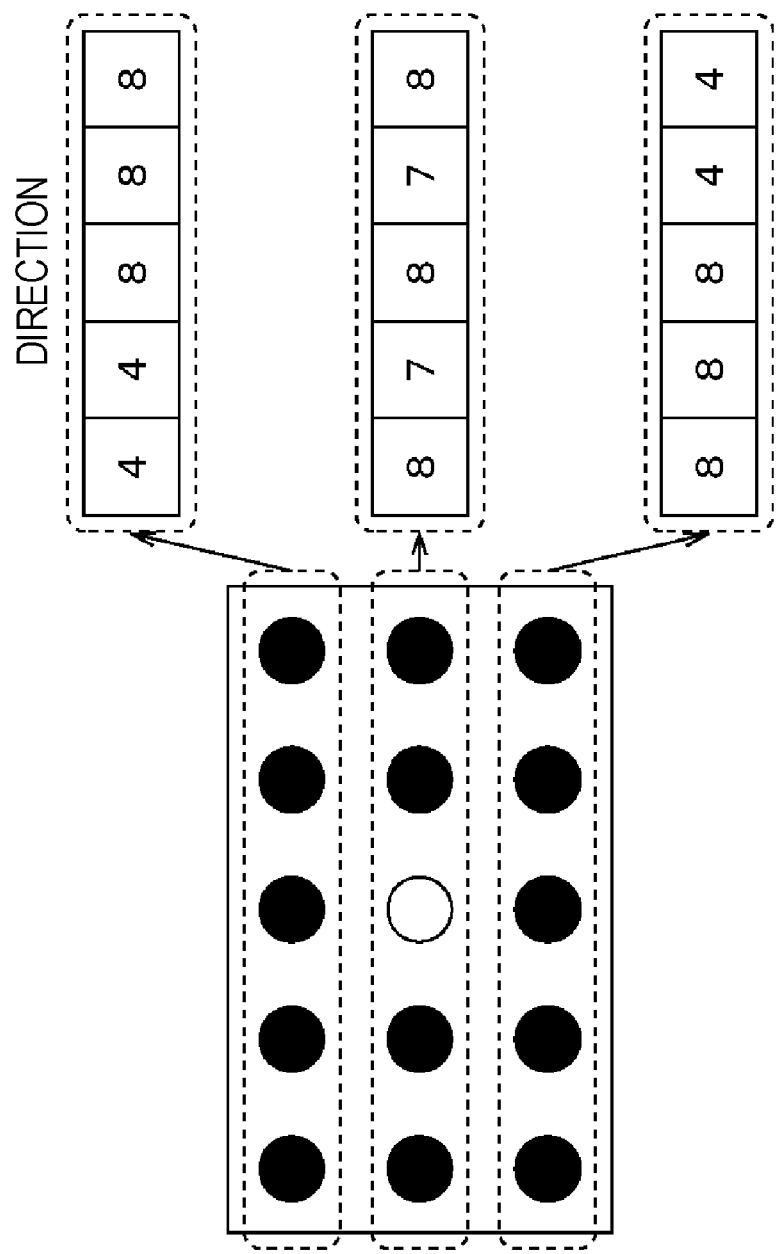
FIG. 11 is a diagram showing an example of direction distribution.

The direction-distribution generator 102 generates a direction distribution indicating the distribution of the edge directions detected by the direction detector 101, as will be described later with reference to FIG. 11. The direction-distribution generator 102 supplies direction-distribution information indicating the direction distribution to the gradient selector 110, the slant-weight setter 111, the flat-intensity-information generator 112, the texture-intensity-information generator 113, and the edge-intensity-information generator 114.

The confidence detector 103 detects confidences of the edge directions detected by the direction detector 101 regarding the image input from outside, as will be described later mainly with reference to FIG. 7. The confidence detector 103 supplies confidence information indicating the confidences to the confidence-distribution generator 104.

Figure 12:
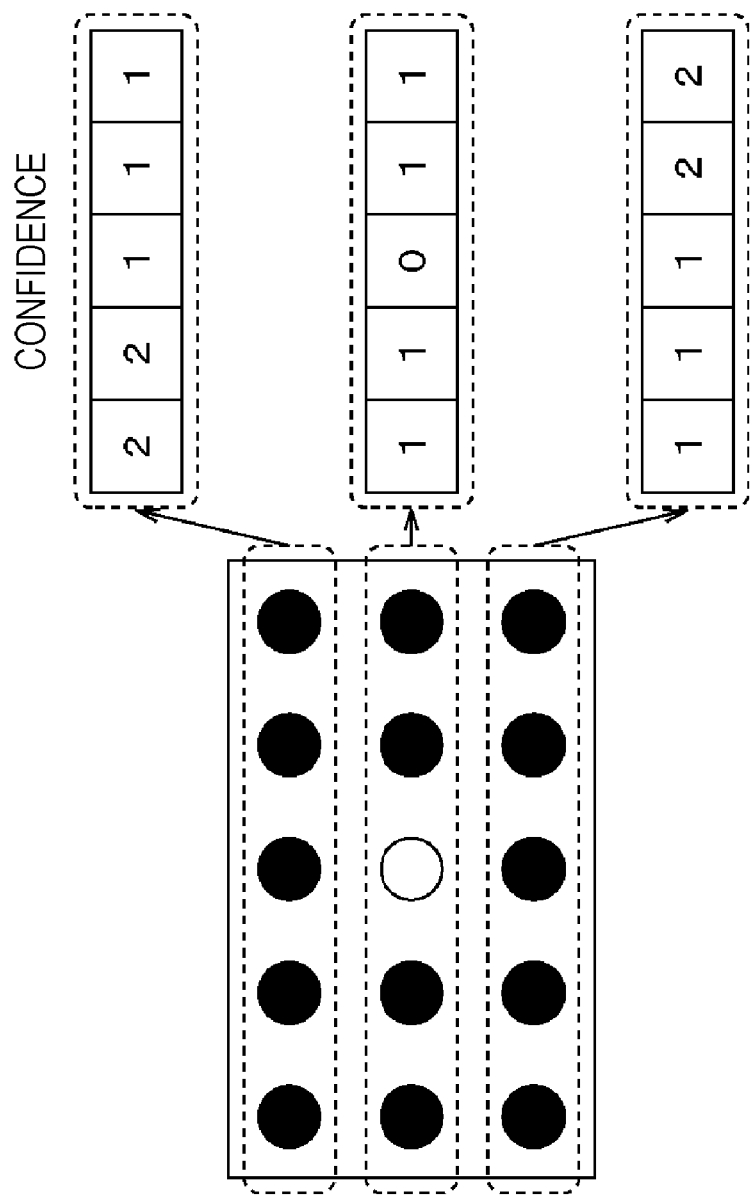
FIG. 12 is a diagram showing an example of confidence distribution.

The confidence-distribution generator 104 generates a confidence distribution indicating a distribution of the confidences detected by the confidence detector 103, as will be described later with reference to FIG. 12. The confidence-distribution generator 104 supplies confidence-distribution information indicating the confidence distribution to the gradient selector 110, the slant-weight setter 111, the flat-intensity-information generator 112, the texture-intensity-information generator 113, and the edge-intensity-information generator 114.

The contrast calculator 105 detects a contrast intensity indicating an intensity of contrast of the image input from outside. The contrast calculator 105 supplies contrast information indicating the contrast intensity to the slant-contrast-distribution generator 106, the flat-contrast-distribution generator 107, the texture-contrast-distribution generator 108, and the edge-contrast-distribution generator 109.

Figure 13:
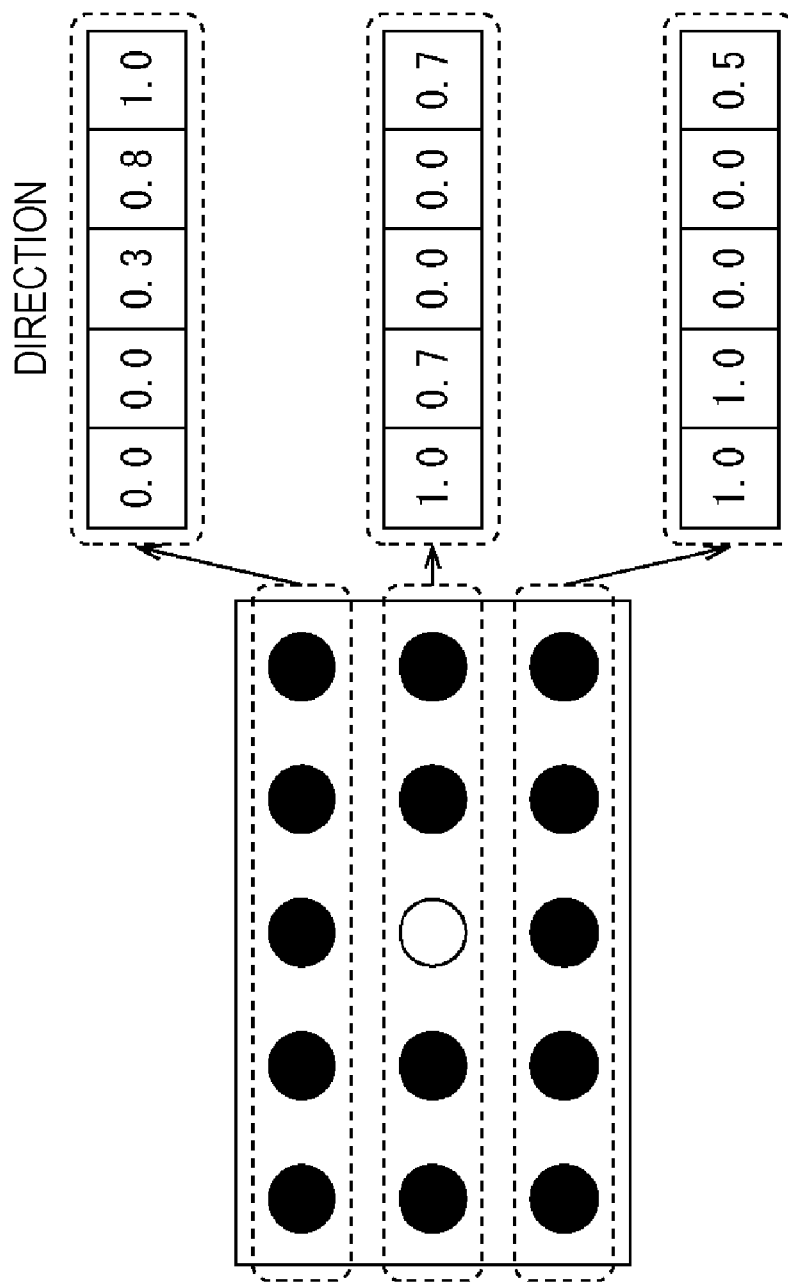
FIG. 13 is a diagram showing an example of contrast distribution.

The slant-contrast-distribution generator 106 sets weight_contrast_S, which is a weight that is based on the contrast intensity, as will be described later with reference to FIGS. 13 and 14. The slant-contrast-distribution generator 106 generates a contrast distribution indicating a distribution of weight_contrast_S. The slant-contrast-distribution generator 106 supplies contrast-distribution information indicating the contrast distribution to the gradient selector 110, the slant-weight setter 111, and the doubler 22.

The flat-contrast-distribution generator 107 sets weight_contrast_F, which is a weight that is based on the contrast intensity, as will be described later with reference to FIGS. 13 and 14. The flat-contrast-distribution generator 107 generates a contrast distribution indicating a distribution of weight_contrast_F. The flat-contrast-distribution generator 107 supplies contrast-distribution information indicating the contrast distribution to the flat-intensity-information generator 112.

The texture-contrast-distribution generator 108 sets weight_contrast_T, which is a weight that is based on the contrast intensity, as will be described later with reference to FIGS. 13 and 14. The texture-contrast-distribution generator 108 generates a contrast distribution indicating a distribution of weight_contrast_T. The texture-contrast-distribution generator 108 supplies contrast-distribution information indicating the contrast distribution to the texture-intensity-information generator 113.

The edge-contrast-distribution generator 109 sets weight_contrast_E, which is a weight that is based on the contrast intensity, as will be described later with reference to FIGS. 13 and 14. The edge-contrast-distribution generator 109 generates a contrast distribution indicating a distribution of weight_contrast_E. The edge-contrast-distribution generator 109 supplies contrast-distribution information indicating the contrast distribution to the edge-intensity-information generator 114.

Hereinafter, weight_contrast_S, weight_contrast_F, weight_contrast_T, and weight_contrast_E will be collectively referred to as contrast weights.

The gradient selector 110 selects a direction for selecting pixels to be used for interpolation of a target pixel on the basis of the direction distribution, the confidence distribution, and weight_contrast_S, as will be described later with reference to FIG. 8. The gradient selector 110 supplies gradient selection information indicating the result of the selection to the doubler 22.

The slant-weight setter 111 sets weight_slant, which is a weight that is based on a prominence of gradients of edges in the image input to the profiler 21, on the basis of the direction distribution, the confidence distribution, and weight_contrast_S, as will be described later with reference to FIG. 8. The slant-weight setter 111 supplies slant-weight information indicating weight_slant to the doubler 22.

The flat-intensity-information generator 112 sets weight_flat, which is a weight that is based on the flat intensity of the image input to the profiler 21, on the basis of the direction distribution, the confidence distribution, and weight_contrast_F, as will be described later with reference to FIG. 8. The flat-intensity-information generator 112 supplies flat-intensity information indicating weight_flat to the enhancer 23.

The texture-intensity-information generator 113 sets weight_texture, which is a weight that is based on the texture intensity of the image input to the profiler 21, on the basis of the direction distribution, the confidence distribution, and weight_contrast_T, as will be described later with reference to FIG. 8. The texture-intensity-information generator 113 supplies texture-intensity information indicating weight_texture to the enhancer 23.

The edge-intensity-information generator 114 sets weight_edge, which is a weight that is based on the edge intensity of the image input to the profiler 21, on the basis of the direction distribution, the confidence distribution, and weight_contrast_E, as will be described later with reference to FIG. 8. The edge-intensity-information generator 114 supplies edge-intensity information indicating weight_edge to the enhancer 23.

Figure 3:
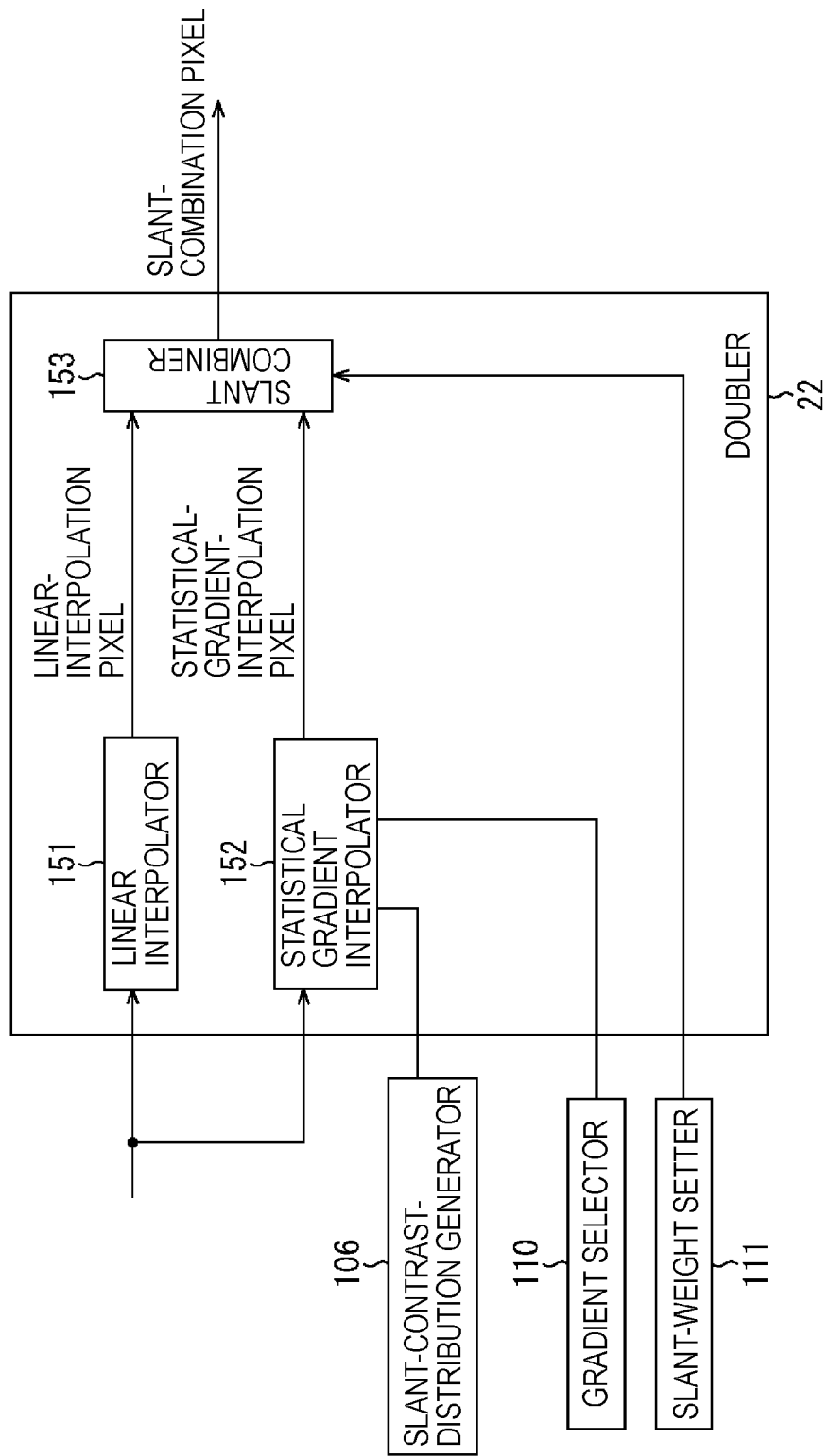
FIG. 3 is a block diagram showing an example functional configuration of a doubler shown in FIG. 1.

FIG. 3 is a block diagram showing an example configuration of the doubler 22. The doubler 22 includes a linear interpolator 151, a statistical gradient interpolator 152, and a slant combiner 153.

The linear interpolator 151 performs linear interpolation on an image input from outside, as will be described later with reference to FIG. 15. The linear interpolator 151 supplies an image obtained through the linear interpolation (hereinafter referred to as a linear-interpolation image) to the slant combiner 153. Hereinafter, pixels constituting the linear-interpolation image will be referred to as linear-interpolation pixels.

The statistical gradient interpolator 152 obtains contrast-distribution information from the slant-contrast-distribution generator 106. Furthermore, the statistical gradient interpolator 152 obtains gradient selection information from the gradient selector 110. The statistical gradient interpolator 152 performs statistical gradient interpolation on the image input from outside, as will be described later with reference to FIG. 15. The statistical gradient interpolator 152 supplies an image obtained through the statistical gradient interpolation (hereinafter referred to as a statistical-gradient-interpolation image) to the slant combiner 153. Hereinafter, pixels constituting the statistical-gradient-interpolation image will be referred to as statistical-gradient-interpolation pixels.

The slant combiner 153 obtains slant-weight information from the slant-weight setter 111. As will be described later with reference to FIG. 16, the slant combiner 153 combines two images by adding together the pixel values of pixels at corresponding positions of the linear-interpolation image supplied from the linear interpolator 151 and the statistical-gradient-interpolation image supplied from the statistical gradient interpolator 152, using weights based on weight_slant indicated by the slant-weight information. The slant combiner 153 supplies an image obtained through the combining (hereinafter referred to a slant-combination image) to the image storage unit 25. Hereinafter, pixels constituting the slant-combination image will be referred to as slant-combination pixels.

Figure 4:
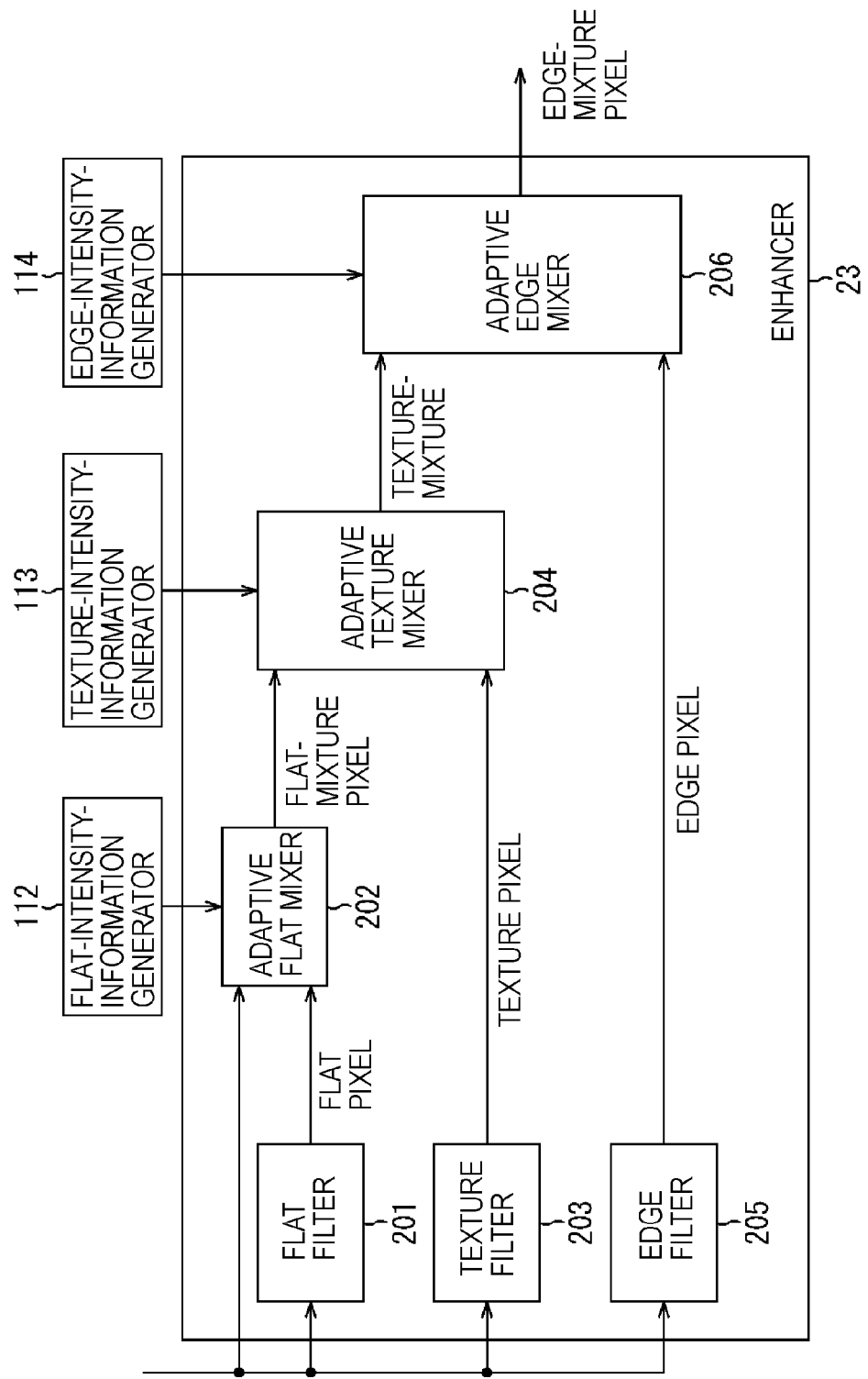
FIG. 4 is a block diagram showing an example functional configuration of an enhancer shown in FIG. 1.

FIG. 4 is a block diagram showing an example configuration of the enhancer 23. The enhancer 23 includes a flat filter 201, an adaptive flat mixer 202, a texture filter 203, an adaptive texture mixer 204, an edge filter 205, and an adaptive edge mixer 206.

The flat filter 201 performs flat filtering, which is directed mainly to processing of a flat region, on pixels of the image input from outside, as will be described later with reference to FIG. 16. The flat filter 201 supplies an image composed of pixels obtained through the flat filtering (hereinafter referred to as a flat image) to the adaptive flat mixer 202.

The adaptive flat mixer 202 combines two images by adding together the pixel values of pixels at corresponding positions of the image input from outside and the flat image supplied from the flat filter 201, using weights based on weight_flat indicated by flat-intensity information, as will be described later with reference to FIG. 16. The adaptive flat mixer 202 supplies an image obtained through the combining (hereinafter referred to as a flat-mixture image) to the adaptive texture mixer 204. Hereinafter, pixels constituting the flat-mixture image will be referred to as flat-mixture pixels.

Figure 17:
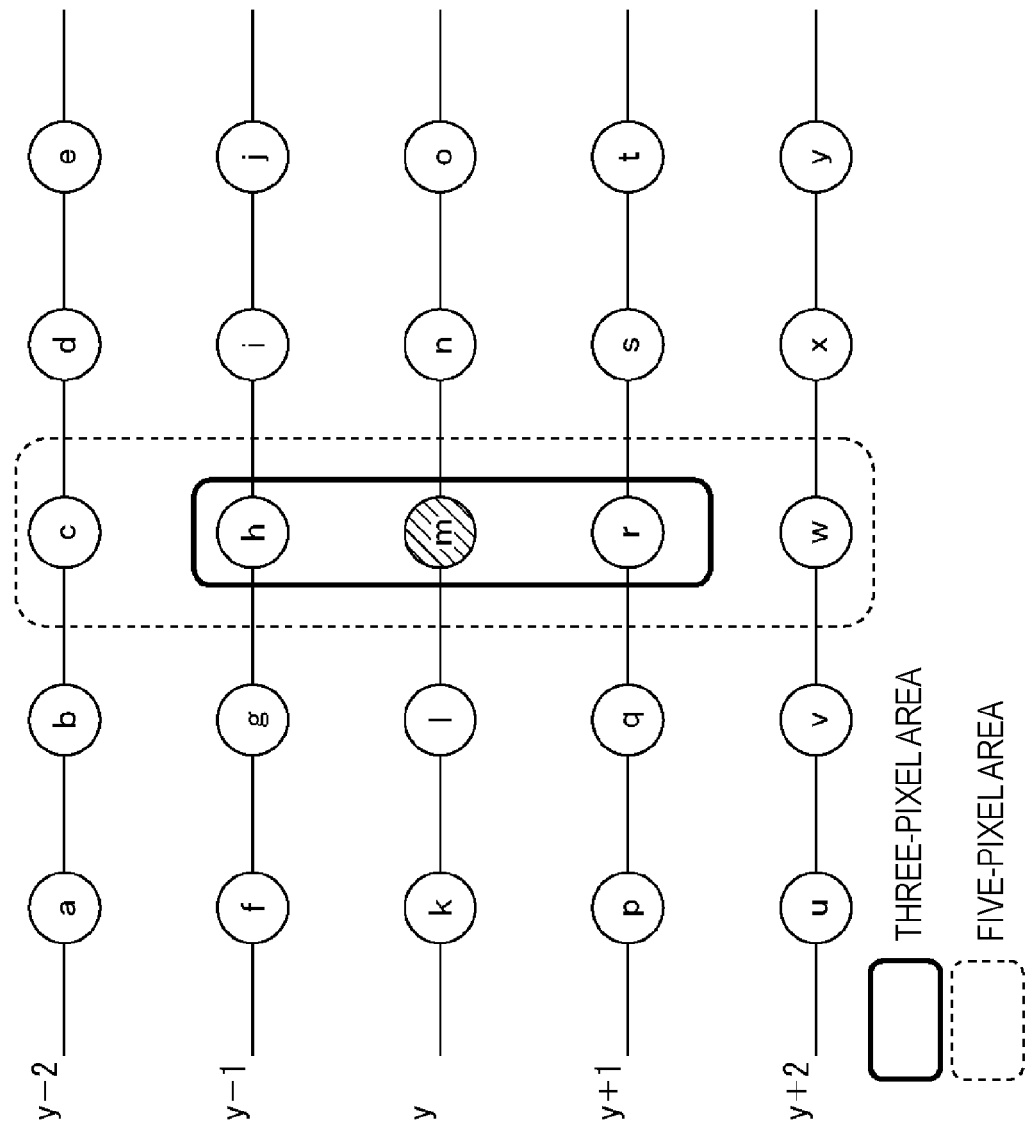
FIG. 17 is a diagram for explaining texture filtering executed in step S152 shown in FIG. 16 and edge filtering executed in step S153 shown in FIG. 16.

The texture filter 203 performs texture filtering, which is directed mainly to processing of a texture region, on the image input from outside, as will be described later mainly with reference to FIG. 17. the texture filter 203 supplies an image (hereinafter referred to as a texture image) composed of pixels obtained through the texture filtering (hereinafter referred to as texture pixels) to the adaptive texture mixer 204.

The adaptive texture mixer 204 combines two images by adding together the pixel values of pixels at corresponding positions of the flat-mixture image supplied from the adaptive flat mixer 202 and the texture image supplied from the texture filter 203, using weights based on weight_texture indicated by texture-intensity information, as will be described later with reference to FIG. 16. The adaptive texture mixer 204 supplies an image obtained through the combining (hereinafter referred to as a texture-mixture image) to the adaptive edge mixer 206. Hereinafter, pixels constituting the texture-mixture image will be referred to as texture-mixture pixels.

The edge filter 205 performs edge filtering, which is directed mainly to processing of an edge region, on the image input from outside, as will be described later mainly with reference to FIG. 17. The edge filter 205 supplies an image (hereinafter referred to as an edge image) composed of pixels obtained through the edge filtering (hereinafter referred to as edge pixels) to the adaptive edge mixer 206.

The adaptive edge mixer 206 combines two images by adding together the pixel values of pixels at corresponding positions of the texture-mixture image supplied from the adaptive texture mixer 204 and the edge image supplied from the edge filter 205, using weights based on weight_edge indicated by edge-intensity information, as will be described later with reference to FIG. 16. The adaptive edge mixer 206 supplies an image obtained through the combining (hereinafter referred to as an edge-mixture image) to the image storage unit 25.

Next, processes that are executed by the image processing apparatus 1 will be described with reference to FIGS. 5 to 18.

First, an image-magnification-factor changing process executed by the image processing apparatus 1 will be described with reference to a flowchart shown in FIG. 5. The image-magnification-factor changing process is started, for example, when a user operates an operating unit (not shown) of the image processing apparatus 1 to input an image (input image) from the image input unit 11 to the image processing unit 12 and to instruct a change in the magnification factor of the input image. The input image is supplied to the image storage unit 25 and temporarily stored therein.

In step S1, the image processing unit 12 sets a magnification factor Z to a variable z. The magnification factor Z is a factor of enlarging or reducing the input image. For example, the magnification factor Z is input by the user via an operating unit (not shown). The magnification factor Z is chosen to be a value greater than 0.

In step S2, the image processing unit 12 checks whether the variable z is greater than 1. When it is determined that the variable is greater than 1, the process proceeds to step S3.

In step S3, the image processing unit 12 executes a density doubling process to double the resolution of an image stored in the image storage unit 25, both in the vertical direction and the horizontal direction. The density doubling process will be described later in detail with reference to FIG. 6. The image with the doubled vertical and horizontal resolutions is temporarily stored in the image storage unit 25.

In step S4, the image processing unit 12 changes the value of the variable z to half of the current value of the variable z.

The process then returns to step S2, and steps S2 to S4 are repeated until it is determined in step S2 that the variable z is less than or equal to 1. That is, processing for doubling the vertical and horizontal resolutions of the image stored in the image storage unit 25 is repeated.

When it is determined in step S2 that the variable z is less than or equal to 1, i.e., when the magnification factor Z input by the user is less than or equal to 1 or when the value of the variable z has become less than or equal to 1 through step S4, the process proceeds to step S5.

In step S5, the image processing unit 12 checks whether the variable z is greater than 0 and less than 1. When it is determined that the variable z is greater than 0 and less than 1, the process proceeds to step S6.

In step S6, the reducer 24 performs reduction. More specifically, the image storage unit 25 supplies an image stored therein to the reducer 24. The reducer 24 reduces the image according to a predetermined method according to a magnification factor represented by the variable z. The reducer 24 supplies an image obtained through the reduction to the image storage unit 25, and the image storage unit 25 temporarily stores the image therein.

When it is determined in step S5 that the variable z is 1, i.e., when the magnification factor Z input by the user is 1 or when the variable z has become 1 through step S4, step S6 is skipped, and the process proceeds to step S7.

In step S7, the image output unit 13 displays an output. More specifically, the image storage unit 25 supplies the image stored therein to the image output unit 13, and the image output unit 13 supplies the image to a display (not shown) so that the image is displayed. This concludes the image-magnification-factor changing process.

Figure 6:
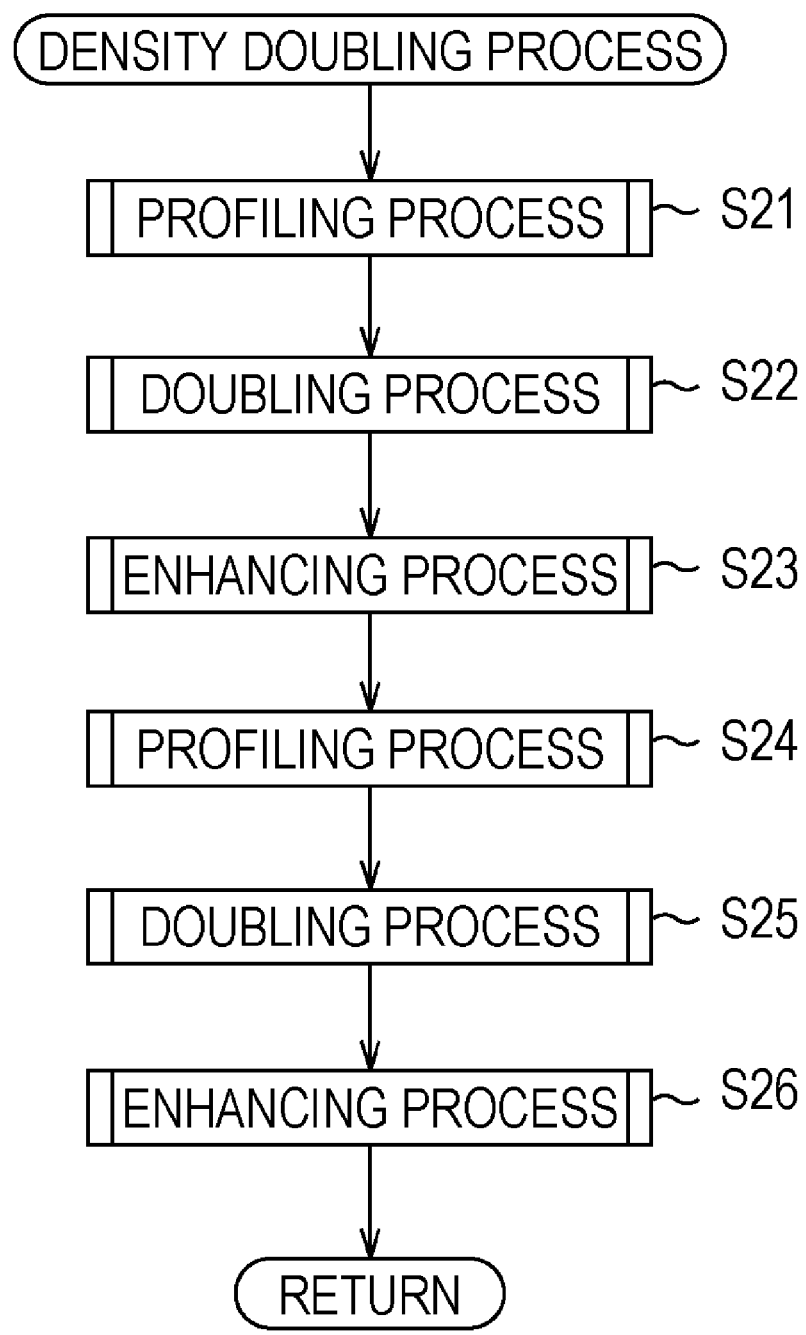
FIG. 6 is a flowchart showing details of a density doubling process in step S3 shown in FIG. 5.

Next, the density doubling process executed in step S3 shown in FIG. 5 will be described in detail with reference to a flowchart shown in FIG. 6.

In step S21, the profiler 21 executes a profiling process. The profiling process will be described below in detail with reference to flowcharts shown in FIGS. 7 and 8.

In step S51, the image storage unit 25 supplies an image. More specifically, the image storage unit 25 supplies an image to be subjected to the density doubling process to the direction detector 101, the confidence detector 103, and the contrast calculator 105 of the profiler 21.

In step S52, the profiler 21 sets a target pixel and a target region. More specifically, the profiler 21 selects a pixel that has not yet undergone the profiling process from among pixels that are added by interpolation to the image obtained from the image storage unit 25 (hereinafter referred to as interpolation pixels), and sets the interpolation pixel as a target pixel. Furthermore, the profiler 21 sets a region of a predetermined range (vertically Mt×horizontally Nt pixels) centered around the target pixel as a target region. The values of Mt and Nt are variable.

Figure 9:
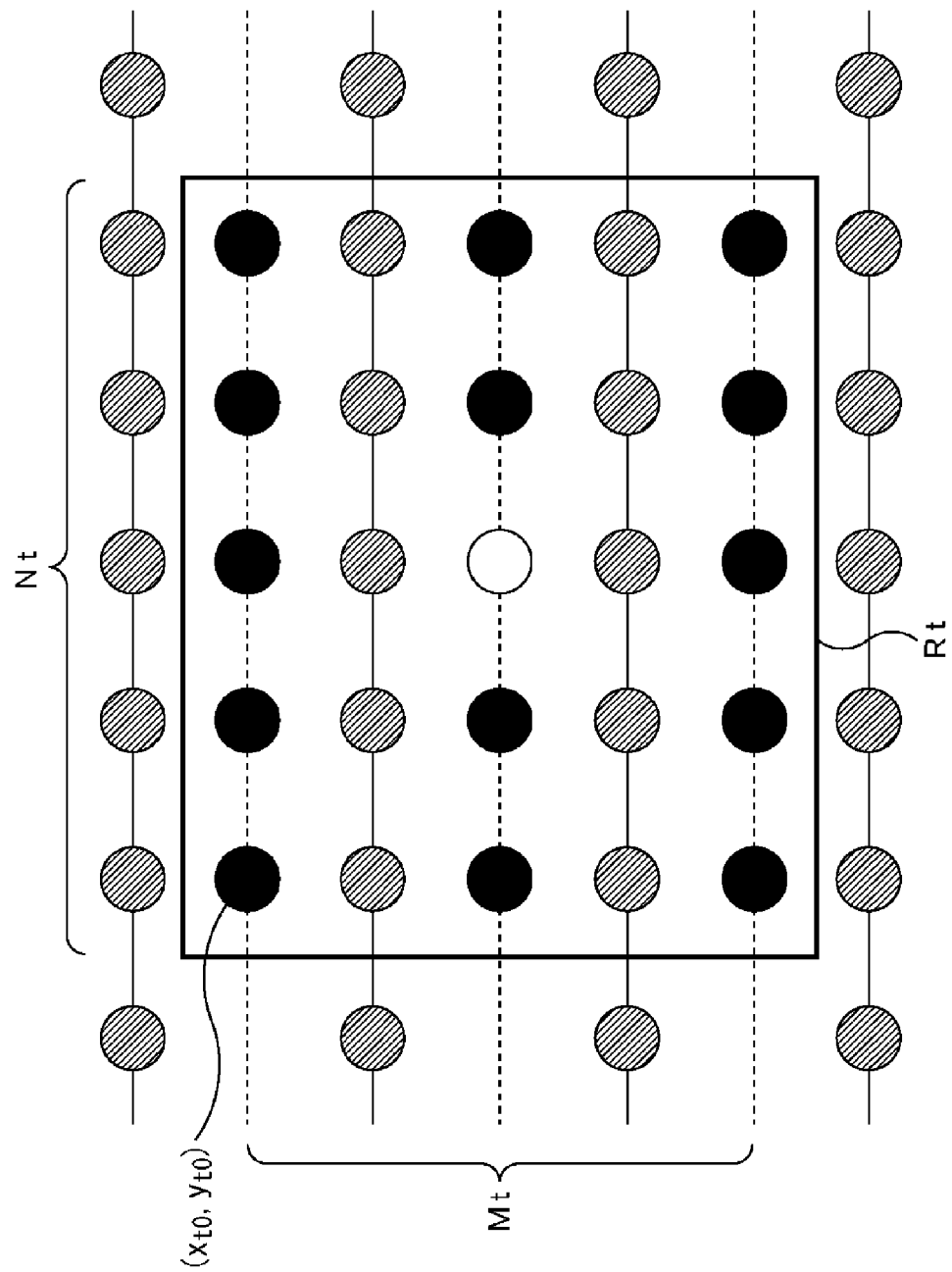
FIG. 9 is a diagram showing an example of target region.

FIG. 9 is a diagram showing an example of the target pixel and the target region. In FIG. 9, a white circle represents the target pixel, black circles represent interpolation pixels other than the target pixel, and hatched circles represent pixels (hereinafter referred to as existing pixels) that originally exist in the image before interpolation (hereinafter referred to as the original image). Solid lines in the horizontal direction represent horizontal rows formed of existing pixels (hereinafter referred to as existing rows), and dotted lines in the horizontal direction represent horizontal rows formed of interpolation pixels (hereinafter referred to as interpolation rows). A region Rt defined by a thick frame represents the target region. In the example shown in FIG. 9, the target region is formed of vertically 5 (Mt=5)×horizontally 5 (Nt=5) pixels centered around the target pixel). The following description will be given in the context of the example with Mt=5 and Nt=5 as appropriate.

Regarding each image processed by the image processing apparatus 1, it will be assumed hereinafter that the horizontal direction corresponds to an x-axis direction and the vertical direction corresponds to a y-axis direction, and that the positive direction on the x axis is rightward and the positive direction on the y axis is upward. Furthermore, the coordinates of an interpolation pixel at the top left corner of the target region will be denoted as $(x_{t0}, Y_{t0})$.

In step S53, the direction detector 101 sets an edge-direction detecting region. More specifically, first, the profiler 21 selects an interpolation pixel for which an edge direction has not yet been detected from among the interpolation pixels in the target region. Hereinafter, the interpolation pixel selected at this time will be referred to as an edge-direction-detection pixel.

The direction detector 101 extracts Nd existing pixels centered around a pixel adjacent above to the edge-direction-detection pixel from an existing row adjacent above to the edge-direction-detection pixel. Furthermore, the direction detector 101 extracts Nd existing pixels centered around a pixel adjacent below to the edge-direction-detection pixel from an existing row adjacent below to the edge-direction-detection pixel. The value of Nd is variable. The following description will be given in the context of an example with Nd=5 as appropriate.

For each space between horizontally adjacent pixels among the extracted existing pixels, the direction detector 101 generates a virtual pixel and interpolates the virtual pixel in the space between the associated existing pixels. The pixel value of the virtual pixel is determined by averaging the pixel values of the two existing pixels that are respectively left and right adjacent to the virtual pixel. The edge-direction-detection pixel, the extracted existing pixels, and the virtual pixels interpolated between the existing pixels constitute the edge-direction detecting region.

Figure 10:
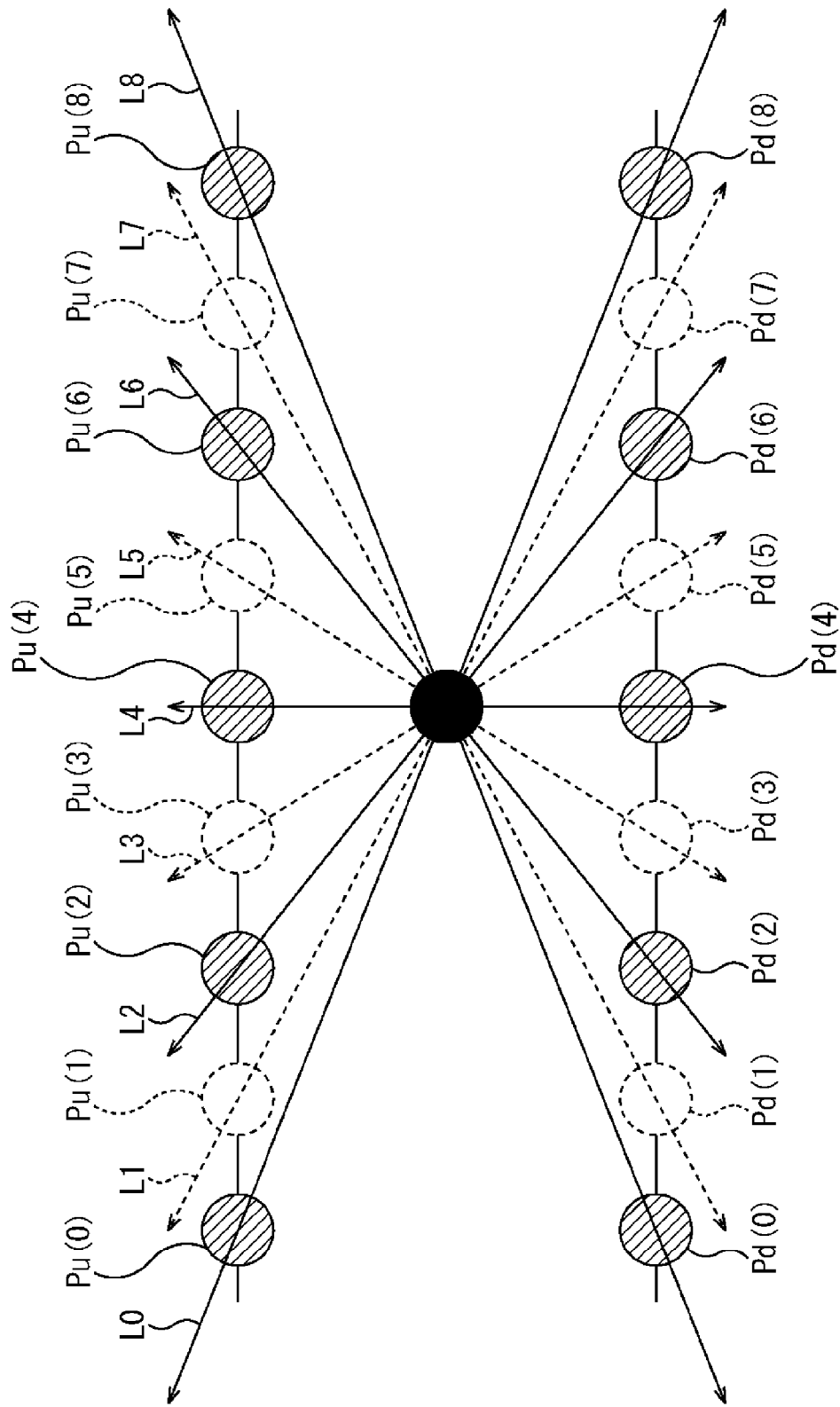
FIG. 10 is a diagram showing an example of edge-direction detecting region.

FIG. 10 is a diagram showing positional relationship among the pixels in the edge-direction detecting region with Nd=5. In FIG. 10, a black circle represents the edge-direction-detection pixel, hatched circles represent the existing pixels, and dotted circles represent the virtual pixels. In the edge-direction detecting region shown in FIG. 10, on each of the rows adjacent respectively above and below to the edge-direction-detection pixel, five existing pixels extracted from the original image and virtual pixels interpolated between the existing pixels are located.

Hereinafter, the pixels on the row adjacent above to the edge-direction-detection pixel will be denoted as Pu(i) (i=0, 1, 2, . . . , 2Nd−2), and the pixels on the row adjacent below to the edge-direction-detection pixel will be denoted as Pd(i) (i=0, 1, 2, . . . , 2Nd−2), where the pixels at the respective left ends of these rows are denoted as Pu(0) and Pd(0), and the pixels at the respective right ends of these rows are denoted as Pu(2Nd−2) and Pd(2Nd−2). In the example shown in FIG. 10, since nd=5, the pixels at the respective right ends of these rows are denoted as Pu(8) and Pd(8). Pu(i) and Pd(i) are also used to denote the pixel values of the pixels Pu(i) and Pd(i), respectively.

Furthermore, hereinafter, directions passing through pixels located diagonally with respect to the edge-direction-detection pixel in the edge-direction detecting region will be denoted as Ldir (dir=0, 1, 2, . . . , 2Nd−2), where dir denotes a number for identifying each direction. In the case of the example shown in FIG. 10, dir is 0 for a direction L0 passing through the pixels Pu(0) and Pd(8) located diagonally with respect to the edge-direction-detection pixel, and dir is 1 for a direction L1 passing through the pixels Pu(1) and Pd(7) located diagonally with respect to the edge-direction-detection pixel. Similarly, dir takes on values from 0 to 8. Directions passing through existing pixels will be referred to as existing directions, and directions passing through virtual pixels will be referred to as virtual directions. In the example shown in FIG. 10, the directions L0, L2, L4, L6, and L8 are existing directions, and the directions L1, L3, L5, and L7 are virtual directions.

Furthermore, the direction detector 101 obtains smoothed pixel values Pu'(i) (i=0, 1, 2, . . . , 2Nd−2) and Pd'(i) (i=0, 1, 2, . . . , 2Nd−2) individually for the pixels Pu(i) and Pd(i) in the edge-direction detecting region. More specifically, the direction detector 101 smoothes the original image by band limitation using a low pass filter (LPF) (not shown) or the like, thereby obtaining a smoothed image. Furthermore, as smoothed pixel values Pu'(i) and Pd'(i) for existing pixels among the pixels in the edge-direction detecting region, the direction detector 101 sets the pixel values of pixels at corresponding positions of the smoothed image. Furthermore, as smoothed pixel values Pu'(i) and Pd'(i) for virtual pixels among the pixels in the edge-direction detecting region, the direction detector 101 sets respective average values of the smoothed pixel values for the left and right adjacent existing pixels.

In step S54, the direction detector 101 calculates a local energy. More specifically, the direction detector 101 calculates a local energy EL of the edge-direction detecting region EL according to expression (1) below:

$$EL = \Sigma(i=0, \ldots Nd-1)\{Coef\_EL(i) \times |Pu'(2i) - Pd'(2i)|\} \quad (1)$$

That is, the local energy EL is calculated by calculating an absolute value of difference between the associated smoothed pixel values for each space between vertically adjacent existing pixels in the edge-direction detecting region, multiplying the resulting absolute values for the individually spaces by predetermined coefficients (Coef_EL(i)), and adding up the products.

In step S55, the direction detector 101 checks whether the local energy EL is greater than a predetermined threshold. When it is determined that the local energy EL is greater than the predetermined threshold, the process proceeds to step S56.

In step S56, the direction detector 101 detects edge directions. More specifically, first, the direction detector 101 performs calculations according to expressions (2) and (3) below repeatedly while incrementing the value of dir from 0 to 2Nd−2 one by one.

$$E(\text{dir})=|Pu'(\text{dir})-Pd'(2N-2-\text{dir})| \quad (2)$$

$$\text{diff}(\text{dir})=|(Pu(\text{dir})-Pd(2N-2-\text{dir})| \quad (3)$$

Then, the direction detector 101 determines max_dir, which is a dir associated with a direction with a highest energy E(dir).

Furthermore, the direction detector 101 determines left_dir, which is a dir associated with a direction with a lowest energy E(dir) among a vertical direction through the target pixel and directions slanted leftward with respect to the vertical direction (leftward-rising directions). In the case of the example shown in FIG. 10, left_dir is dir of a direction with a lowest energy E(dir) among the directions L0 to L4.

Furthermore, the direction detector 101 determines right_dir, which is a dir associated with a direction with a lowest energy E(dir) among the vertical direction and directions slanted rightward with respect to the vertical direction (rightward-rising directions). In the case of the example shown in FIG. 10, right_dir is dir of a direction with a lowest energy E(dir) among the directions L4 to L8.

Hereinafter, dir associated with the vertical direction through the edge-direction-detection pixel will be denoted as mid_dir. In the case of the example shown in FIG. 10, mid_dir is dir associated with the direction L4. Furthermore, hereinafter, directions associated with dir, max_dir, left_dir, right_dir, and mid_dir will be referred to as direction dir, direction max_dir, direction left_dir, direction right_dir, and direction mid_dir, respectively.

Then, the direction detector 101 obtains an edge direction sel_dir at the target pixel. More specifically, the direction detector 101 sets sel_dir=left_dir when one of conditional expressions (4) to (6) below is satisfied, where angle (max_dir, left_dir) denotes an angle between the direction max_dir and the direction left_dir, and angle(max_dir, right_dir) denotes an angle between the direction max_dir and the direction right_dir:

$$|\text{angle (max\_dir, left\_dir)}| > |\text{angle (max\_dir, right\_dir)}| \quad (4)$$

$$(|\text{angle (max\_dir, left\_dir)}| = |\text{angle (max\_dir, right\_dir)}|) \wedge \quad (5)$$
$$(\text{angle (max\_dir, mid\_dir)} > 0)$$

$$(|\text{angle (max\_dir, left\_dir)}| = \backslash|\text{angle (max\_dir, right\_dir)}|) \wedge \quad (6)$$
$$(\text{angle (max\_dir, mid\_dir)} = 0) \wedge (E(\text{right\_dir}) > E(\text{left\_dir}))$$

Furthermore, the direction detector 101 sets sel_dir=right_dir when one of conditional expressions (7) to (9) below is satisfied:

$$|\text{angle (max\_dir, left\_dir)}| < |\text{angle (max\_dir, right\_dir)}| \quad (7)$$

$$(|\text{angle (max\_dir, left\_dir)}| = |\text{angle (max\_dir, right\_dir)}|) \wedge \quad (8)$$
$$(\text{angle (max\_dir, mid\_dir)} < 0)$$

$$(|\text{angle (max\_dir, left\_dir)}| = |\text{angle (max\_dir, right\_dir)}|) \wedge \quad (9)$$
$$(\text{angle (max\_dir, mid\_dir)} = 0) \wedge (E(\text{right\_dir}) < E(\text{left\_dir}))$$

When none of the above conditional expressions (4) to (9) is satisfied, the direction detector 101 sets sel_dir=mid_dir.

When the edge direction sel_dir is a virtual direction, the direction detector 101 further sets sel_dir=sel_dir+1 when conditional expression (10) below is satisfied:

$$(E(\text{sel\_dir}+1) < E(\text{sel\_dir}-1) \wedge \quad (10)$$
$$(\textit{diff}(\text{sel\_dir}+1) < \textit{diff}(\text{sel\_dir}-1)) \wedge (\text{sel\_dir}+1 \neq \text{mid\_dir})$$

Similarly, when the edge direction sel_dir is a virtual direction, the direction detector 101 sets sel_dir=sel_dir−1 when conditional expression (11) below is satisfied:

$$(E(\text{sel\_dir}+1) > E(\text{sel\_dir}-1)) \wedge \quad (11)$$
$$(\textit{diff}(\text{sel\_dir}+1) > \textit{diff}(\text{sel\_dir}-1)) \wedge (\text{sel\_dir}-1 \neq \text{mid\_dir})$$

The direction detector 101 supplies edge-direction information indicating that the local energy EL exceeds the predetermined threshold and indicating the edge direction sel_dir to the direction-distribution generator 102 and the confidence detector 103.

In step S57, the direction detector 101 detects a confidence of the edge direction sel_dir. More specifically, first, as a pixel value of the edge-direction-detection pixel, the confidence detector 103 calculates an average of the pixel values of two pixels (pixel on the upper row and pixel on the lower row) in the edge direction sel_dir with respect to the edge-direction-detection pixel in the edge-direction detecting region. Hereinafter, the pixel value calculated at this time will be denoted as Pp.

Then, the confidence detector 103 checks whether the pixel value Pp calculated for the edge-direction-detection pixel matches the pixel values of pixels in the vicinity of the edge-direction-detection pixel. More specifically, first, the confidence detector 103 calculates a value Vv representing a vertical change in pixel value with respect to the edge-direction-detection pixel, according to expression (12) below:

$$Vv=(Pu(Nd-1)-Pp)\times(Pp-Pd(Nd-1)) \quad (12)b$$

Then, the confidence detector 103 calculates a value Vh_up representing a horizontal change in pixel value on the upper row of the edge-direction-detection pixel, according to expression (13) below:

$$Vh\_up=(Pu(Nd-1)-Pu(Nd))\times(Pu(Nd-2)-Pu(Nd-1)) \quad (13)$$

Then, the confidence detector 103 calculates a value Vh_down representing a horizontal change in pixel value on the lower row of the edge-direction-detection pixel, according to expression (14) below:

$$Vh\_down=(Pd(Nd-1)-Pd(Nd))\times(Pd(Nd-2)-Pd(Nd-1)) \quad (14)$$

Then, when conditional expressions (15) to (23) below are all satisfied, the confidence detector 103 determines that the pixel value Pp does not match the pixel values of the pixels in the vicinity of the edge-direction-detection pixel. That is, the confidence detector 103 determines that the confidence of the detected edge direction sel_dir is low so that the pixel value Pp calculated on the basis of the edge direction sel_dir is not appropriate. In this case, the confidence detector 103 sets 0 as the confidence of the edge direction sel_dir detected at the edge-direction-detection pixel.

$$Vv<0 \tag{15}$$

$$Vh\_up<0 \tag{16}$$

$$Vh\_down<0 \tag{17}$$

$$|Pu(Nd-1)-Pp|>Tc1 \tag{18}$$

$$|Pp-Pd(Nd-1)|>Tc2 \tag{19}$$

$$|Pu(Nd-1)-Pu(Nd)|>Tc3 \tag{20}$$

$$|Pu(Nd-2)-Pu(Nd-1)|>Tc4 \tag{21}$$

$$|Pd(Nd-1)-Pd(Nd)|>Tc5 \tag{22}$$

$$|Pd(Nd-2)-Pd(Nd-1)|>Tc6 \tag{23}$$

where Tc1 to Tc6 are predetermined thresholds.

On the other hand, when one or more of conditional expressions (15) to (23) are not satisfied, the confidence detector 103 determines that the pixel value Pp matches the pixel values of the pixels in the vicinity of the edge-direction-detection pixel. That is, the confidence detector 103 determines that the confidence of the detected edge direction sel_dir is high so that the pixel value Pp calculated on the basis of the edge direction sel_dir is appropriate. In this case, the confidence detector 103 sets 1 as the confidence of the edge direction sel_dir detected at the edge-direction-detection pixel.

That is, the confidence of the edge direction sel_dir is detected on the basis of matching between the pixel value calculated using the pixels located in the edge direction sel_dir with respect to the edge-direction-detection pixel and the pixel values of the pixels in the vicinity of the edge-direction-detection pixel.

The confidence detector 103 supplies confidence information indicating that confidence to the confidence-distribution generator 104. The process then proceeds to step S60.

Hereinafter, the confidence of the edge direction of an interpolation pixel at coordinates (x, y) will be denoted as confidence(x, y).

When it is determined in step S55 that the local energy EL is less than or equal to the predetermined threshold, the process proceeds to step S58.

In step S58, the direction detector 101 tentatively sets an edge direction. More specifically, the direction detector 101 assumes that the current edge-direction detecting region is a flat low-energy region not including an edge, and tentatively sets mid_dir as the edge direction sel_dir. The direction detector 101 supplies edge-direction information indicating that the local energy EL is less than or equal to the predetermined threshold and indicating the edge direction sel_dir to the direction-distribution generator 102 and the confidence detector 103.

In step S59, the confidence detector 103 tentatively sets a confidence. More specifically, the confidence detector 103 sets 2, indicating that the confidence has not been fixed yet, as the confidence of the edge direction at the current edge-direction-detection pixel. The confidence detector 103 supplies confidence information indicating the confidence to the confidence-distribution generator 104.

In step S60, the contrast calculator 105 detects a contrast intensity. More specifically, the contrast calculator 105 extracts pixels in a region of vertically Mc×horizontally Nc pixels (hereinafter referred to as a contrast detecting region) of the original image centered around the edge-direction-detection pixel. The values of Mc and Nc are variable. Hereinafter, a coordinate system with an i direction corresponding to the horizontal direction, a j direction corresponding to the vertical direction, and with the coordinates of a pixel at the top left corner represented as (0, 0) will be used in the contrast detecting region.

The contrast calculator 105 calculates the contrast intensity at the edge-direction-detection pixel according to expression (24) below:

$$\text{Int\_Contrast}(x, y) = \tag{24}$$
$$\Sigma_{i1=0 \ldots Nc-1}\Sigma_{j1=0 \ldots Mc-1}\Sigma_{i2=0 \ldots Nc-1}\Sigma_{j2=0 \ldots Mc-1}$$
$$\{\text{Coef\_Contrast}(i1 - i2, j1 - j2) \times |Porg(i1, j1) - Porg(i2, J2)|\}$$

Int_Contrast(x, y) denotes the contrast intensity of an edge-direction-detection pixel at coordinates (x, y) in an image obtained through interpolation. Porg(i1, j1) and Porg(i2, j2) represent the pixel values of pixels at coordinates (i1, j1) and (i2, j2), respectively. Coef_Contrast(i1-i2, j1-j2) denotes a weight that is based on the distance between the coordinates (i1, j1) and (i2, j2), which becomes larger as the distance decreases and which becomes smaller as the distance increases. That is, the contrast intensity at the edge-direction-detection pixel is the sum of values obtained by multiplying the absolute values of differences between the pixel values of the individual pixels in the contrast detecting region centered around the edge-direction-detection pixel with weights based on inter-pixel distances.

The contrast calculator 105 supplies contrast information indicating the contrast intensity to the slant-contrast-distribution generator 106, the flat-contrast-distribution generator 107, the texture-contrast-distribution generator 108, and the edge-contrast-distribution generator 109.

In step S61, the profiler 21 checks whether the processing has been finished for all the interpolation pixels in the target region. When it is determined that the processing has not been finished for all the interpolation pixels in the target region, i.e., when edge directions, confidences thereof, and contrast intensities have not been detected for all the interpolation pixels in the target region, the process returns to step S53. Steps S53 to S61 are repeated until it is determined in step S61 that the processing has been finished for all the interpolation pixels in the target region, whereby edge directions, confidences thereof, and contrast intensities are detected for all the interpolation pixels in the target region.

When it is determined in step S61 that the processing has been finished for all the interpolation pixels in the target region, the process proceeds to step S62.

In step S62, the direction-distribution generator 102 generates a direction distribution. More specifically, the direction-distribution generator 102 generates a direction distribution indicating a distribution of the edge directions at the individual interpolation pixels in the target region, on the basis of the edge-direction information supplied from the direction detector 101. FIG. 11 shows an example of the direction distribution in the target region shown in FIG. 9. In the example shown in FIG. 11, it is indicated that the values of dir corresponding to the edge directions at the individual interpolation pixels on the uppermost interpolation row in the target region are 4, 4, 8, 8, 8 from the left, the values of dir corresponding to the edge directions at the individual interpolation pixels on the middle interpolation row in the target region are 8, 7, 8, 7, 8 from the left, and the values of dir corresponding to the edge directions at the individual interpolation pixels on the lowermost interpolation row in the target region are 8, 8, 8, 4, 4 from the left.

The direction-distribution generator 102 supplies direction-distribution information indicating the direction distribution to the gradient selector 110, the slant-weight setter 111, the flat-intensity-information generator 112, the texture-intensity-information generator 113, and the edge-intensity-information generator 114.

In step S63, the confidence-distribution generator 104 generates a confidence distribution. More specifically, the confidence-distribution generator 104 generates a confidence distribution indicating a distribution of the confidences at the individual interpolation pixels in the target region, on the basis of the confidence information supplied from the confidence detector 103. FIG. 12 shows an example of the confidence distribution in the target region shown in FIG. 9. In the example shown in FIG. 12, it is indicated that the confidences at the individual interpolation pixels on the uppermost interpolation row in the target region are 2, 2, 1, 1, 1 from the left, the confidences at the individual interpolation pixels on the middle interpolation row in the target region are 1, 1, 0, 1, 1 from the left, and the confidences at the individual interpolation pixels on the lowermost interpolation row in the target region are 1, 1, 1, 2, 2 from the left.

The confidence-distribution generator 104 supplies confidence-distribution information indicating the confidence distribution to the gradient selector 110, the slant-weight setter 111, the flat-intensity-information generator 112, the texture-intensity-information generator 113, and the edge-intensity-information generator 114.

In step S64, the slant-contrast-distribution generator 106 generates a contrast distribution for image interpolation. More specifically, the slant-contrast-distribution generator 106 calculates weight_contrast_S for each interpolation pixel in the target region according to expression (25) below:

$$\text{weight\_contrast\_S}(x, y) = \begin{cases} 0.0 & (\text{Int\_Contrast}(x, y) < Ts1) \\ \dfrac{\text{Int\_Contrast}(x, y) - Ts2}{Ts2 - Ts1} & (Ts1 \le \text{Int\_Contrast}(x, y) \le Ts2) \\ 1.0 & (\text{Int\_Contrast}(x, y) > Ts2) \end{cases} \quad (25)$$

weight_contrast_S(x, y) denotes weight_contrast_S at an interpolation pixel with coordinates (x, y). Ts1 and Ts2 denote thresholds. The thresholds Ts1 and Ts2 are variable.

The slant-contrast-distribution generator 106 generates a contrast distribution indicating a distribution of weight_contrast_S at the interpolation pixels in the target region. FIG. 13 shows an example of the contrast distribution of weight_contrast_S. In the example shown in FIG. 13, it is indicated that the values of weight_contrast_S at the individual interpolation pixels on the uppermost interpolation row in the target region are 0.0, 0.0, 0.3, 0.8, 1.0 from the left, the values of weight_contrast_S at the individual interpolation pixels on the middle interpolation row in the target region are 1.0, 0.7, 0.0, 0.0, 0.7 from the left, and the values of weight_contrast_S at the individual interpolation pixels on the lowermost interpolation row in the target region are 1.0, 1.0, 0.0, 0.0, 0.5 from the left. The slant-contrast-distribution generator 106 supplies contrast-distribution information indicating the contrast distribution of weight_contrast_S to the gradient selector 110, the slant-weight setter 111, and the statistical gradient interpolator 152 of the doubler 22.

In step S65, the flat-contrast-distribution generator 107 generates a contrast distribution for flat components. More specifically, the flat-contrast-distribution generator 107 calculates weight_contrast_F at each interpolation pixel in the target region according to expression (26) below:

$$\text{weight\_contrast\_F}(x, y) = \begin{cases} 1.0 & (\text{Int\_Contrast}(x, y) < Tf1) \\ \dfrac{-\text{Int\_Contrast}(x, y) + Tf2}{Tf2 - Tf1} & (Tf1 \le \text{Int\_Contrast}(x, y) \le Tf2) \\ 0.0 & (\text{Int\_Contrast}(x, y) > Tf2) \end{cases} \quad (26)$$

weight_contrast_F(x, y) denotes weight_contrast_F at an interpolation pixel with coordinates (x, y). Tf1 and Tf2 denote thresholds. The thresholds Tf1 and Tf2 are variable.

The flat-contrast-distribution generator 107 generates a contrast distribution indicating a distribution of weight_contrast_F at the interpolation pixels in the target region. The flat-contrast-distribution generator 107 supplies contrast-distribution information indicating the contrast distribution of weight_contrast_F to the flat-intensity-information generator 112.

In step S66, the texture-contrast-distribution generator 108 generates a contrast distribution for texture components. More specifically, the texture-contrast-distribution generator 108 calculates weight_contrast_T for each interpolation pixel in the target region according to expression (27) below:

$$\text{weight\_contrast\_F}(x, y) = \begin{cases} 0.0 & (\text{Int\_Contrast}(x, y) < Tt1) \\ \dfrac{\text{Int\_Contrast}(x, y) - Tt1}{Tt2 - Tt1} & (Tt1 \le \text{Int\_Contrast}(x, y) \le Tt2) \\ 1.0 & (Tt2 \le \text{Int\_Contrast}(x, y) < Tt3) \\ \dfrac{-\text{Int\_Contrast}(x, y) + Tt4}{Tt4 - Tt3} & (Tt3 \le \text{Int\_Contrast}(x, y) \le Tt4) \\ 0.0 & (\text{Int\_Contrast}(x, y) > Tt4) \end{cases} \quad (27)$$

weight_contrast_T(x, y) denotes weight_contrast_T at an interpolation pixel with coordinates (x, y). Tt1 to Tt4 denote thresholds. The thresholds Tt1 to Tt4 are variable.

The texture-contrast-distribution generator 108 generates a contrast distribution indicating a contrast of weight_contrast_T at the interpolation pixels in the target region. The texture-contrast-distribution generator 108 supplies contrast-distribution information indicating the contrast distribution of weight_contrast_T to the texture-intensity-information generator 113.

In step S67, the edge-contrast-distribution generator 109 generates a contrast distribution for edge components. More specifically, the edge-contrast-distribution generator 109 calculates weight_contrast_E for each interpolation pixel in the target region according to expression (28) below:

$$\text{weight\_contrast\_E}(x, y) = \begin{cases} 0.0 & (\text{Int\_Contrast}(x, y) < Te1) \\ \dfrac{\text{Int\_Contrast}(x, y) - Te1}{Te2 - Te1} & (Te1 \leq \text{Int\_Contrast}(x, y) \leq Te2) \\ 1.0 & (\text{Int\_Contrast}(x, y) > Te2) \end{cases} \quad (28)$$

weight_contrast_E(x, y) denotes weight_contrast_E at an interpolation pixel with coordinates (x, y). Te1 and Te2 denote thresholds. The thresholds Te1 and Te2 are variable.

The edge-contrast-distribution generator 109 generates a contrast distribution indicating a distribution of weight_contrast_E at the interpolation pixels in the target region. The edge-contrast-distribution generator 109 supplies contrast-distribution information indicating the contrast distribution of weight_contrast_E to the edge-intensity_information generator 114.

Figure 14:
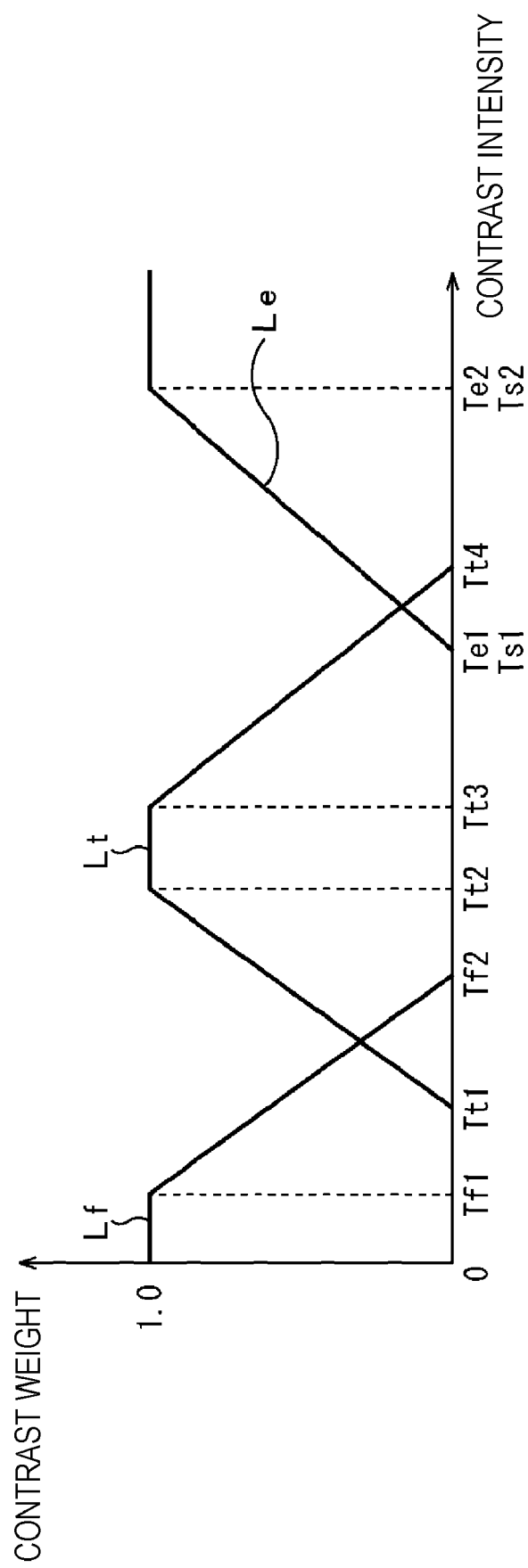
FIG. 14 is a graph showing relationship between contrast intensity and contrast weights.

FIG. 14 is a graph showing relationship between contrast intensity and contrast weights, in which the horizontal axis represents contrast intensity and the vertical axis represents contrast weights.

In FIG. 14, a line Le represents relationship between contrast intensity and weight_contrast_S and weight_contrast_E in an example where thresholds Ts1=threshold Te1 and threshold Ts2=threshold Te2. weight_contrast_S takes on a minimum value of 0.0 when contrast intensity<Ts1, increases as contrast intensity increases when Ts1<contrast intensity Ts2, and takes on a maximum value of 1.0 when contrast intensity>Ts2. weight_contrast_E takes on a minimum value of 0.0 when contrast intensity<Te1, increases as contrast intensity increases when Te1<contrast intensity<Te2, and takes on a maximum value of contrast intensity>Te2.

The range above the threshold Ts2 (the range above the threshold Te2) is a range of contrast intensities that occurs with a high frequency of occurrence in an edge region (at pixels thereof), and the range below the threshold Ts1 (the range below the threshold Te1) is a range of contrast intensities that occur with low frequencies of occurrence in an edge region (at pixels thereof). Thus, weight_contrast_S and weight_contrast_E are values based on closeness of the contrast intensity at the target pixel to a predetermined contrast intensity that occurs with a high frequency of occurrence in an edge region.

The thresholds Ts1 and Te1 may be chosen to be different values, and the thresholds Ts2 and Te2 may be chosen to be different values.

In FIG. 14, a line Lf represents relationship between contrast intensity and weight_contrast_F. More specifically, weight_contrast_F takes on a maximum value of 1.0 when contrast intensity<Tf1, decreases as contrast intensity decreases when Tf1≦contrast intensity≦Tf2, and takes on a minimum value of 0.0 when contrast intensity>Tf2.

The range below the thresholds Tf1 is a range of contrast intensities that occur with high frequencies of occurrence in a flat region (at pixels thereof), and the range above the threshold Tf2 is a range of contrast intensities that occur with low frequencies of occurrence in a flat region (at pixels thereof). Thus, weight_contrast_S is a value based on closeness of the contrast intensity at the target pixel to a predetermined contrast frequency that occurs with a high frequency of occurrence in a flat region.

In FIG. 14, a line Lt represents relationship between contrast intensity and weight_contrast_T. More specifically, weight_contrast_T takes on a minimum value of 0.0 when contrast intensity<Tt1, increases as contrast intensity increases when Tt1≦contrast intensity≦Tt2, takes on a maximum value of 1.0 when Tt2<contrast intensity<Tt3, decreases as contrast intensity increases when Tt3≦contrast intensity≦Tt4, and takes on a minimum value of 0.0 when contrast intensity<Tt4.

The range from the threshold Tt2 to the threshold Tt3 is a range of contrast intensities that occur with high frequencies of occurrence in a texture region (at pixels thereof), and the range below the threshold Tt1 and the range above the thresholds Tt4 are ranges of contrast intensities that occur with low frequencies of occurrence in a texture region (at pixels thereof). Thus, weight_contrast_T is a value based on closeness of the contrast intensity at the target pixel to a predetermined contrast intensity that occurs with a high frequency of occurrence in a flat region.

In step S68, the gradient selector 110 selects a gradient. More specifically, the gradient selector 110 calculates a balance at the target pixel according to expression (29) below:

$$\text{Balance}(x, y) = \quad (29)$$
$$\Sigma dir =_{N,\ldots 2N-2} \text{Population}(L_{dir}) - \Sigma_{i=0,\ldots N-2} \text{Population}(L_{dir})$$

Balance(x, y) denotes a balance at the target pixel with coordinates (x, y). Population($L_{dir}$) denotes a total number of interpolation pixels with an edge direction sel_dir of $L_{dir}$, a confidence of 1, and a weight_contrast_S greater than or equal to a predetermined threshold among the interpolation pixels in the target region.

When Balance(x, y)=0, the gradient selector 110 selects $L_{N-1}$ (vertical direction) as a direction for selecting pixels to be used for interpolation of the target pixel. When balance(x, y)>0, the gradient selector 110 selects $L_N$ to $L_{2N-2}$ (directions slanted rightward with respect to the vertical direction (right-increasing directions)) as a direction for selecting pixels to be used for interpolation of the target pixel. When balance(x, y)<0, the gradient selector 110 selects $L_0$ to $L_{N-2}$ (directions slanted leftward with respect to the vertical direction (left-increasing directions)) as a direction for selecting pixels to be used for interpolation of the target pixel.

That is, the direction for selecting pixels to be used for interpolation of the target pixel is selected on the basis of the distribution of edge directions at pixels with high confidences of edge directions and larger values of weight_contrast_S in the target region.

The gradient selector 110 supplies information indicating the selected direction to the statistical gradient interpolator 152 of the doubler 22.

In step S69, the slant-weight setter 111 sets a weight for a slant direction. More specifically, the slant-weight setter 111 calculates weight_slant, which is a weight that is based on the prominence of edge direction in the target region centered around the target pixel according to expression (30) below:

$$\text{weight\_slant}(x, y) = \quad (30)$$
$$\sum_{i=0}^{Nt-1} \sum_{j=0}^{\frac{Mt-1}{2}} \{\text{Coef\_Balance}(\text{sel\_dir}(x_{t0} + i, y_{t0} + 2i)) \times \text{Confidence}$$
$$(x_{t0} + i, y_{t0} + 2i) \times \text{weight\_contrast\_S}(x_{t0} + i, y_{t0} + 2i)\}$$

weight_slant(x, y) denotes weight_slant at the target pixel with coordinates (x, y). Coef_Balance(x, y) (sel_dir($x_{t0}$+i, $y_{t0}$+2i)) is a weight that is set for an edge direction sel_dir ($x_{t0}$+i, $y_{t0}$+2i) of an interpolation pixel with coordinates ($x_{t0}$+i, $yt_{t0}$+2i).

weight_slant is obtained by adding up values obtained for the individual interpolation pixels in the target region by multiplying the confidence of edge direction at each interpolation pixel, weight_contrast_S at the interpolation pixel, and the weight Coef_Balance for the edge direction sel_dir at the interpolation pixel. That is, weight_slant increases as the confidence of edge direction and the value of weight_contrast_S at each interpolation pixel in the target region increase (as the prominence of edge direction in the current target region increases), and decreases as the confidence of edge direction and the value of weight_contrast_S at each interpolation pixel in the target region decrease (as the prominence of edge direction in the current target region decreases).

The slant-weight setter 111 supplies slant-weight information indicating weight_slant to the slant combiner 153 of the doubler 22.

In step S70, the edge-intensity-information generator 114 generates edge-intensity information. More specifically, the edge-intensity-information generator 114 calculates weight_edge, which is a weight that is based on an edge intensity in the target region centered around the target pixel according to expression (31) below:

$$\text{weight\_edge}(x, y) = \sum_{i=0}^{N_t-1} \sum_{j=0}^{\frac{M_t-1}{2}} \{\text{Coef\_edge}(\text{sel\_dir}(x_{t0} + i, y_{t0} + 2i)) \times \text{Confidence} (x_{t0} + i, y_{t0} + 2i) \times \text{weight\_contrast\_E}(x_{t0} + i, y_{t0} + 2i)\} \quad (31)$$

weight_edge(x, y) denotes weight_edge at the target pixel with coordinates (x, y). Coef_Edge(sel_dir($x_{t0}$+i, $y_{t0}$+2i)) is a weight that is set for an edge direction sel_dir($x_{t0}$+i, $y_{t0}$+2i) of an interpolation pixel with coordinates ($x_{t0}$+i, $y_{t0}$+2i). For example, when an edge in a particular direction is to be enhanced, Coef_Edge for the edge direction is chosen to be a larger value than Coef_Edge for the other edge directions.

weight_edge is obtained by adding up values obtained for the individual interpolation pixels in the target region by multiplying the confidence of edge direction at each interpolation pixel, weight_contrast_E at the interpolation pixel, and the weight Coef_Edge for the edge direction sel_dir at the interpolation pixel. That is, weight_edge increases as the confidence of edge direction and the value of weight_contrast_E at each interpolation pixel in the target region increase (as the edge intensity in the target region increases), and decreases as the confidence of edge direction and the value of weight_contrast_E at each interpolation pixel in the target region decrease (as the edge intensity in the target region decreases).

The edge-intensity-information generator 114 generates edge-intensity information indicating weight_edge, and outputs the edge-intensity information to the adaptive edge mixer 206 of the enhancer 23.

In step S71, the texture-intensity-information generator 113 generates texture-intensity information. More specifically, the texture-intensity-information generator 113 calculates weight_texture, which is a weight that is based on a texture intensity in the target region centered around the target pixel according to expression (32) below:

$$\text{weight\_texture}(x, y) = \sum_{i=0}^{N_t-1} \sum_{j=0}^{\frac{M_t-1}{2}} \{\text{Coef\_texture}(\text{sel\_dir}(x_{t0} + i, y_{t0} + 2i)) \times \text{Confidence} (x_{t0} + i, y_{t0} + 2i) \times \text{weight\_contrast\_T}(x_{t0} + i, y_{t0} + 2i)\} \quad (32)$$

weight_texture(x, y) denotes weight_texture at the target pixel with coordinates (x, y). Coef_Texture(sel_dir($x_{t0}$+i, $y_{t0}$+2i)) is a weight that is set for an edge direction sel_dir ($x_{t0}$+i, $y_{t0}$+2i) of an interpolation pixel with coordinates ($x_{t0}$+i, $y_{t0}$+2i).

weight_texture is obtained by adding up values obtained for the individual interpolation pixels in the target region by multiplying the confidence of edge direction at each interpolation pixel, weight_contrast_T at the interpolation pixel, and the weight Coef_Texture for the edge direction sel_dir at the interpolation pixel. That is, weight_texture increases as the confidence of edge direction and the value of weight_contrast_T at each interpolation pixel in the target region increase (as the texture intensity in the target region increases), and decreases as the confidence of edge direction and the value of weight_contrast_T at each interpolation pixel in the target region decrease (as the texture intensity in the target region decreases).

The texture-intensity-information generator 113 generates texture-intensity information indicating weight_texture, and outputs the texture-intensity information to the adaptive texture mixer 204 of the enhancer 23.

In step S72, the flat-intensity-information generator 112 generates flat-intensity information. More specifically, the flat-intensity-information generator 112 calculates weight_flat, which is a weight that is based on a flat intensity in the target region centered around the target pixel according to expression (33) below:

$$\text{weight\_flat}(x, y) = \sum_{i=0}^{N_t-1} \sum_{j=0}^{\frac{M_t-1}{2}} \{\text{Coef\_flat}(\text{sel\_dir}(x_{t0} + i, y_{t0} + 2i)) \times \text{Confidence} (x_{t0} + i, y_{t0} + 2i) \times \text{weight\_contrast\_F}(x_{t0} + i, y_{t0} + 2i)\} \quad (33)$$

weight_flat(x, y) denotes weight_flat at the target pixel with coordinates (x, y). Coef_Flat(sel_dir($x_{t0}$+i, $y_{t0}$+2i)) is a weight that is set for an edge direction sel_dir($x_{t0}$+i, $y_{t0}$+2i) of an interpolation pixel with coordinates ($x_{t0}$+i, $y_{t0}$+2i).

weight_flat is obtained by adding up values obtained for the individual interpolation pixels in the target region by multiplying the confidence of edge direction at each interpolation pixel, weight_contrast_F at the interpolation pixel, and the weight Coef_Flat for the edge direction sel_dir at the interpolation pixel. That is, weight_flat increases as the confidence of edge direction and the value of weight_contrast_F at each interpolation pixel in the target region increase (as the flat intensity in the target region increases), and decreases as the confidence of edge direction and the value of weight_contrast_F at each interpolation pixel in the target region decrease (as the flat intensity in the target region decreases).

The flat-intensity-information generator 112 generates flat-intensity information indicating weight_flat, and outputs the flat-intensity information to the adaptive flat mixer 202 of the enhancer 23.

In step S73, the profiler 21 checks whether the processing has been finished for all the interpolation pixels in the image. When it is determined that the processing has not been finished for all the interpolation pixels in the image, i.e., selection of a gradient and setting of weight_slant, weight_edge, weight_texture, and weight_flat have not been finished for all the interpolation pixels in the image, the process returns to step S52. Then, steps S52 to S73 are repeated until it is determined in step S73 that the processing has been finished for all the interpolation pixels, whereby selection of a gradient and setting of weight_slant, weight_edge, weight_texture, and weight_flat are executed for all the interpolation pixels in the image.

When it is determined in step S73 that the processing has been finished for all the pixels, the profiling process is finished.

Referring back to FIG. 6, in step S22, the doubler 22 executes a doubling process. Now, the doubling process will be described below in detail with reference to a flowchart shown in FIG. 15.

In step S200, the image storage unit 25 supplies an image. More specifically, the image storage unit 25 supplies an image for which the density-doubling process is to be executed to the linear interpolator 151 and the statistical gradient interpolator 152 of the doubler 22.

In step S102, the doubler 22 sets a target pixel and a target region. More specifically, similarly the profiler 21 executing step S52 described earlier with reference to FIG. 7, the doubler 22 selects an interpolation pixel that has not yet undergone the doubling process and sets the interpolation pixel as a target pixel, and sets a predetermined range centered around the target pixel as a target region.

In step S103, the linear interpolator 151 performs linear interpolation. More specifically, the linear interpolator 151 performs predetermined filtering on a plurality of pixels existing on the upper and lower sides of the target pixel in the vertical direction, thereby obtaining a pixel value for the target pixel through linear interpolation. The linear interpolator 151 information indicating the pixel value to the slant combiner 153. Hereinafter, the pixel value of an interpolation pixel at coordinates (x, y), obtained by the linear interpolator 151, will be denoted as P_linear_inter(x, y). The method of interpolation by the linear interpolator 151 is not particularly limited as long as it is different from a method used by the statistical gradient interpolator 152. Alternatively, for example, an interpolation method other than linear interpolation may be used.

In step S104, the statistical gradient interpolator 152 performs statistical gradient interpolation. More specifically, when a direction slanted leftward with respect to the vertical direction has been selected by the gradient selector 110 in step S68 described earlier with reference to FIG. 8, the statistical gradient interpolator 152 calculates a statistical-gradient-interpolation pixel, which is a pixel the target pixel by averaging the pixel values of the pixels adjacent above and below the target pixel.

The statistical gradient interpolator 152 supplies the statistical-gradient-interpolation pixel to the slant combiner 153.

In step S105, the slant combiner 153 combines pixels. More specifically, the slant combiner 153 adds together the linear-interpolation pixel and the statistical-gradient-interpolation pixel using weights based on weight_slant, thereby generating a slant-combination pixel according to expression (36) below:

$$P\_slant\_comb(x, y) = (1 - weight\_slant(x, y)) \times P\_linear\_inter(x, y) + \quad (36)$$
$$weight\_slant(x, y) \times P\_stat\_grad\_inter(x, y)$$

That is, the slant combiner 153 combines the linear-interpolation pixel and the statistical-gradient-interpolation pixel with the ratio of the statistical-gradient-interpolation pixel increased and the ratio of the linear-interpolation pixel decreased as weight_slant increases (as the prominence of edge direction in the target region increases), and with the ratio of the linear-interpolation pixel increased and the ratio of the value obtained by statistical gradient interpolation for the target pixel, according to expression (34) below:

$$P\_stat\_grad\_inter(x, y) = \frac{\sum_{dir=0}^{Nd-2}\left\{\begin{array}{l}\text{Population }(L_{dir})\times\\ \text{P\_grad\_ave}(L_{dir})\end{array}\right\}}{\sum_{dir=0}^{Nd-2}\text{Population }(L_{dir})} \quad (34)$$

P_stat_grad_inter(x, y) denotes a statistical-gradient-interpolation pixel at the target pixel with coordinates (x, y). As $L_{dir}$ in expression (34), the direction used for the edge-direction detecting region described earlier is used. P_grad_ave ($L_{dir}$) denotes an average of the pixel values of two existing pixels on the existing rows adjacent above and below the target pixel. The definition of Population($L_{dir}$) is the same as that in expression (29) given earlier. In sum, when a direction slanted leftward with respect to the vertical direction has been selected by the gradient selector 110, the statistical-gradient-interpolation pixel is obtained by adding up the pixel values of pixels located adjacent to the target pixel in the direction slanted leftward across the target pixel with respect to the vertical direction, weighted in accordance with the distribution of edge directions at interpolation pixels in the target region.

On the other hand, when a direction slanted rightward with respect to the vertical direction has been selected by the gradient selector 110 in step S68 described earlier with reference to FIG. 8, the statistical gradient interpolator 152 calculates a statistical-gradient-interpolation pixel for the target pixel according to expression (35) below:

$$P\_stat\_grad\_inter(x, y) = \frac{\sum_{dir=Nd}^{2Nd-2}\left\{\begin{array}{l}\text{Population}(L_{dir})\times\\ \text{P\_grad\_ave}(L_{dir})\end{array}\right\}}{\sum_{dir=Nd}^{2Nd-2}\text{Population}(L_{dir})} \quad (35)$$

That is, when a direction slanted rightward with respect to the vertical direction has been selected by the gradient selector 110, the statistical-gradient-interpolation pixel is obtained by adding up the pixel values of pixels located adjacent to the target pixel in the direction slanted rightward across the target pixel with respect to the vertical direction, weighted in accordance with the distribution of edge directions at interpolation pixels in the target region.

When the vertical direction has been selected by the gradient selector 110 in step S68 described earlier with reference to FIG. 8, the statistical gradient interpolator 152 obtains a statistical-gradient-interpolation pixel for statistical-gradient-interpolation pixel decreased as weight_slant decreases (as the prominence of edge direction in the target region decreases).

The slant combiner 153 supplies the slant-combination pixel to the image storage unit 25. The image storage unit 25 temporarily stores the slant-combination pixel.

In step S106, the doubler 22 checks whether pixel interpolation has all been finished. When slant-combination pixels have not been generated for all the interpolation pixels, the doubler 22 determines that pixel interpolation has not been finished. Then, the process returns to step S102. Then, steps S102 to S106 are repeated until it is determined in step S106 that pixel interpolation has all been finished, whereby slant combination pixels are generated for all the interpolation pixels.

When it is determined in step S106 that pixel interpolation has all been finished, the doubling process is finished.

Referring back to FIG. 6, in step S23, the enhancer 23 executes an enhancing process. Now, the enhancing process will be described below with reference to a flowchart shown in FIG. 16.

In step S151, the flat filter 201 performs flat filtering on a slant-combination image. More specifically, the image storage unit 25 supplies a slant-combination image composed of slant-combination pixels to the flat filter 201, the adaptive flat mixer 202, the texture filter 203, and the edge filter 205 of the enhancer 23. For each pixel in the slant-combination image, the flat filter 201 performs flat filtering on a region composed of the pixel and adjacent pixels using a filter that attenuates components in a predetermined spatial frequency band.

For example, the flat filter 201 performs flat filtering using a smoothing filter that attenuates components in a high-frequency band of an image, such as a median filter or a low-pass filter. In this case, a flat image composed of pixels obtained through the flat filtering is an image in which the slant-combination image has been smoothed as a whole so that small fluctuation in pixel value due to noise or the like is suppressed. The following description will be given in the context of an example where the flat filter 201 performs flat filtering using a smoothing filter.

The flat filter 201 supplies the flat image composed of the flat components obtained through the flat filtering to the adaptive flat mixer 202.

In step S152, the texture filter 203 performs texture filtering on the slant-combination image. More specifically, for example, when the target pixel is a pixel m shown in FIG. 17, the texture filter 203 performs one-dimensional texture filtering on a vertical region composed of pixels c, h, m, r, and w centered around the target pixel m. Filter coefficients that are used at this time are chosen to be, for example, $(1/4-\alpha_T/2, 0, \alpha_T+1/2, 0, 1/4-\alpha_T/2)$ $(0.5<\alpha_T)$ When the coordinates of the target pixel m are (x, y), the pixel value of a texture pixel for the target pixel m is obtained according to expression (37) below:

$$P\_texture(x, y) = \\ c \times (1/4 - \alpha_T/2) + m \times (\alpha_T + 1/2) + w \times (1/4 - \alpha_T/2) \quad (37)$$

P_texture(x, y) denotes the pixel value of a pixel in a texture image (texture pixel) with coordinates (x, y). The coefficient $\alpha_T$ is a coefficient for adjusting the degree of enhancing texture components by the texture filtering. Thus, a texture image composed of texture pixels is an image in which components in a predetermined frequency band have been enhanced so that the slant-combination image becomes sharper as a whole.

The texture filter 203 supplies the texture image composed of the texture pixels to the adaptive texture mixer 204.

In step S153, the edge filter 205 performs edge filtering on the slant-combination image. More specifically, for example, the edge filter 205 performs one-dimensional filtering on the vertical region centered around the target pixel m and composed of the pixels c, h, m, r, and was shown in FIG. 17. Filter coefficients that are used at this time are chosen to be, for example, $(1/4-\alpha_E/2, 1/4, \alpha_E, 1/4, 1/4-\alpha_E/2)$ $(0.5<\alpha_E)$. When the coordinates of the target pixel m are (x, y), the pixel value of an edge pixel for the target pixel m is obtained according to expression (38) below:

$$P\_edge(x, y) = \\ c \times (1/4 - \alpha_E/2) + h \times 1/4 + m \times \alpha_E + r \times 1/4 + w \times (1/4 - \alpha_E/2) \quad (38)$$

P_edge(x, y) denotes the pixel value of a pixel in an edge image (edge pixel) with coordinates (x, y). The coefficient $\alpha_E$ is a coefficient for adjusting the degree of enhancing edge components by the edge filtering. Thus, an edge image composed of edge pixels is an image in which edges in the slant-combination image have been enhanced.

The edge filter 205 supplies the edge image composed of the edge pixels to the adaptive edge mixer 206.

In step S154, the adaptive flat mixer 202 performs adaptive flat mixing on the slant-combination image and the flat image. More specifically, the adaptive flat mixer 202 calculates pixel values of flat-mixture pixels constituting a flat-mixture image according to expression (39) below:

$$P\_flat\_mix(x, y) = (1 - weight\_flat(x, y)) \times P\_slant\_comb(x, y) + \\ weight\_flat(x, y) \times P\_flat(x, y) \quad (39)$$

P_flat(x, y) denotes the pixel value of a pixel in a flat image (flat pixel) with coordinates (x, y). P_flat_mix(x, y) denotes the pixel value of a pixel in a flat-mixture image (flat-mixture pixel) with coordinates (x, y). The adaptive flat mixer 202 adds together the pixel values at corresponding positions of the slant-combination image and the flat image with the ratio of the pixel value of the flat image increased and the ratio of the pixel value of the slant-combination image decreased as weight_flat increases (as the flat intensity in the target region increases) and with the ratio of the pixel value of the slant-combination image increased and the ratio of the pixel value of the flat image decreased as weight_flat decreases (as the flat intensity in the target region decreases).

Thus, the flat-mixture image is an image in which noise has been suppressed by smoothing in a region including a considerable amount of flat components of the slant-combination image and in which no processing or substantially no processing has been executed in a region not including a considerable amount of flat components of the slant-combination image.

The adaptive flat mixer 202 supplies the flat-mixture image composed of the flat-mixture pixels obtained through the adaptive flat mixing to the adaptive texture mixer 204.

In step S155, the adaptive texture mixer 204 performs adaptive texture mixing on the flat-mixture image and the texture image. More specifically, the adaptive texture mixer 204 calculates pixel values of pixels constituting a texture-mixture image according to expression (40) below:

$$P\_texture\_mix(x, y) = (1 - weight\_texture(x, y)) \times P\_flat\_mix(x, y) + weight\_texture(x, y) \times P\_texture(x, y) \quad (40)$$

P_texture_mix(x, y) denotes the pixel value of a pixel in a texture-mixture image (texture-mixture pixel) with coordinates (x, y). The adaptive texture mixer 204 adds together the pixel values at corresponding positions of the flat-mixture image and the texture image with the ratio of the pixel value of the texture image increased and the ratio of the pixel value of the flat-mixture image decreased as weight_texture increases (as the texture intensity in the target region increases) and with the ratio of the pixel value of the flat-mixture image increased and the ratio of the pixel value of the texture image decreased as weight_texture decreases (as the texture intensity in the target region decreases).

Thus, the texture-mixture image is an image in which image sharpness has been improved in a region including a considerable amount of texture components of the flat-mixture image and in which no processing or substantially no processing has been executed in a region not including a considerable amount of texture components of the flat-mixture image.

In step S156, the adaptive edge mixer 206 performs adaptive edge mixing on the texture-mixture image and the edge image, and the enhancing process is finished. More specifically, the adaptive edge mixer 206 calculates pixel values of edge-mixture pixels constituting an edge-mixture image according to expression (41) below:

$$P\_edge\_mix(x, y) = (1 - weight\_edge(x, y)) \times P\_texture\_mix(x, y) + weight\_edge(x, y) \times P\_edge(x, y) \quad (41)$$

P_edge_mix(x, y) denotes the pixel value of a pixel in an edge-mixture image (edge-mixture pixel) with coordinates (x, y). The adaptive edge mixer 206 adds together the pixel values at corresponding positions of the texture-mixture image and the edge image with the ratio of the pixel value of the edge image increased and the ratio of the pixel value of the texture-mixture image decreased as weight_edge increases (as the edge intensity in the target region increases) and with the ratio of the pixel value of the texture-mixture image increased and the ratio of the pixel value of the edge image decreased as weight_edge decreases (as the edge intensity in the target region decreases).

Thus, the edge-mixture image is an image in which edges have been enhanced in a region including a considerable amount of edge components of the texture-mixture image and in which no processing or substantially no processing has been executed in a region not including a considerable amount of edge components of the texture-mixture image.

The adaptive edge mixer 206 supplies the edge-mixture image composed of the edge-mixture pixels obtained through the adaptive edge mixing to the image storage unit 25. The image storage unit 25 temporarily stores the edge-mixture image.

Referring back to FIG. 6, in steps S24 to S26, processing is executed similarly to steps S21 to S23 described earlier. However, in steps S24 to S26, the profiling process, the doubling process, and the enhancing process are executed regarding the horizontal direction of the edge-mixture image generated through steps S21 to S23. That is, pixels are interpolated in the horizontal direction of the edge-mixture image. An image generated in the enhancing process in step S26, i.e., an image obtained through vertical and horizontal pixel interpolation (hereinafter referred to as a double-density image), is supplied to the image storage unit 25 and temporarily stored therein.

As described above, by interpolating pixels in consideration of edge directions of an image on the basis of edge directions, confidences thereof, and contrast intensities, pixels are interpolated in a manner coordinated with neighboring pixels, and the image quality of an image obtained through resolution conversion (slant-interpolation image) is improved. Furthermore, by using weight_flat, weight_texture, and weight_edge obtained on the basis of contrast intensities, an image that is to be processed can be divided accurately without complex processing into a region including a large amount of flat components, a region including a large amount of texture components, and a region including a large amount of edge components. Furthermore, since filtering is performed on a slant-interpolation image substantially individually in a region including a large amount of flat components, a region including a large amount of texture components, and a region including a large amount of edge components. Thus, it is possible to adjust image quality more suitably in accordance with image characteristics, so that an image with an image quality desired by a user can be readily obtained.

Next, another embodiment of the present invention will be described with reference to FIGS. 18 to 22.

FIG. 18 is a block diagram of an image processing apparatus according to another embodiment of the present invention. An image processing apparatus 301 according to this embodiment includes an image input unit 11, an image processing unit 311, and an image output unit 13. The image processing unit 311 includes a profiler 321, an enhancer 23, and an image storage unit 25. In FIG. 18, parts corresponding to those shown in FIG. 1 are designated by the same numerals, and repeated description of processing executed in the same manner will be refrained.

Figure 20:
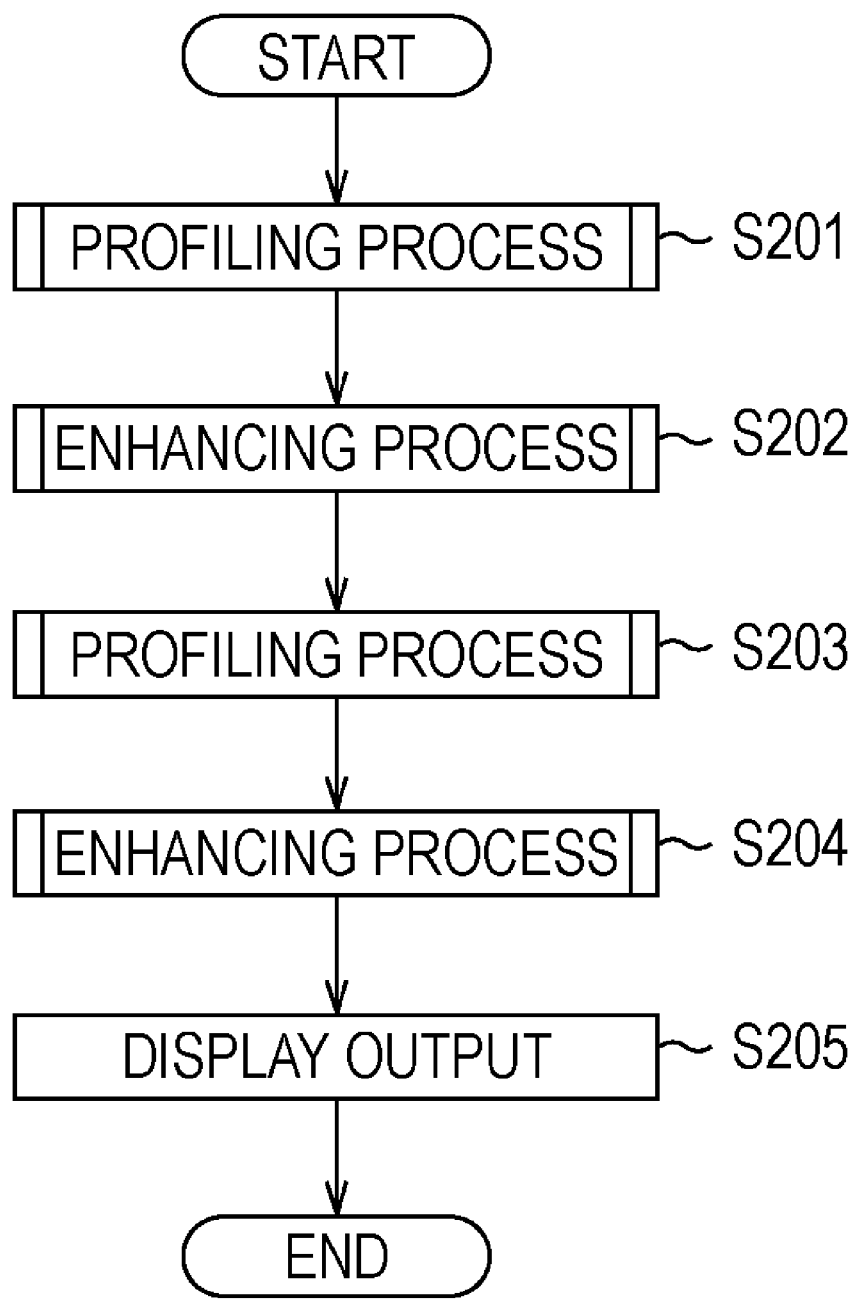
FIG. 20 is a flowchart of an image-quality adjusting process executed by the image processing apparatus shown in FIG. 18.

As will be described later mainly with reference to FIG. 20, the image processing unit 311 executes an image-quality adjusting process to adjust the image quality of an input image. The image processing unit 311 outputs an image obtained through the image-quality adjusting process to the image output unit 13.

Figure 21:
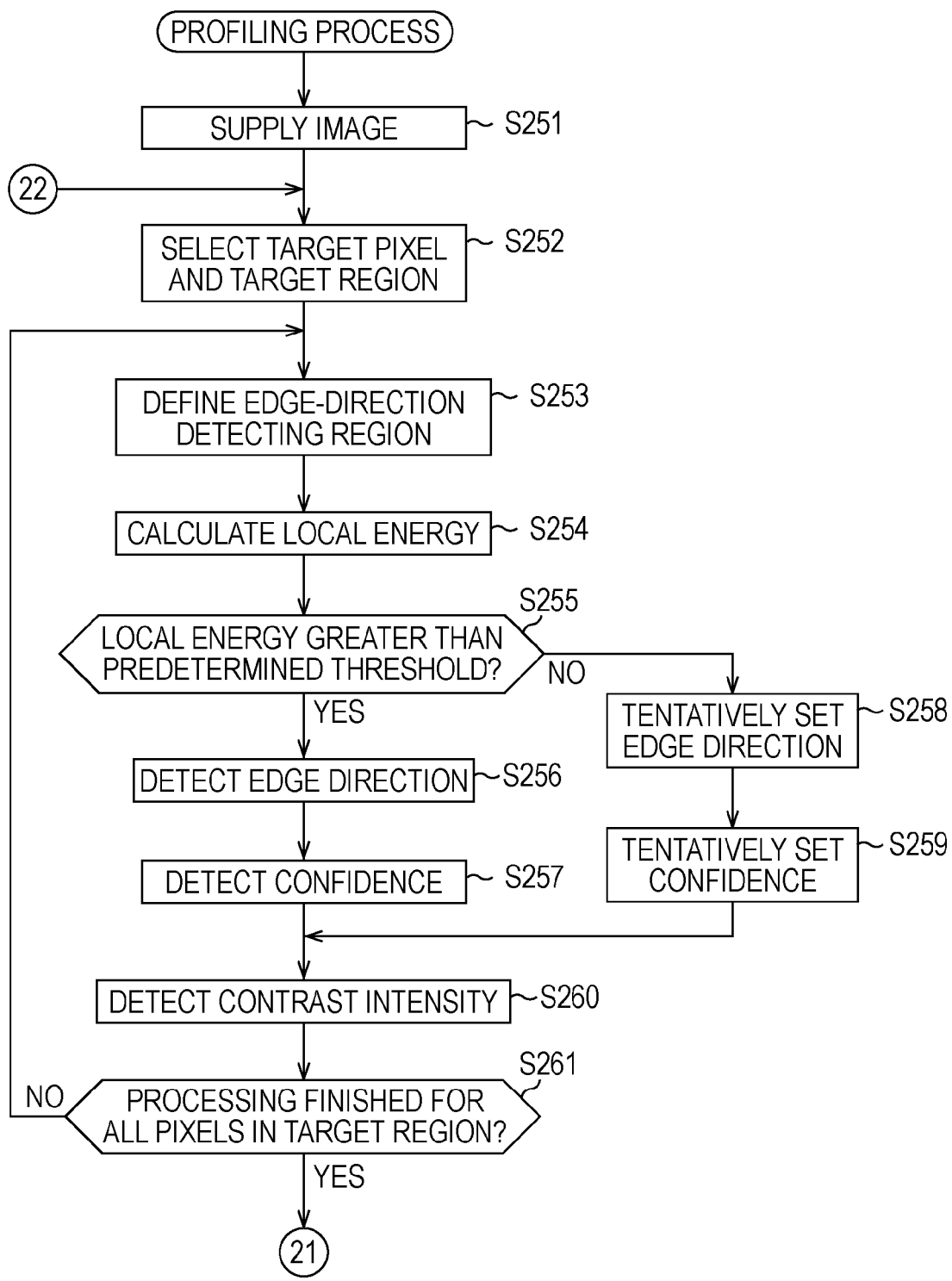
FIG. 21 is a flowchart showing details of a profiling process executed in steps S201 and S203 shown in FIG. 20.

As will be described later with reference to FIG. 21, the profiler 321 executes a profiling process. More specifically, the profiler 321 detects directions of edges in an image input from outside and confidences of the edge directions. Furthermore, the profiler 321 detects contrast intensities in the image input from outside. Furthermore, the profiler 321 sets weight_flat, weight_texture, and weight_edge for the image input from outside. The profiler 321 supplies information indicating weight_flat, weight_texture, and weight_edge to the enhancer 23.

FIG. 19 is a block diagram showing an example configuration of the profiler 321. The profiler 321 includes a direction detector 401, a direction-distribution generator 402, a confidence detector 403, a confidence-distribution generator 404, a contrast calculator 405, a flat-contrast-distribution generator 407, a texture-contrast-distribution generator 408, an edge-contrast-distribution generator 409, a flat-intensity-information generator 412, a texture-intensity-information generator 413, and an edge-intensity-information generator 414. In FIG. 19, parts corresponding to those shown in FIG. 2 are designated by numerals having the same two low-order digits, and repeated description of processing executed in the same manner will be refrained.

As will be described later with reference to FIG. 21, the direction-distribution generator 402 generates a direction distribution indicating a distribution of edge directions detected by the direction detector 401. The direction-distribution generator 402 supplies direction-distribution information indicating the direction distribution to the flat-intensity-information generator 412, the texture-intensity-information generator 413, and the edge-intensity-information generator 414.

Figure 22:
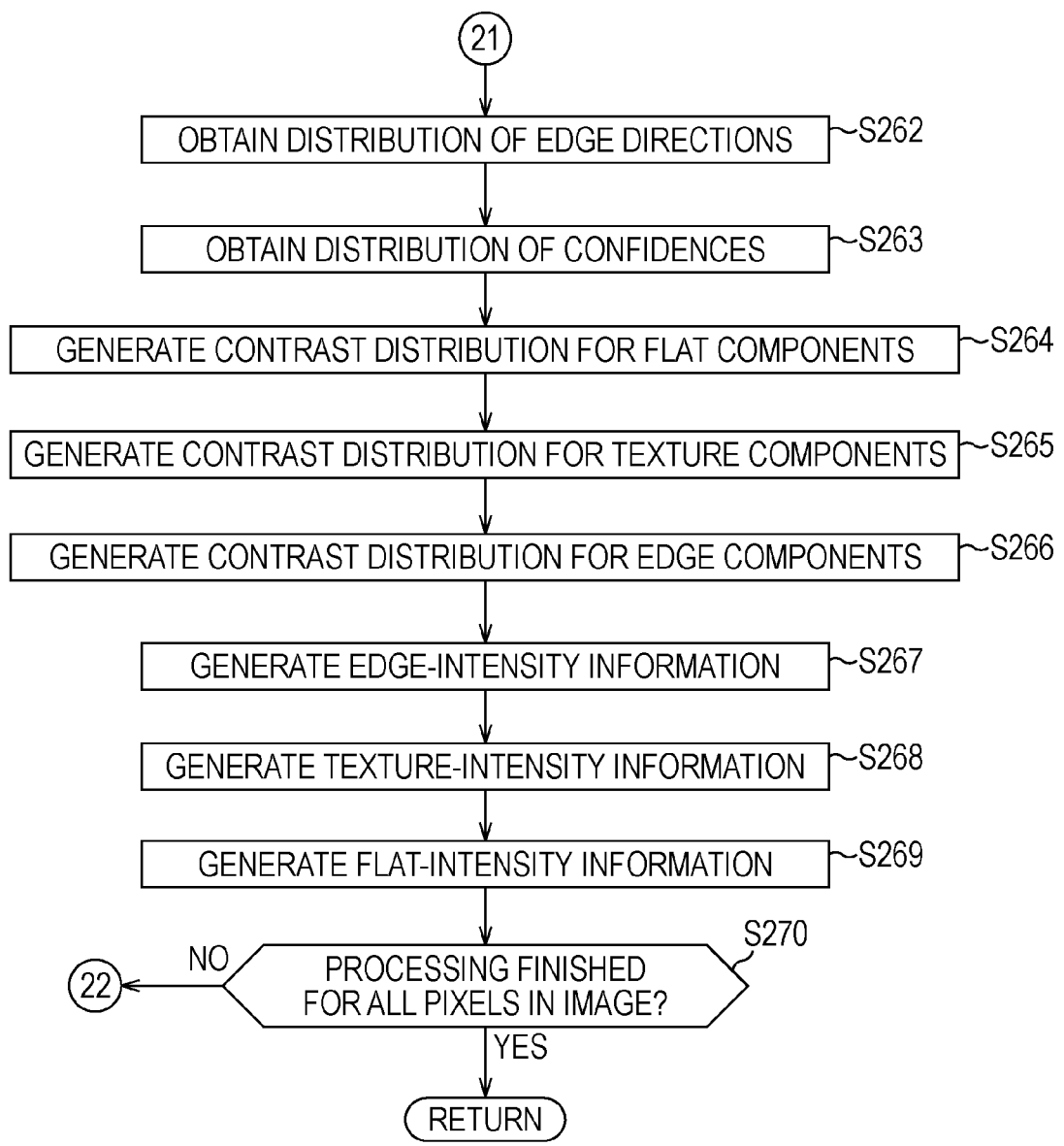
FIG. 22 is a flowchart showing details of the profiling process executed in steps S201 and S203 shown in FIG. 20.

As will be described later with reference to FIG. 22, the confidence-distribution generator 404 generates a confidence distribution indicating a distribution of confidences detected by the confidence detector 403. The confidence-distribution generator 404 supplies confidence-distribution information indicating the confidence distribution to the flat-intensity-information generator 412, the texture-intensity-information generator 413, and the edge-intensity-information generator 414.

As will be described later with reference to FIG. 22, the contrast calculator 405 detects contrast intensities indicating the intensities of contrast in an image input from outside. The contrast calculator 405 supplies contrast information indicating the contrast intensities to the flat-contrast-distribution generator 407, the texture-contrast-distribution generator 408, and the edge-contrast-distribution generator 409.

Next, processes executed by the image processing apparatus 301 will be described with reference to FIGS. 20 to 22.

First, the image-quality adjusting process executed by the image processing apparatus 301 will be described with reference to FIG. 20. The image-quality adjusting process is started, for example, when a user operates an operating unit (not shown) of the image processing apparatus 301 to input an image (input image) from the image input unit 11 to the image processing unit 311 and to instruct adjustment of the image quality of the input image. The input image is supplied to the image storage unit 25 and temporarily stored therein.

In step S201, the profiler 321 executes a profiling process. Now, the profiling process will be described below in detail with reference to flowcharts shown in FIGS. 21 and 22.

In step S251, the image storage unit 25 supplies an image. More specifically, the image storage unit 25 supplies the input image to the direction detector 401 the confidence detector 403, and the contrast calculator 405 of the profiler 321.

In step S252, the profiler 321 sets a target pixel and a target region. More specifically, the profiler 321 selects a pixel that has not yet undergone the profiling process from among pixels of the image obtained from the image storage unit 25 and sets the pixel as a target pixel. Furthermore, the profiler 321 sets a region of a predetermined range centered around the target pixel as a target region.

In step S253, the direction detector 401 sets an edge-direction detecting region. More specifically, first, the profiler 321 selects a pixel for which an edge direction has not been detected from among pixels in the target region. Hereinafter, the pixel selected at this time will be referred to as an edge-direction-detection pixel. Similarly to step S52 shown in FIG. 7, the direction detector 401 sets an edge-direction detecting region composed of pixels and virtual pixels extracted from rows adjacent above and below the edge-direction-detection pixel.

In step S254, similarly to step S54 described earlier with reference to FIG. 7, the direction detector 401 calculates a local energy EL of the edge-direction detecting region.

In step S255, similarly to step S55 described earlier with reference to FIG. 7, the direction detector 401 checks whether the local energy EL is greater than a predetermined threshold. When it is determined that the local energy EL is greater than the predetermined threshold, the process proceeds to step S256.

In step S256, similarly to step S56 described earlier with reference to FIG. 7, the direction detector 401 detects an edge direction sel_dir of the edge-direction-detection pixel. The direction detector 401 supplies edge-direction information indicating that the local energy EL exceeds the predetermined threshold and indicating the edge direction sel_dir to the direction-distribution generator 402 and the confidence detector 403.

In step S257, similarly to step S57 described earlier with reference to FIG. 7, the confidence detector 403 detects a confidence of the edge-direction sel_dir detected in step S256. The confidence detector 403 supplies confidence information indicating the confidence to the confidence-distribution generator 404. The process then proceeds to step S260.

When it is determined in step S255 that the local energy EL is less than or equal to the predetermined threshold, the process proceeds to step S258.

In step S258, similarly to step S58 described earlier with reference to FIG. 7, the direction detector 401 tentatively sets an edge direction sel_dir. The direction detector 401 supplies edge-direction information indicating that the local energy EL is less than or equal to the predetermined threshold and indicating the edge direction sel_dir to the direction-distribution generator 402 and the confidence detector 403.

In step S259, similarly to step S59 described earlier with reference to FIG. 7, the confidence detector 403 tentatively sets a confidence. The confidence detector 403 outputs confidence information indicating the confidence to the confidence-distribution generator 404.

In step S260, similarly to step S60 described earlier with reference to FIG. 7, the contrast calculator 405 detects a contrast intensity in a contrast detecting region centered around the edge-direction-detection pixel. The contrast calculator 405 supplies contrast information indicating the contrast intensity to the flat-contrast-distribution generator 407, the texture-contrast-distribution generator 408, and the edge-contrast-distribution generator 409.

In step S261, the profiler 321 checks whether the processing has been finished for all the pixels in the target region. When it is determined that the processing has not been finished for all the pixels in the target region, the process returns to step S253. Then, steps S253 to S261 are repeated until it is determined in step S261 that the processing has been finished for all the pixels in the target region, whereby edge directions, confidences thereof, and contrast intensities are detected for all the pixels in the target region.

When it is determined in step S261 that the processing has been finished for all the pixel sin the target region, the process proceeds to step S262.

In step S262, similarly to step S62 described earlier with reference to FIG. 8, the direction-distribution generator 402 generates a direction distribution indicating a distribution of edge directions at the individual pixels in the target region. The direction-distribution generator 402 supplies direction-distribution information indicating the direction distribution to the flat-intensity-information generator 412, the texture-intensity-information generator 413, and the edge-intensity-information generator 414.

In step S263, similarly to step S63 described earlier with reference to FIG. 7, the confidence-distribution generator 404 generates a confidence distribution indicating a distribution of confidences at the individual pixels in the target region. The confidence-distribution generator 404 supplies confidence-distribution information indicating the confidence distribution to the flat-intensity-information generator 412, the texture-intensity-information generator 413, and the edge-intensity-information generator 414.

In step S264, similarly to step S65 described earlier with reference to FIG. 8, the flat-contrast-distribution generator 407 calculates values of weight_contrast_F at the individual pixels in the target region, and generates a contrast distribution indicating a distribution of the values of weight_contrast_F at the individual pixels in the target region. The flat-contrast-distribution generator 407 supplies contrast-distribution information indicating the contrast distribution of weight_contrast_F to the flat-intensity-information generator 412.

In step S265, similarly to step S66 described earlier with reference to FIG. 8, the texture-contrast-distribution generator 408 calculates values of weight_contrast_T at the individual pixels in the target region, and generates a contrast distribution indicating a distribution of the values of weight_contrast_T at the individual pixels in the target region. The texture-contrast-distribution generator 408 supplies contrast-distribution information indicating the contrast distribution of weight_contrast_T to the texture-intensity-information generator 413.

In step S266, similarly to step S67 described earlier with reference to FIG. 8, the edge-contrast-distribution generator 409 calculates values of weight_contrast_E at the individual pixels in the target region, and generates a contrast distribution indicating a distribution of the values of weight_contrast_E at the individual pixels in the target region. The edge-contrast-distribution generator 409 supplies contrast-distribution information indicating the contrast distribution of weight_contrast_E to the edge-intensity-information generator 414.

In step S267, similarly to step S70 described earlier with reference to FIG. 7, the edge-intensity-information generator 414 calculates weight_edge for the target pixel, and supplies edge-intensity information indicating weight_edge to the adaptive edge mixer 206 of the enhancer 23. Although weight_edge is calculated using edge directions of interpolation pixels in the target region, confidences thereof, and contrast intensities in step S70 described earlier with reference to FIG. 7, in step S267, weight_edge is calculated using edge directions of existing pixels in the target region, confidences thereof, and contrast intensities.

In step S268, similarly to step S71 described earlier with reference to FIG. 7, the texture-intensity-information generator 413 calculates weight_texture for the target pixel, and supplies texture-intensity information indicating weight_texture to the adaptive texture mixer 204 of the enhancer 23. Although weight_texture is calculated using edge directions of interpolation pixels in the target region, confidences thereof, and contrast intensities in step S70 described earlier with reference to FIG. 7, in step S268, weight_texture is calculated using edge directions of existing pixels in the target region, confidences thereof, and contrast intensities.

In step S269, similarly to step S72 described earlier with reference to FIG. 7, the flat-intensity-information generator 412 calculates weight_flat for the target pixel, and supplies flat-intensity information indicating weight_flat to the adaptive flat mixer 202 of the enhancer 23. Although weight_flat is calculated using edge directions of interpolation pixels in the target region, confidences thereof, and contrast intensities in step S71 described earlier with reference to FIG. 7, in step S269, weight_flat is calculated using edge directions of existing pixels in the target region, confidences thereof, and contrast intensities.

In step S270, the profiler 321 checks whether the processing has been finished for all the pixels in the image. When it is determined that the processing has not been finished for all the pixels in the image, the process returns to step S252. Then, steps S252 to S270 are repeated until it is determined in step S270 that the processing has been finished for all the pixels in the image, whereby weight_edge, weight_texture, and weight_flat are set for all the pixels in the image.

When it is determined in step S270 that the processing has been finished for all the pixels in the image, the profiling process is finished. That is, in the profiling process executed by the image processing apparatus 301, as opposed to the profiling process executed by the image processing apparatus 1, weight_edge, weight_texture, and weight_flat are set for all the pixels in the input image in the end.

Referring back to FIG. 20, in step S202, the enhancing process described earlier with reference to FIG. 16 is executed on the input image. Thus, substantially, filtering is performed on the input image individually in a region including a large amount of flat components, a region including a large amount of texture components, and a region including a large amount of edge components.

Then, in steps S203 and S204, processes similar to those executed in steps S201 and S202 described earlier are executed. However, in steps S203 and S204, the profiling process and the enhancing process are executed with respect to the horizontal direction of an image obtained through the enhancing process executed in step S202. An image obtained through the enhancing process executed in step S204, i.e., an image obtained by enhancing the input image with respect to both the vertical direction and the horizontal direction, is supplied to the image storage unit 25 and temporarily stored therein.

In step S205, similarly to step S7 described earlier with reference to FIG. 5, an output is displayed. This concludes the image-quality adjusting process.

As described above, an edge direction at a target pixel being considered in an original image is detected, a confidence of the edge direction is detected; a contrast intensity of the target pixel is detected; the contrast intensity indicating an intensity of contrast in a first region including and neighboring the target pixel; a texture-contrast weight for the target pixel is set, the texture-contrast weight being a weight that is based on a degree of closeness of the contrast intensity of the target pixel to a predetermined contrast intensity that occurs with a high frequency of occurrence in a texture region, the texture region being a region where pixel values vary by larger amounts than in a flat region and by smaller amounts than in an edge region, the flat region being a region where pixel values are substantially constant, and the edge region being a region where pixel values vary sharply; an edge-contrast weight for the target pixel is set, the edge-contrast weight being a weight that is based on a degree of closeness of the contrast intensity of the target pixel to a predetermined contrast intensity that occurs with a high frequency of occurrence in the edge region; a texture weight is set, the texture weight being a weight that is based on edge directions of individual pixels in a second region including and neighboring the target pixel, confidences of the edge directions of the individual pixels, and texture-contrast weights for the individual pixels; an edge weight is set, the edge weight being a weight that is based on edge directions of individual pixels in a third region including and neighboring the target pixel, confidences of the edge directions of the individual pixels, and edge-contrast weights for the individual pixels; texture filtering is performed on the original image to generate a texture-filter image, the texture filtering being directed to processing involving the texture region; edge filtering is performed on the original image to generate an edge-filter image, the edge filtering being directed to processing involving the edge region; pixel values at corresponding positions of the original image and the texture-filter image are added together, using weights that are based on the texture weight, to generate a texture-combination image; and pixel values of pixels at corresponding positions of the texture-combination image and the edge-filter image are added together, using weights that are based on the edge weight, to generate an edge-combination image.

Although a gradient is selected and weight_slant, weight_edge, weight_texture, and weight_flat are obtained all using the same target region, the range of the target region may be varied for the respective purposes.

Furthermore, since flat filtering on a region including a large amount of flat components is not so effective for pixels with little noise, for example, the flat-contrast-distribution generator 107, the flat-intensity-information generator 112, the flat filter 201, and the adaptive flat mixer 202 may be omitted from the image processing apparatus 1 so that flat filtering and adaptive flat mixing are not performed on a slant-combination image. Still in this case, it is possible to obtain an image with an image quality desired by a user. Similarly, the flat-contrast-distribution generator 407, the flat-intensity-information generator 412, the flat filter 201, and the adaptive flat mixer 202 may be omitted from the image processing apparatus 301 so that flat filtering and adaptive flat mixing are not performed on an input image.

Furthermore, even when the enhancing process after the doubling process is omitted, image interpolation is performed in consideration of edge directions. Thus, a more favorable image quality can be achieved compared with existing interpolation techniques.

Furthermore, when an enlarger that enlarges an image by existing techniques is provided in the image processing apparatus 1 and, for example, when an image is to be enlarged sixfold, it is possible to execute the doubling process twice to enlarge the image fourfold and to further enlarge the resulting image by 3/2 by existing techniques.

Furthermore, in the density doubling process, it is possible to double the density only with respect to either the vertical direction or the horizontal direction of an image. For example, it is possible to double the density only with respect to the vertical direction by executing only steps S21 to S23 shown in FIG. 6, while it is possible to double the density only with respect to the horizontal direction by executing only steps S24 to S26 shown in FIG. 6. For example, the doubling only with respect to the vertical direction can be used for interlaced-to-progressive (IP) conversion.

The present invention can be applied to apparatuses that adjust image quality or apparatuses that convert image resolution, such as various types of image display apparatuses, image playback apparatuses, and image recording apparatuses.

The series of processes described above can be executed by hardware or software. When the series of processes are executed by software, programs constituting the software are installed from a program recording medium onto a computer embedded in special hardware or onto a general-purpose personal computer or the like that is capable of executing various functions with various programs installed thereon.

Figure 23:
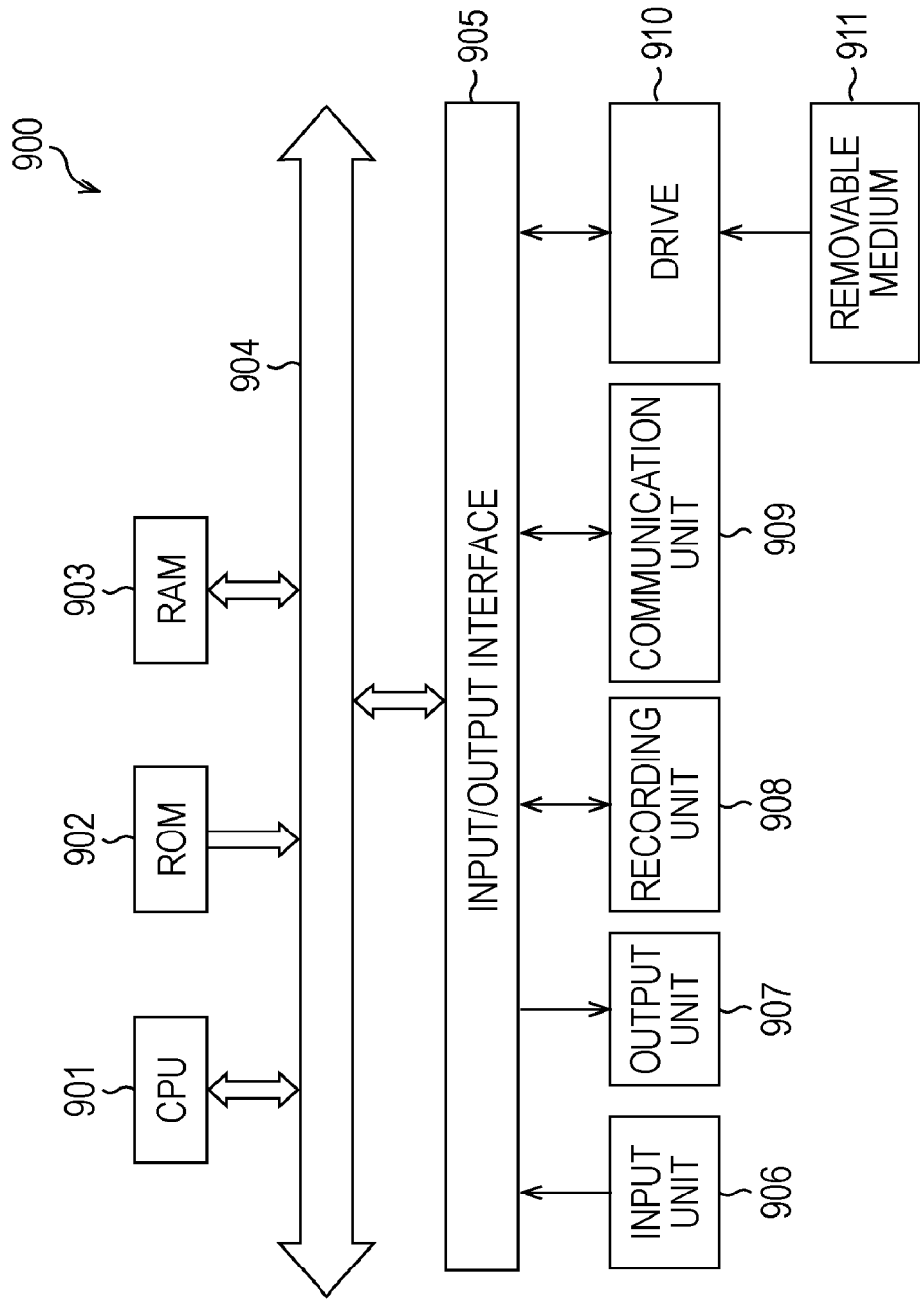
FIG. 23 is a block diagram showing an example configuration of a personal computer.

FIG. 23 is a block diagram showing an example configuration of a personal computer 900 that executes the series of processes described above according to programs. A central processing unit (CPU) 901 executes various processes according to programs stored in a read-only memory (ROM) 902 or a recording unit 908. A random access memory (RAM) 903 stores programs executed by the CPU 901, relevant data, etc. as needed. The CPU 901, the ROM 902, and the RAM 903 are connected to each other via a bus 904.

The CPU 901 is also connected to an input/output interface 905 via the bus 904. The input/output interface 905 is connected to an input unit 906 including a keyboard, a mouse, a microphone, etc., and to an output unit 907 including a display, a speaker, etc. The CPU 901 executes various processes according to instructions input from the input unit 906. The CPU 901 then outputs results of the processes to the output unit 907.

The input/output interface 905 is also connected to the recording unit 908, such as a hard disc. The recording unit 908 stores programs executed by the CPU 901 and various types of data. A communication unit 909 carries out communications with external devices via networks, such as the Internet or local area networks.

Also, it is possible to obtain programs via the communication unit 909 and to store the programs in the recording unit 908.

Furthermore, a drive 910 is connected to the input/output interface 905. When a removable medium 911, such as a magnetic disc, an optical disc, a magneto-optical disc, or a semiconductor memory, is mounted on the drive 910, the drive 910 drives the removable medium 911 to obtain programs, data, etc. recorded thereon. The programs, data, etc. that have been obtained are transferred to and stored in the recording unit 908 as needed.

As shown in FIG. 23, the program recording medium for storing programs that are installed onto a computer for execution by the computer may be, for example, the removable medium 911, which is a package medium such as a magnetic disc (e.g., a flexible disc), an optical disc (e.g., a CD-ROM (compact disc read-only memory) or a DVD (digital versatile disc)), a magneto-optical disc, or a semiconductor memory, or the ROM 902 or the hard disc of the recording unit 908 temporarily or permanently storing the programs. The programs can be stored on the program recording medium as needed via the communication unit 909, which is an interface such as a router or a modem, using a wired or wireless communication medium, such as a local area network, the Internet, or digital satellite broadcasting.

It is to be understood that steps defining the programs stored on the program recording medium may include processes that are executed in parallel or individually, as well as processes that are executed in the orders described in this specification.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
   edge-direction detecting means for detecting an edge direction at a target pixel being considered in an original image;
   confidence detecting means for detecting a confidence of the edge direction;

contrast detecting means for detecting a contrast intensity of the target pixel, the contrast intensity indicating an intensity of contrast in a first region including and neighboring the target pixel;

texture-contrast-weight setting means for setting a texture-contrast weight for the target pixel, the texture-contrast weight being a weight that is based on a degree of closeness of the contrast intensity of the target pixel to a predetermined contrast intensity that occurs with a high frequency of occurrence in a texture region, the texture region being a region where pixel values vary by larger amounts than in a flat region and by smaller amounts than in an edge region, the flat region being a region where pixel values are substantially constant, and the edge region being a region where pixel values vary sharply;

first edge-contrast-weight setting means for setting a first edge-contrast weight for the target pixel, the first edge-contrast weight being a weight that is based on a degree of closeness of the contrast intensity of the target pixel to a predetermined contrast intensity that occurs with a high frequency of occurrence in the edge region;

texture-weight setting means for setting a texture weight, the texture weight being a weight that is based on edge directions of individual pixels in a second region including and neighboring the target pixel, confidences of the edge directions of the individual pixels, and texture-contrast weights for the individual pixels;

edge-weight setting means for setting an edge weight, the edge weight being a weight that is based on edge directions of individual pixels in a third region including and neighboring the target pixel, confidences of the edge directions of the individual pixels, and first edge-contrast weights for the individual pixels;

texture filtering means for performing texture filtering on the original image to generate a first texture-filter image, the texture filtering being directed to processing involving the texture region;

edge filtering means for performing edge filtering on the original image to generate a first edge-filter image, the edge filtering being directed to processing involving the edge region;

texture combining means for adding together pixel values at corresponding positions of the original image and the first texture-filter image, using weights that are based on the texture weight, to generate a first texture-combination image; and edge combining means for adding together pixel values of pixels at corresponding positions of the first texture-combination image and the first edge-filter image, using weights that are based on the edge weight, to generate a first edge-combination image.

2. The image processing apparatus according to claim 1, wherein the confidence detecting means detects the confidence of the edge direction on the basis of whether a pixel value calculated using pixels located on either side of the target pixel in the edge direction matches pixel values of pixels neighboring the target pixel.

3. The image processing apparatus according to claim 1, wherein, as the contrast intensity, the contrast detecting means detects a sum of values obtained for individual pairs of adjacent pixels in the first region, the values being obtained by, for each of the pairs of adjacent pixels, multiplying an absolute value of difference between pixel values of the pixels with a weight associated with a distance between the pixels.

4. The image processing apparatus according to claim 1, wherein the texture-contrast-weight setting means sets the texture-contrast weight so that the texture-contrast weight takes on a maximum value in a range where the contrast intensity is greater than or equal to a first contrast intensity and less than or equal to a second contrast intensity, the first contrast intensity and the second contrast intensity being predetermined contrast intensities that occur with high frequencies of occurrence in the texture region, so that the texture-contrast weight takes on a minimum value in a range where the contrast intensity is less than a third contrast intensity and in a range where the contrast intensity is greater than a fourth contrast intensity, the third contrast intensity and the fourth contrast intensity being predetermined intensities that occur with low frequencies of occurrence in the texture region, so that the texture-contrast weight increases as the contrast intensity increases in a range where the contrast intensity is greater than or equal to the third contrast intensity and less than the first contrast intensity, and so that the texture-contrast weight decreases as the contrast intensity increases in a range where the contrast intensity is greater than the second contrast intensity and less than the fourth contrast intensity, and wherein the first edge-contrast-weight setting means sets the first edge-contrast weight so that the first edge-contrast weight takes on a maximum value in a range where the contrast intensity is greater than a fifth contrast intensity, the fifth contrast intensity being a predetermined contrast intensity that occurs with a high frequency of occurrence in the edge region, so that the first edge-contrast weight takes on a minimum value in a range where the contrast intensity is less than a sixth contrast intensity, the sixth contrast intensity being a predetermined contrast intensity that occurs with a low frequency of occurrence in the edge region, and so that the first edge-contrast weight increases as the contrast intensity increases in a range where the contrast intensity is greater than or equal to the sixth contrast intensity and less than the fifth contrast intensity.

5. The image processing apparatus according to claim 1, wherein, as the texture weight, the texture-weight setting means sets a sum of values obtained for the individual pixels in the second region, the values being obtained by, for each of the pixels, multiplying the confidence of the edge direction, the texture contrast weight, and a weight associated with the edge direction, and wherein, as the edge weight, the edge-weight setting means sets a sum of values obtained for the individual pixels in the third region, the values being obtained by, for each of the pixels, multiplying the confidence of the edge direction, the first edge-contrast weight, and a weight associated with the edge direction.

6. The image processing apparatus according to claim 1, wherein the texture filtering means performs filtering that enhances components in a predetermined frequency band of the original image, and wherein the edge filtering means performs filtering that enhances edges in the original image.

7. The image processing apparatus according to claim 1, wherein the texture combining means adds together pixel values of pixels at corresponding positions of the original image and the first texture-filter image with a ratio of the pixel value of the first texture filter-image increased as the texture weight increases and with a ratio of the pixel value of the original image increased as the texture weight decreases, and wherein the edge combining means adds together the pixel values of the pixels at the corresponding positions of the first texture-combination image and the first edge-filter image with a ratio of the pixel value of the first edge-filter image increased as the edge weight increases and with a ratio of the pixel value of the first texture-combination image increased as the edge weight decreases.

8. The image processing apparatus according to claim 1, further comprising:
flat-contrast-weight setting means for setting a flat-contrast weight for the target pixel, the flat-contrast weight being a weight that is based on a degree of closeness of the contrast intensity of the target pixel to a predetermined contrast intensity that occurs with a high frequency of occurrence in the flat region;
flat-weight setting means for setting a flat weight, the flat weight being a weight that is based on edge directions of individual pixels in a fourth region including and neighboring the target pixel, confidences of the edge directions of the individual pixels, and flat-contrast weights for the individual pixels;
flat filtering means for performing flat filtering to generate a flat-filter image, the flat filtering being directed to processing involving the flat region; and
flat combining means for adding together pixel values of pixels at corresponding positions of the original image and the flat-filter image, using weights that are based on the flat weight, to generate a flat-combination image;
wherein the texture combining means adds together pixel values of pixels at corresponding positions of the flat-combination image and the first texture-filter image, using weights that are based on the texture weight, to generate a second texture-combination image, and
wherein the edge combining means adds together pixel values of pixels at corresponding positions of the second texture-combination image and the first edge-filter image, using weights that are based on the edge weight, to generate a second edge-combination image.

9. The image processing apparatus according to claim 8, wherein the flat-contrast-weight setting means sets the flat-contrast weight so that the flat-contrast weight takes on a maximum value in a range where the contrast intensity is less than or equal to a first contrast intensity, the first contrast intensity being a predetermined contrast intensity that occurs with a high frequency of occurrence in the flat region, so that the flat-contrast weight takes on a minimum value in a range where the contrast intensity is greater than a second contrast intensity, the second contrast intensity being a predetermined contrast intensity that occurs with a low frequency of occurrence in the flat region, and so that the flat-contrast weight decreases as the contrast intensity increases in a range where the contrast intensity is greater than the first contrast intensity and less than or equal to the second contrast intensity.

10. The image processing apparatus according to claim 8, wherein, as the flat weight, the flat-weight setting means sets a sum of values obtained for the individual pixels in the fourth region, the values being obtained by, for each of the pixels, multiplying the confidence of the edge direction, the flat-contrast weight, and a weight associated with the edge direction.

11. The image processing apparatus according to claim 8, wherein the flat filtering means performs filtering that attenuates components in a high frequency band of the original image.

12. The image processing apparatus according to claim 8, wherein the flat combining means adds together the pixel values of the pixels at the corresponding positions of the original image and the flat-filter image with a ratio of the pixel value of the flat-filter image increased as the flat weight increases and with the pixel value of the original image increased as the flat weight decreases,
wherein the texture combining means adds together the pixel values of the pixels at the corresponding positions of the flat-combination image and the first texture-filter image with a ratio of the pixel value of the first texture-filter image increased as the texture weight increases and with a ratio of the pixel value of the flat-combination image increased as the texture weight decreases, and
wherein the edge combining means adds together the pixel values of the pixels at the corresponding positions of the second texture-combination image and the first edge-filter image with a ratio of the first edge-filter image increased as the edge weight increases and with a ratio of the second texture-combination image increased as the edge weight decreases.

13. The image processing apparatus according to claim 1, further comprising:
second edge-contrast-weight setting means for setting a second edge-contrast weight for the target pixel, the second edge-contrast weight being a weight that is based on a degree of closeness of the contrast intensity of the target pixel to a predetermined contrast intensity that occurs with a high frequency of occurrence in the edge region;
direction selecting means for selecting a selecting direction for selecting pixels to be used for interpolation of the target pixel, on the basis of edge directions of individual pixels in a fourth region including and neighboring the target pixel, confidences of the edge directions of the individual pixels, and second edge-contrast weights for the individual pixels;
slant-weight setting means for setting a slant weight, the slant weight being a weight that is based on edge directions of individual pixels in a fifth region including and neighboring the target pixel, confidences of the edge directions of the individual pixels, and second edge-contrast weights for the individual pixels;
first interpolating means for generating a first interpolation image through interpolation of the original image by calculating a pixel value of the target pixel using pixels neighboring the target pixel on either side of the target pixel in the selecting direction;
second interpolating means for generating a second interpolation image through interpolation of the original image in a manner different from the interpolation by the first interpolating means; and
interpolation-image combining means for adding together pixel values of pixels at corresponding positions of the first interpolation image and the second interpolation image, using weights that are based on the slant weight, to generate an interpolation-combination image;
wherein the texture filtering means performs the texture filtering on the interpolation-combination image to generate a second texture-filter image,
wherein the edge filtering means performs the edge filtering on the interpolation-combination image to generate a second edge-filter image,
wherein the texture combining means adds together pixel values of pixels at corresponding positions of the interpolation-combination image and the second texture-filter image, using weights that are based on the texture weight, to generate a second texture-combination image, and
wherein the edge combining means adds together pixel values of pixels at corresponding positions of the second texture-combination image and the second edge-filter image, using weights that are based on the edge weight, to generate a second edge-combination image.

14. The image processing apparatus according to claim 13, wherein the direction selecting means selects the selecting direction on the basis of a distribution of the edge directions of pixels having high confidences of the edge directions and large second edge-contrast weights among the pixels in the fourth region.

15. The image processing apparatus according to claim 13, wherein, as the slant weight, the slant-weight setting means sets a sum of values obtained for the individual pixels in the fifth region, the values being obtained by, for each of the pixels, multiplying the confidence of the edge direction, the second edge-contrast weight, and a weight associated with the edge direction.

16. The image processing apparatus according to claim 13, wherein the texture combining means adds together the pixel values of the pixels at the corresponding positions of the interpolation-combination image and the second texture-filter image with a ratio of the pixel value of the second texture-filter image increased as the texture weight increases and with a ratio of the pixel value of the interpolation-combination image increased as the texture weight decreases, and
wherein the edge combining means adds together the pixel values of the pixels at the corresponding positions of the second texture-combination image and the second edge-filter image with a ratio of the pixel value of the second edge-filter image increased as the edge weight increases and with a ratio of the pixel value of the second texture-combination image increased as the edge weight decreases.

17. An image processing method comprising the steps of:
detecting an edge direction at a target pixel being considered in an original image;
detecting a confidence of the edge direction;
detecting a contrast intensity of the target pixel, the contrast intensity indicating an intensity of contrast in a first region including and neighboring the target pixel;
setting a texture-contrast weight for the target pixel, the texture-contrast weight being a weight that is based on a degree of closeness of the contrast intensity of the target pixel to a predetermined contrast intensity that occurs with a high frequency of occurrence in a texture region, the texture region being a region where pixel values vary by larger amounts than in a flat region and by smaller amounts than in an edge region, the flat region being a region where pixel values are substantially constant, and the edge region being a region where pixel values vary sharply;
setting an edge-contrast weight for the target pixel, the edge-contrast weight being a weight that is based on a degree of closeness of the contrast intensity of the target pixel to a predetermined contrast intensity that occurs with a high frequency of occurrence in the edge region;
setting a texture weight, the texture weight being a weight that is based on edge directions of individual pixels in a second region including and neighboring the target pixel, confidences of the edge directions of the individual pixels, and texture-contrast weights for the individual pixels;
setting an edge weight, the edge weight being a weight that is based on edge directions of individual pixels in a third region including and neighboring the target pixel, confidences of the edge directions of the individual pixels, and edge-contrast weights for the individual pixels;
performing texture filtering on the original image to generate a texture-filter image, the texture filtering being directed to processing involving the texture region;
performing edge filtering on the original image to generate an edge-filter image, the edge filtering being directed to processing involving the edge region;
adding together pixel values at corresponding positions of the original image and the texture-filter image, using weights that are based on the texture weight, to generate a texture-combination image; and
adding together pixel values of pixels at corresponding positions of the texture-combination image and the edge-filter image, using weights that are based on the edge weight, to generate an edge-combination image;
wherein,
the foregoing steps are executed by an image processing apparatus.

18. A non-transitory computer readable medium having thereon stored a computer executable program for causing a computer to execute processing comprising the steps of:
detecting an edge direction at a target pixel being considered in an original image;
detecting a confidence of the edge direction;
detecting a contrast intensity of the target pixel, the contrast intensity indicating an intensity of contrast in a first region including and neighboring the target pixel;
setting a texture-contrast weight for the target pixel, the texture-contrast weight being a weight that is based on a degree of closeness of the contrast intensity of the target pixel to a predetermined contrast intensity that occurs with a high frequency of occurrence in a texture region, the texture region being a region where pixel values vary by larger amounts than in a flat region and by smaller amounts than in an edge region, the flat region being a region where pixel values are substantially constant, and the edge region being a region where pixel values vary sharply;
setting an edge-contrast weight for the target pixel, the edge-contrast weight being a weight that is based on a degree of closeness of the contrast intensity of the target pixel to a predetermined contrast intensity that occurs with a high frequency of occurrence in the edge region;
setting a texture weight, the texture weight being a weight that is based on edge directions of individual pixels in a second region including and neighboring the target pixel, confidences of the edge directions of the individual pixels, and texture-contrast weights for the individual pixels;
setting an edge weight, the edge weight being a weight that is based on edge directions of individual pixels in a third region including and neighboring the target pixel, confidences of the edge directions of the individual pixels, and edge-contrast weights for the individual pixels;
performing texture filtering on the original image to generate a texture-filter image, the texture filtering being directed to processing involving the texture region;
performing edge filtering on the original image to generate an edge-filter image, the edge filtering being directed to processing involving the edge region;
adding together pixel values at corresponding positions of the original image and the texture-filter image, using weights that are based on the texture weight, to generate a texture-combination image; and adding together pixel values of pixels at corresponding positions of the texture-combination image and the edge-filter image, using weights that are based on the edge weight, to generate an edge-combination image.

19. An image processing apparatus comprising:

an edge-direction detector configured to detect an edge direction at a target pixel being considered in an original image;

a confidence detector configured to detect a confidence of the edge direction;

a contrast detector configured to detect a contrast intensity of the target pixel, the contrast intensity indicating an intensity of contrast in a first region including and neighboring the target pixel;

a texture-contrast-weight setter configured to set a texture-contrast weight for the target pixel, the texture-contrast weight being a weight that is based on a degree of closeness of the contrast intensity of the target pixel to a predetermined contrast intensity that occurs with a high frequency of occurrence in a texture region, the texture region being a region where pixel values vary by larger amounts than in a flat region and by smaller amounts than in an edge region, the flat region being a region where pixel values are substantially constant, and the edge region being a region where pixel values vary sharply;

an edge-contrast-weight setter configured to set an edge-contrast weight for the target pixel, the edge-contrast weight being a weight that is based on a degree of closeness of the contrast intensity of the target pixel to a predetermined contrast intensity that occurs with a high frequency of occurrence in the edge region;

a texture-weight setter configured to set a texture weight, the texture weight being a weight that is based on edge directions of individual pixels in a second region including and neighboring the target pixel, confidences of the edge directions of the individual pixels, and texture-contrast weights for the individual pixels;

an edge-weight setter configured to set an edge weight, the edge weight being a weight that is based on edge directions of individual pixels in a third region including and neighboring the target pixel, confidences of the edge directions of the individual pixels, and edge-contrast weights for the individual pixels;

a texture filter configured to perform texture filtering on the original image to generate a texture-filter image, the texture filtering being directed to processing involving the texture region;

an edge filter configured to perform edge filtering on the original image to generate an edge-filter image, the edge filtering being directed to processing involving the edge region;

a texture combiner configured to add together pixel values at corresponding positions of the original image and the texture-filter image, using weights that are based on the texture weight, to generate a texture-combination image; and an edge combiner configured to add together pixel values of pixels at corresponding positions of the texture-combination image and the edge-filter image, using weights that are based on the edge weight, to generate an edge-combination image.

* * * * *